US012713452B2

(12) United States Patent
Rastegardoost et al.

(10) Patent No.: US 12,713,452 B2
(45) Date of Patent: Aug. 18, 2026

(54) CHANNEL ACCESS PRIORITY CLASS FOR MULTI-CONSECUTIVE SLOTS SIDELINK TRANSMISSIONS

(71) Applicant: Comcast Cable Communications, LLC, Philadelphia, PA (US)

(72) Inventors: Nazanin Rastegardoost, McLean, VA (US); Hyoungsuk Jeon, Centreville, VA (US); Esmael Hejazi Dinan, McLean, VA (US); Bing Hui, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 353 days.

(21) Appl. No.: 18/501,104

(22) Filed: Nov. 3, 2023

(65) Prior Publication Data

US 2024/0155656 A1 May 9, 2024

Related U.S. Application Data

(60) Provisional application No. 63/422,391, filed on Nov. 3, 2022.

(51) Int. Cl.

| | |
|---|---|
| ***H04W 72/40*** | (2023.01) |
| ***H04W 72/25*** | (2023.01) |
| ***H04W 72/566*** | (2023.01) |
| ***H04W 74/0816*** | (2024.01) |
| ***H04W 76/20*** | (2018.01) |

(52) U.S. Cl.

CPC ........... *H04W 72/40* (2023.01); *H04W 72/25* (2023.01); *H04W 72/566* (2023.01); *H04W 74/0816* (2013.01); *H04W 76/20* (2018.02)

(58) Field of Classification Search

CPC ... H04W 72/40; H04W 72/25; H04W 72/566; H04W 76/20; H04W 74/0816

USPC .......................................................... 370/329

See application file for complete search history.

(56) References Cited

U.S. PATENT DOCUMENTS

| | | | | |
|---|---|---|---|---|
| 2021/0307070 | A1 | 9/2021 | Kim et al. | |
| 2023/0337299 | A1* | 10/2023 | Zhang | H04L 45/66 |
| 2025/0024470 | A1* | 1/2025 | Luo | H04W 72/25 |
| 2025/0151092 | A1* | 5/2025 | Zhang | H04W 72/25 |
| 2025/0185037 | A1* | 6/2025 | Li | H04W 72/25 |

OTHER PUBLICATIONS

3GPP TS 38.213 V17.3.0 (Sep. 2022), Technical Specification, 3rd Generation Partnership Project; Technical Specification Group Radio Access Network; NR; Physical layer procedures for control (Release 17).

3GPP TS 38.214 V17.3.0 (Sep. 2022), Technical Specification, 3rd Generation Partnership Project; Technical Specification Group Radio Access Network; NR; Physical layer procedures for data (Release 17).

(Continued)

*Primary Examiner* — Chi Tang P Cheng

(74) *Attorney, Agent, or Firm* — Banner & Witcoff, Ltd.

(57) ABSTRACT

Wireless devices may communicate with each other using sidelink resources. Multi-consecutive slot transmission may be used to access a channel for communication between the wireless devices. A channel access priority class value may be used to indicate resource priority for the wireless device to use in the multi-consecutive slot transmission to access the channel.

20 Claims, 45 Drawing Sheets

(56) References Cited

OTHER PUBLICATIONS

3GPP TS 38.300 V17.2.0 (Sep. 2022), 3rd Generation Partnership Project; Technical Specification Group Radio Access Network; NR; NR and NG-RAN Overall Description; Stage 2 (Release 17).
3GPP TS 38.321 V17.2.0 (Sep. 2022), 3rd Generation Partnership Project; Technical Specification Group Radio Access Network; NR; Medium Access Control (MAC) protocol specification (Release 17).
3GPP TS 38.331 V17.2.0 (Sep. 2022), 3rd Generation Partnership Project; Technical Specification Group Radio Access Network; NR; Radio Resource Control (RRC) protocol specification (Release 17).
3GPP TSG RAN WG1 #110bis-e, e-Meeting, Oct. 10-19, 2022, Title: Title: RAN1 Chair's Notes.
R1-2210256 3GPP TSG-RAN WG1 Meeting #110bis-e, e-Meeting, Oct. 10-19, 2022, Source: Moderator (Huawei), Title: FL summary#5 for AI 9.4.1.2 SL-U physical channel design framework.
R1-2210293 3GPP TSG RAN WG1 #110bis-e, Electronics Meeting, Oct. 10-19, 2022, Source: Moderator (OPPO), Title: FL summary for AI 9.4.1.1: SL-U channel access mechanism (EOM).
R1-2210827 3GPP TSG RAN WG1 #111, Toulouse, France, Nov. 14-18, 2022, Source: Nokia, Nokia Shanghai Bell, Title: On Channel Access Mechanism for SL-U.
R1-2210828 3GPP TSG RAN WG1 #111, Toulouse, France, Nov. 14-18, 2022, Source: Nokia, Nokia Shanghai Bell, Title: On Physical Channel Design Framework for SL-U.
R1-2210891 3GPP TSG-RAN WG1 Meeting #111, Toulouse, France, Nov. 14-18, 2022, Source: Huawei, HiSilicon, Title: Channel access mechanism and resource allocation for sidelink operation over unlicensed spectrum.
R1-2210892 3GPP TSG-RAN WG1 Meeting #111, Toulouse, France, Nov. 14-18, 2022, Source: Huawei, HiSilicon, Title: Physical channel design for sidelink operation over unlicensed spectrum.
R1-2211007 3GPP TSG RAN WG1 #111, Toulouse, France, Nov. 14-18, 2022, Source: vivo, Title: Channel access mechanism for sidelink on unlicensed spectrum.
R1-2211008 3GPP TSG RAN WG1 #111, Toulouse, France, Nov. 14-18, 2022, Source: vivo, Title: Physical channel design framework for sidelink on unlicensed spectrum.
R1-2211198 3GPP TSG RAN WG1 #111, Toulouse, France, Nov. 14-18, 2022, Source: CATT, GOHIGH, Title: Discussion on channel access mechanism for sidelink on unlicensed spectrum.
R1-2211235 3GPP TSG RAN WG1 #111, Toulouse, France, Nov. 14-18, 2022, Source: Spreadtrum Communications, Title: Discussion on channel access mechanism of sidelink on unlicensed spectrum.
R1-2211263 3GPP TSG RAN WG1 #111, Toulouse, France, Nov. 14-18, 2022, Source: LG Electronics, Title: Discussion on channel access mechanism for sidelink on unlicensed spectrum.
R1-2211264 3GPP TSG RAN WG1 #111, Toulouse, France, Nov. 14-18, 2022, Source: LG Electronics, Title: Discussion on physical channel design framework for sidelink on unlicensed spectrum.
R1-2211364 3GPP TSG RAN WG1 #111, Toulouse, France, Nov. 14-18, 2022, Source: Xiaomi, Title: Discussion on channel access mechanism for sidelink-unlicensed.
R1-2211400 3GPP TSG RAN WG1 #111, Toulouse, France, Nov. 14-18, 2022, Source: Intel Corporation, Title: Channel Access Mechanisms for SL Operating in Unlicensed Spectrum.
R1-2211401 3GPP TSG RAN WG1 #111, Toulouse, France, Nov. 14-18, 2022, Source: Intel Corporation, Title: Physical Layer Enhancements for SL Operating in Unlicensed Spectrum.
R1-2211450 3GPP TSG-RAN WG1 Meeting #111, Toulouse, France, Nov. 14-18, 2022, Source: OPPO, Title: On channel access mechanism and resource allocation for SL-U.
R1-2211451 3GPP TSG-RAN WG1 Meeting #111, Toulouse, France, Nov. 14-18, 2022, Source: OPPO, Title: On PHY channel designs and procedures for SL-U.
R1-2211514 3GPP TSG RAN WG1#111, Toulouse, France, Nov. 14-18, 2022, Source: Transsion Holdings, Title: Discussion of channel access mechanism for sidelink in unlicensed spectrum.
R1-2211560 3GPP TSG RAN WG1 Meeting #111, Toulouse, France, Nov. 14-18, 2022, Source: ETRI, Title: Discussion on channel access mechanism for sidelink on unlicensed spectrum.
R1-2211579 3GPP TSG RAN WG1 #111, Toulouse, France, Nov. 14-18, 2022, Source: Lenovo, Title: Channel access mechanism for sidelink on FR1 unlicensed spectrum.
R1-2211580 3GPP TSG RAN WG1 #111, Toulouse, France, Nov. 14-18, 2022, Source: Lenovo, Title: Physical layer design framework for sidelink on FR1 unlicensed spectrum.
R1-2211682 3GPP TSG RAN WG1 #111, Toulouse, France, Nov. 14-18, 2022, Source: CMCC, Title: Discussion on channel access mechanism for sidelink on unlicensed spectrum.
R1-2211761 3GPP TSG RAN WG1 Meeting #111, Toulouse, France, Nov. 14-18, 2022, Source: Johns Hopkins University APL, Title: Further Discussion on Channel Access Mechanisms.
R1-2211762 3GPP TSG RAN WG1 Meeting #111, Toulouse, France, Nov. 14-18, 2022, Source: Johns Hopkins University APL, Title: Further Discussion on Physical Channel Design Framework.
R1-2211985 3GPP TSG RAN WG1 #111, Toulouse, France, Nov. 14-18, 2022, Source: NTT DOCOMO, Inc., Title: Discussion on channel access mechanism in SL-U.
R1-2211986 3GPP TSG RAN WG1 #111, Toulouse, France, Nov. 14-18, 2022, Source: NTT DOCOMO, Inc., Title: Discussion on channel design framework in SL-U.
R1-2212117 3GPP TSG RAN WG1 Meeting #111, Toulouse, France, Nov. 14-18, 2022, Source: Qualcomm Incorporated, Title: Channel access mechanism for Sidelink on Unlicensed Spectrum.
R1-2212118 3GPP TSG RAN WG1 Meeting #111, Toulouse, France, Nov. 14-18, 2022, Source: Qualcomm Incorporated, Title: Physical Channel Design for Sidelink on Unlicensed Spectrum.
R1-2212206 3GPP TSG RAN WG1 Meeting #111, Toulouse, France, Nov. 14-18, 2022, Source: ZTE, Sanechips, Title: Discussion on channel access mechanism for SL-U.
R1-2212207 3GPP TSG RAN WG1 Meeting #111, Toulouse, France, Nov. 14-18, 2022, Source: ZTE, Sanechips, Title: Discussion on physical layer structures and procedures for SL-U.
R1-2212222 3GPP TSG RAN WG1 Meeting #111, Toulouse, France, Nov. 14-18, 2022, Source: Ericsson, Title: Channel access mechanism for SL-U.
R1-2212223 3GPP TSG RAN WG1 Meeting #111, Toulouse, France, Nov. 14-18, 2022, Source: Ericsson, Title: PHY channel design framework for SL-U.
R1-2212277 3GPP TSG RAN WG1 Meeting #111, Toulouse, France, Nov. 14-18, 2022, Source: Panasonic, Title: Physical channel design for sidelink on unlicensed spectrum.
R1-2212287 3GPP TSG RAN WG1 Meeting #111, Toulouse, France, Nov. 14-18, 2022, Source: ITL, Title: Channel Access Mechanism for SL-U.
R1-2212288 3GPP TSG RAN WG1 Meeting #111, Toulouse, France, Nov. 14-18, 2022, Source: ITL, Title: Physical Channel Design framework for SL-U.
R1-2212356 3GPP TSG RAN WG1 Meeting #111, Toulouse, France, Nov. 14-18, 2022, Source: NEC, Title: Discussion on physical channel design framework.
R1-2212363 3GPP TSG RAN WG1 Meeting #111, Toulouse, France, Nov. 14-18, 2022, Source: NEC, Title: Channel Access of Sidelink on Unlicensed Spectrum.
R1-2212442 3GPP TSG RAN WG1 Meeting #111, Toulouse, France, Nov. 14-18, 2022, Source: Fraunhofer HHI, Fraunhofer IIS, Title: NR Sidelink Unlicensed Channel Access Mechanisms.
R1-2212443 3GPP TSG RAN WG1 Meeting #111, Toulouse, France, Nov. 14-18, 2022, Source: Fraunhofer HHI, Fraunhofer IIS, Title: NR Sidelink Unlicensed Physical Channel Design.
R2-22xxxxx 3GPP TSG-RAN WG2 Meeting #119bis electronic, Online, Oct. 10-19, 2022, Source: Session Chair (Samsung), Title: Report from session on NR SL.
R1-2209302 3GPP TSG RAN WG1 #110bis-e, e-Meeting, Oct. 10-19, 2022, Source: Lenovo, Title: Physical layer design framework for sidelink on FR1 unlicensed spectrum.
R1-2208643 3GPP TSG RAN WG1 #110bis-e, e-Meeting, Oct. 10-19, 2022, Source: Vivo, Title: Channel access mechanism for sidelink on unlicensed spectrum.

(56) References Cited

OTHER PUBLICATIONS

R1-2206290 3GPP TSG RAN WG1 #110, Toulouse, France, Aug. 22-26, 2022, Source: OPPO, Title: Access mechanisms and resource allocation for NR sidelink in unlicensed channel.
R2-2209891 3GPP TSG RAN WG2 #119bis-e, e-Meeting, Oct. 10-19, 2022, Source: Lenovo, Title: Discussion on channel access priority for NR SL-U.
R2-2209598 3GPP TSG RAN WG2 #119bis-e, e-Meeting, Oct. 10-19, 2022, Source: Huawei, HiSilicon, Title: Discussion on CAPC for SL-U.
Apr. 4, 2024—European Search Report—EP App. No. 23207764.4.

* cited by examiner

100
Wireless Device 106
RAN 104
CN 102
DN(s)

150
Wireless Device 156A
Uu
gNB 160A
Xn
ng-eNB 162A
Xn
Xn
ng-eNB 162B
Xn
Wireless Device 156B
Uu
gNB 160B
NG
NG
NG
NG
AMF 158A
UPF 158B
AMF/UPF 158
DN(s)
5G-CN 152
NG-RAN 154
Wireless Devices 156

Logical Channels
Transport Channels
Physical Channels
Physical Signals

PCCH BCCH CCCH DCCH DTCH
PCH BCH DL-SCH
PBCH PDSCH PDCCH
DCI
PSS/SSS CSI-RS DM-RS PT-RS

Downlink

CCCH DCCH DTCH
UL-SCH RACH
PUSCH PUCCH PRACH
UCI
DM-RS PT-RS SRS

Uplink

1 Frame (10 ms)

0 1 2 3 4 5 6 7 8 9

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

```
SL-ResourcePool::=              SEQUENCE {
...
    sl-UE-SelectedConfigRP              SL-UE-SelectedConfigRP
...
    sl-PreemptionEnable                 ENUMERATED {enabled, pl1, pl2, pl3, pl4,
pl5, pl6, pl7, pl8}
...
    sl-TxPercentageList                 SL-TxPercentageList
...
}

sl-UE-SelectedConfigRP ::=          SEQUENCE {
...
    sl-ThresPSSCH-RSRP-List             SL-ThresPSSCH-RSRP-List
    sl-MultiReserveResource             ENUMERATED {enabled}
    sl-MaxNumPerReserve                 ENUMERATED {n2, n3}
    sl-SensingWindow                    ENUMERATED {ms100, ms1100}
    sl-SelectionWindowList              SL-SelectionWindowList
    sl-ResourceReservePeriodList      SEQUENCE (SIZE (1..16)) OF SL-
ResourceReservePeriod
    sl-RS-ForSensing                    ENUMERATED {pscch, pssch},
    ...
}
```

FIG. 21

```
SL-ResourceReservePeriod ::=        CHOICE {
    sl-ResourceReservePeriod1           ENUMERATED {ms0, ms100, ms200,
ms300, ms400, ms500, ms600, ms700, ms800, ms900, ms1000},
    sl-ResourceReservePeriod2           INTEGER (1..99)
}

SL-SelectionWindowList ::=          SEQUENCE (SIZE (8)) OF SL-
SelectionWindowConfig

SL-SelectionWindowConfig ::=        SEQUENCE {
    sl-Priority                         INTEGER (1..8),
    sl-SelectionWindow                  ENUMERATED {n1, n5, n10, n20}
}

SL-TxPercentageList ::=             SEQUENCE (SIZE (8)) OF SL-
TxPercentageConfig

SL-TxPercentageConfig ::=           SEQUENCE {
    sl-Priority                         INTEGER (1..8),
    sl-TxPercentage                     ENUMERATED {p20, p35, p50}
}
```

FIG. 22

| Channel Access Priority Class (CAPC: p) | m_p | CW_min, p | CW_max,p | T_sl mcot,p | Allowed CW_p sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6 ms or 10 ms | {15,31,63,127,255,511,1023} |
| 4 | 7 | 15 | 1023 | 6 ms or 10 ms | {15,31,63,127,255,511,1023} |

Note: Lower CAPC value means higher priority

FIG. 35

CHANNEL ACCESS PRIORITY CLASS FOR MULTI-CONSECUTIVE SLOTS SIDELINK TRANSMISSIONS

CROSS-REFERENCE TO RELATED APPLICATIONS

This application claims the benefit of U.S. Provisional Application No. 63/422,391, filed on Nov. 3, 2022. The above-referenced application is hereby incorporated by reference in its entirety.

BACKGROUND

A base station and a wireless device communicate via uplink and/or downlink communication. A wireless device communicates with another device (e.g., other wireless devices) via sidelink communications. A physical sidelink control channel (PSCCH) may be used to allocate, prioritize, and/or reserve sidelink resources for sidelink communications.

SUMMARY

The following summary presents a simplified summary of certain features. The summary is not an extensive overview and is not intended to identify key or critical elements.

A first wireless device may communicate with a second wireless device using sidelink resources. Multi-consecutive slots transmission with multiple transport blocks may be supported for sidelink communication. A channel access priority class value may be used with a listen-before-talk procedure to access a communication channel. The channel access priority class value may be based on one or more of a type of data, priority of data, and/or any other characteristic. Using a channel access priority class in the manner described herein may provide advantages such as decreased likelihood of listen-before-talk failure and/or an improved fairness in channel access.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 21 shows an example of configuration information for sidelink communication.

FIG. 22 shows an example of configuration information for sidelink communication.

FIG. 35 shows a table of example parameters for sidelink channel access procedure.

DETAILED DESCRIPTION

Figure 1A:
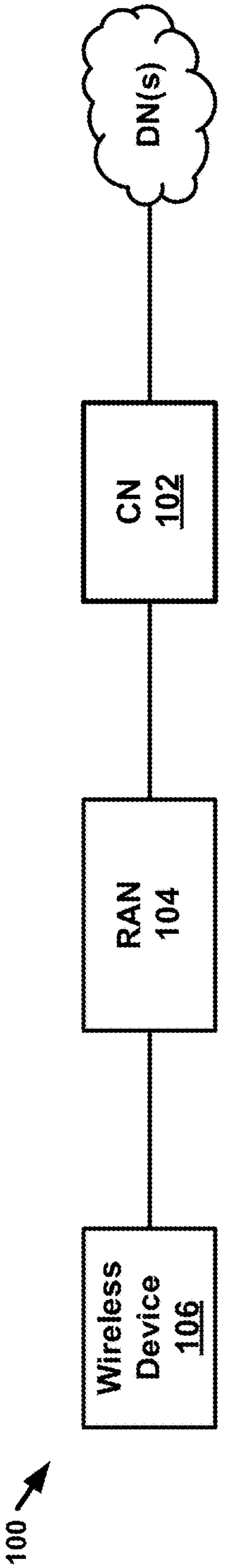
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
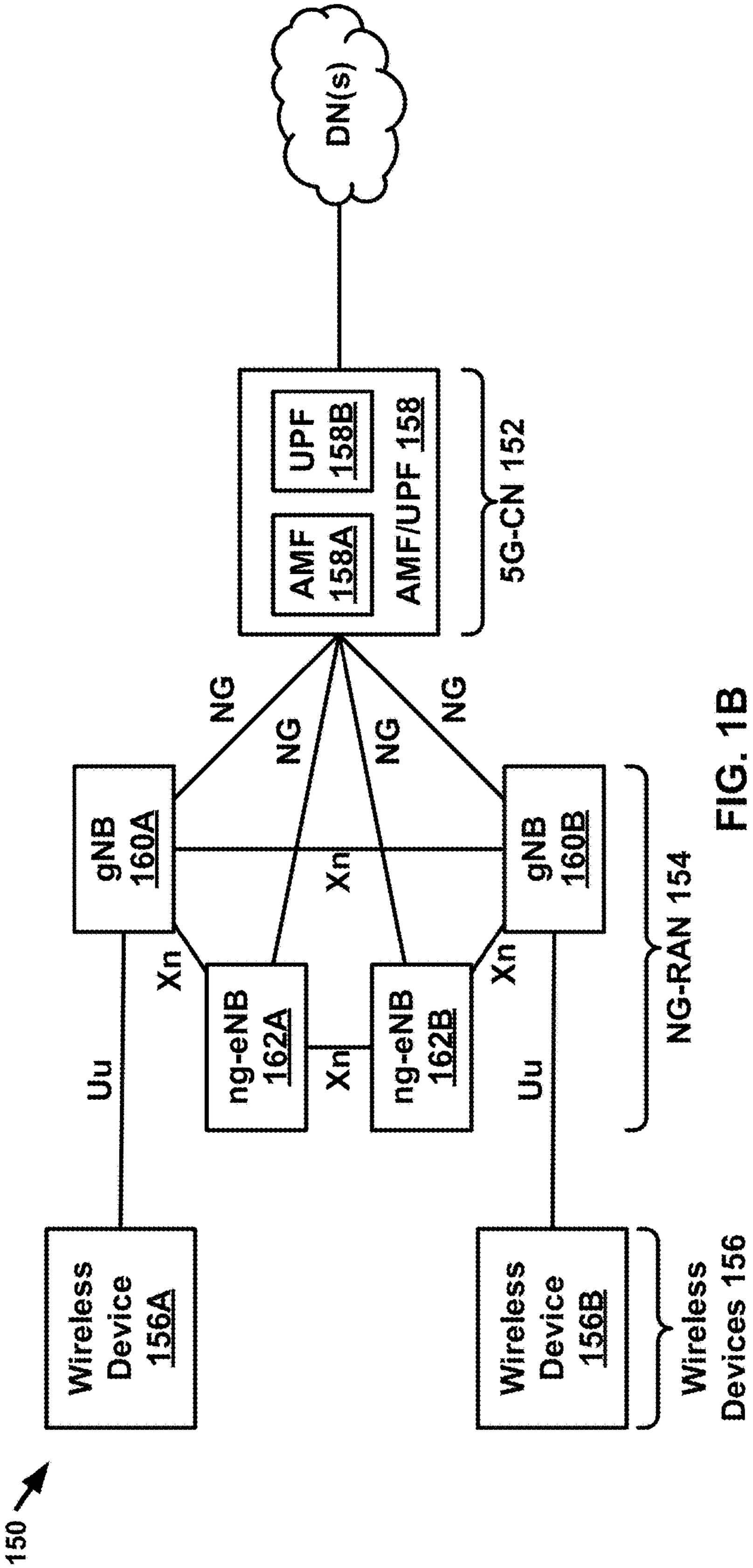

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
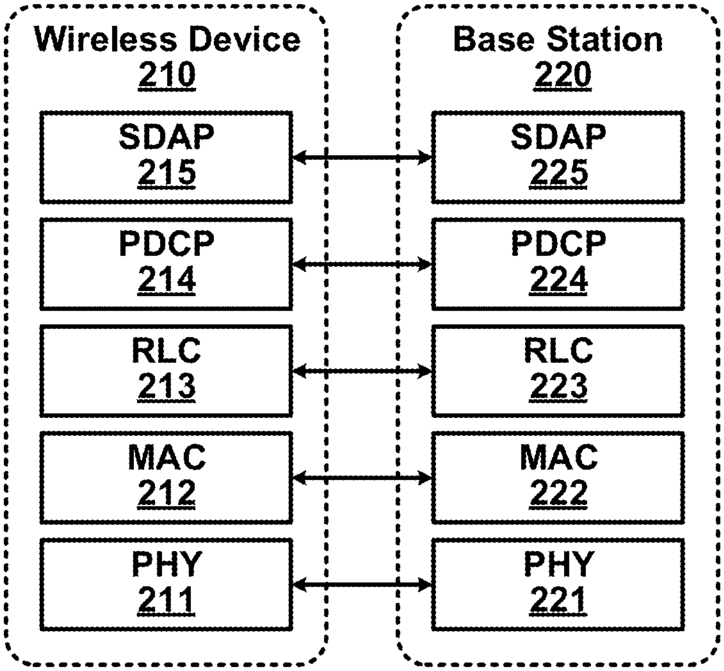
FIG. 2A shows an example user plane.
Figure 2B:
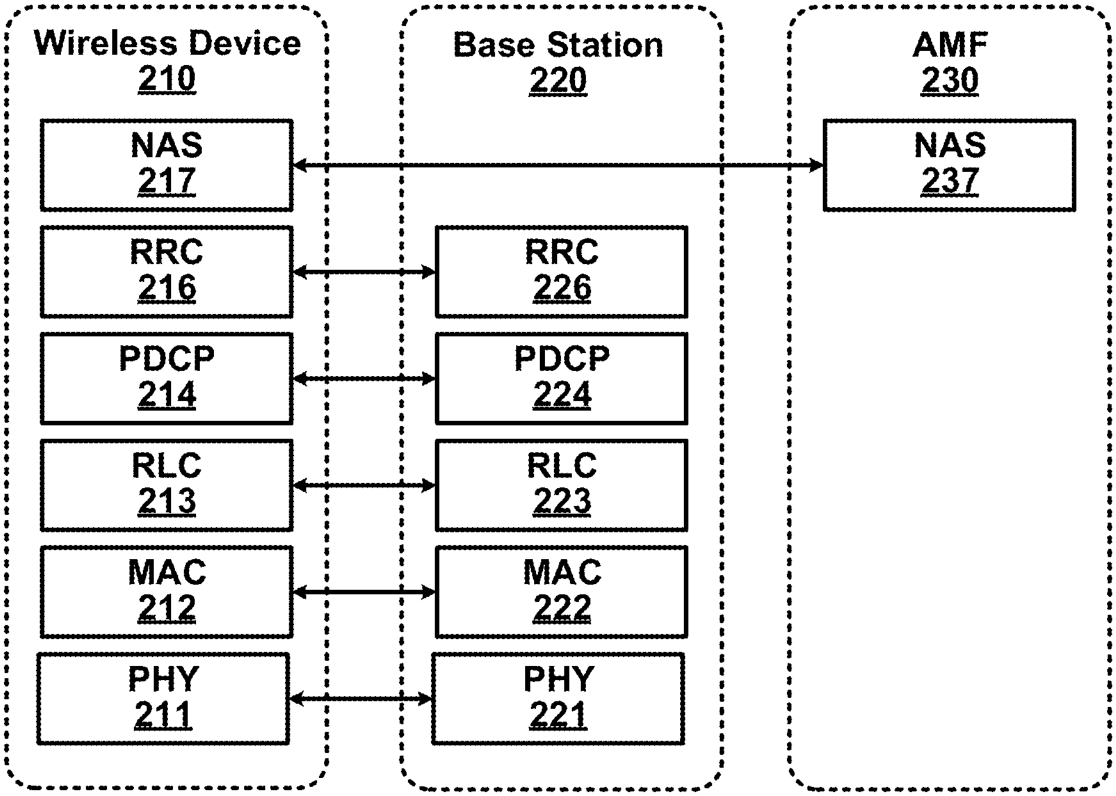
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
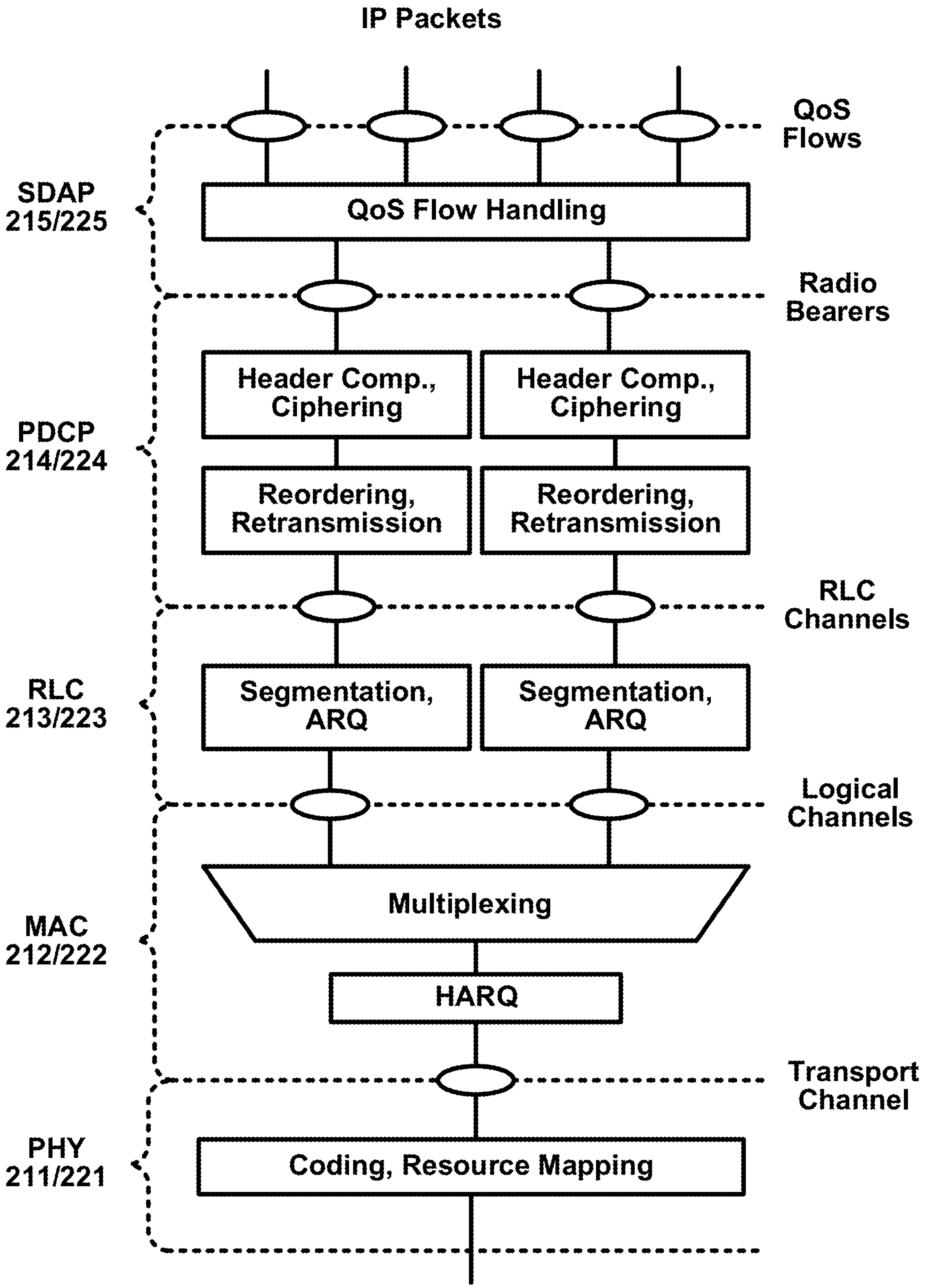
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TB s) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figures 4A, 4B:
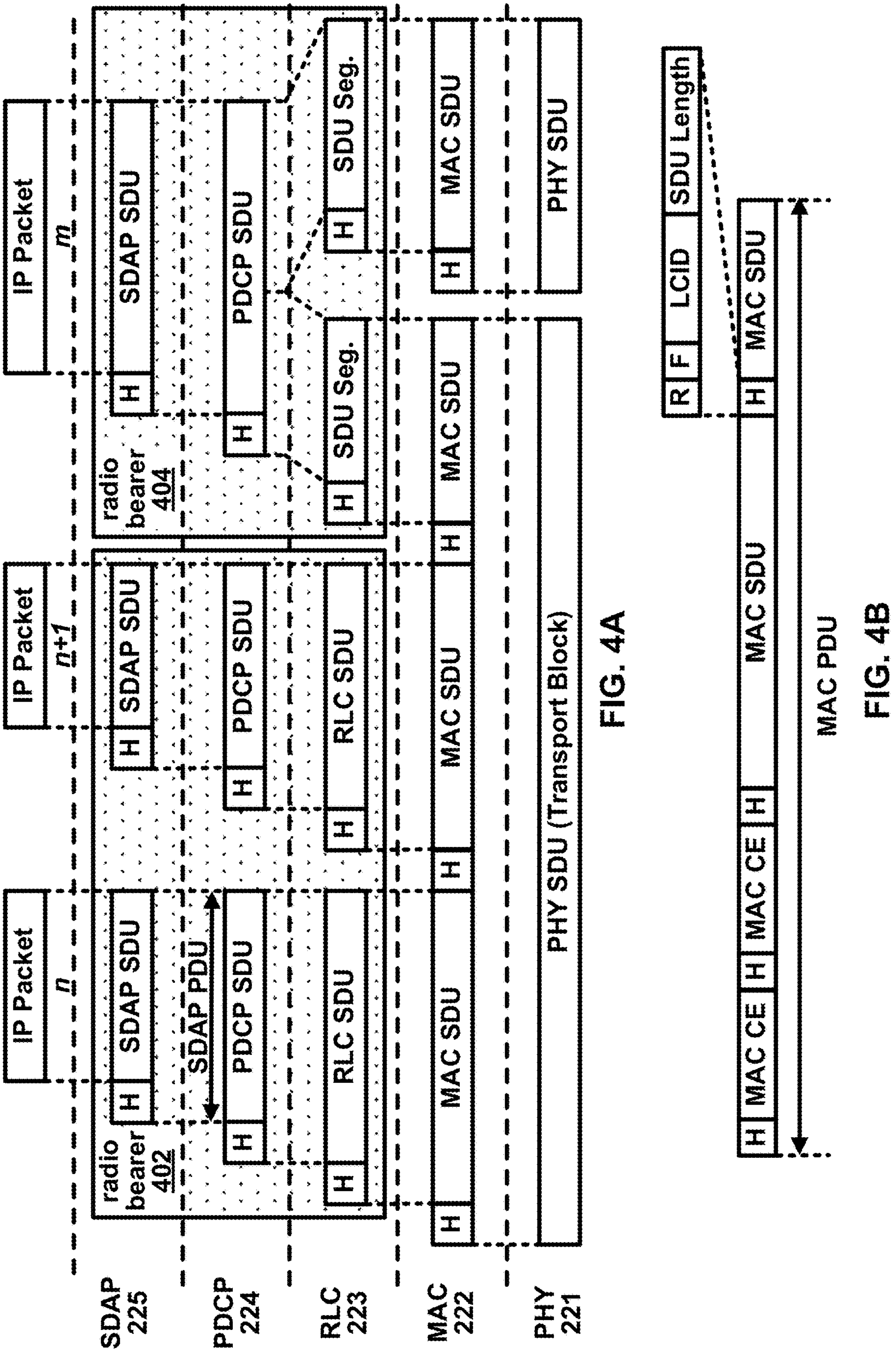
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
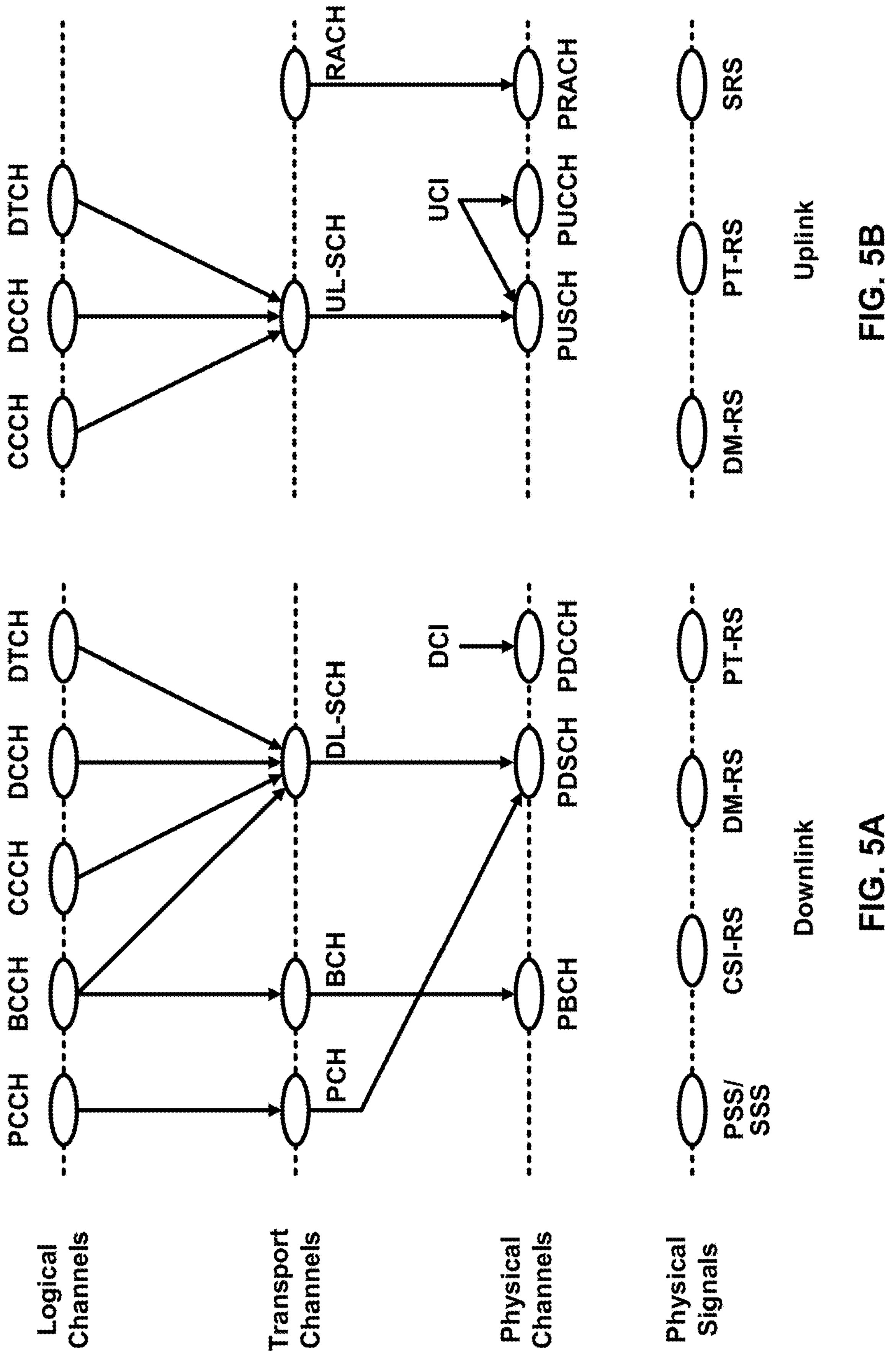
FIG. 5A shows an example mapping for downlink channels.
FIG. 5B shows an example mapping for uplink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIB s). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIB s from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
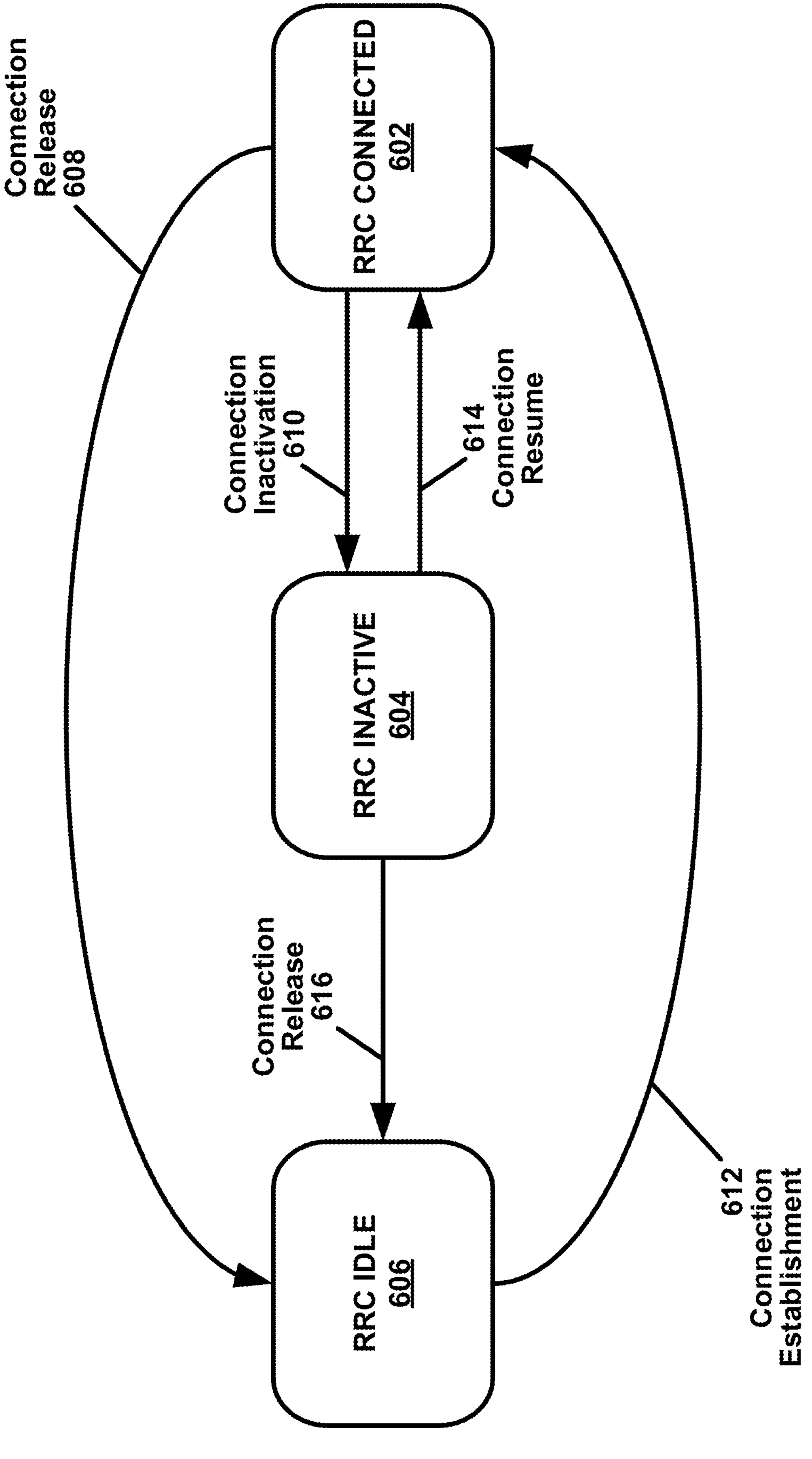
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNB s 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
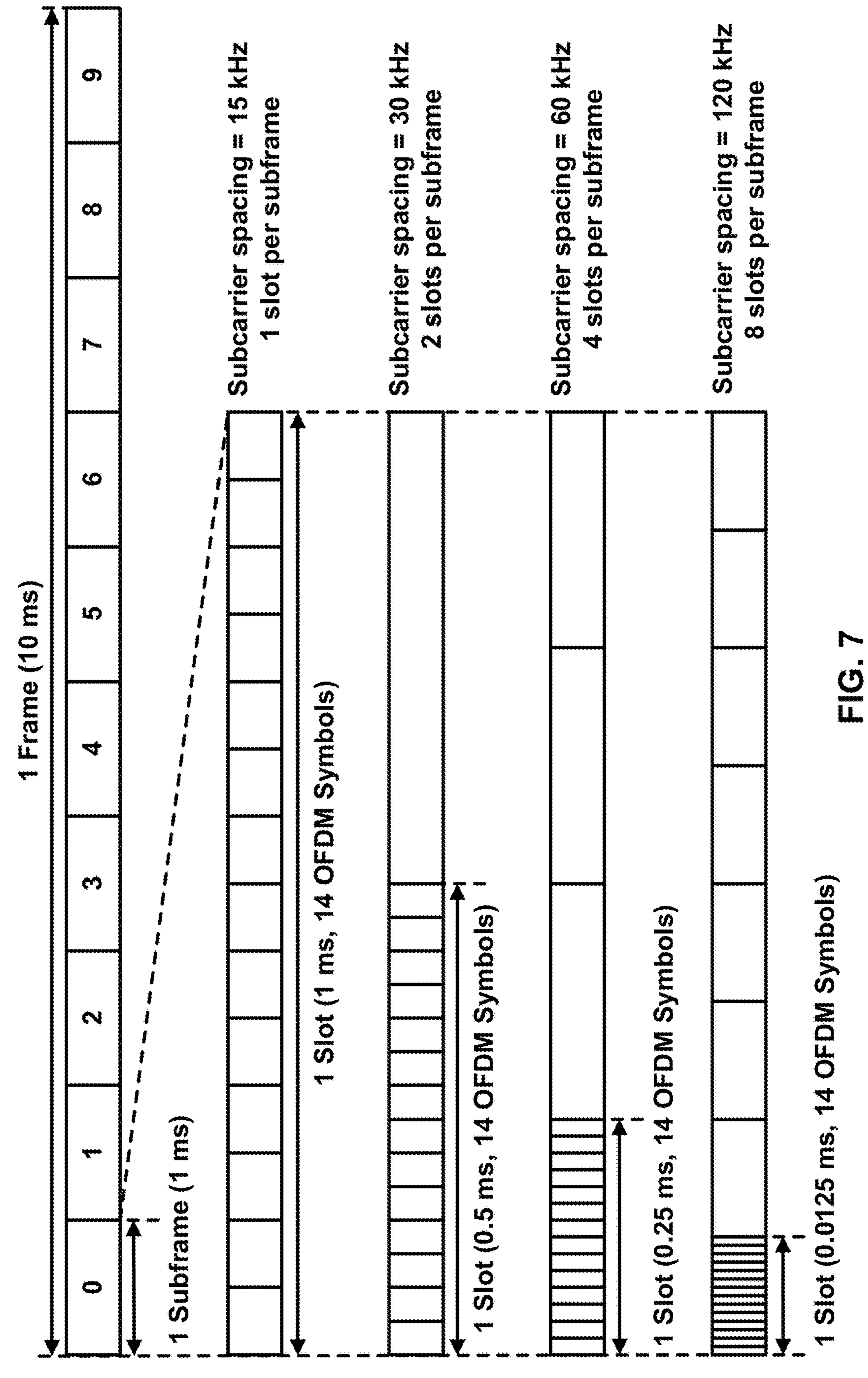
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
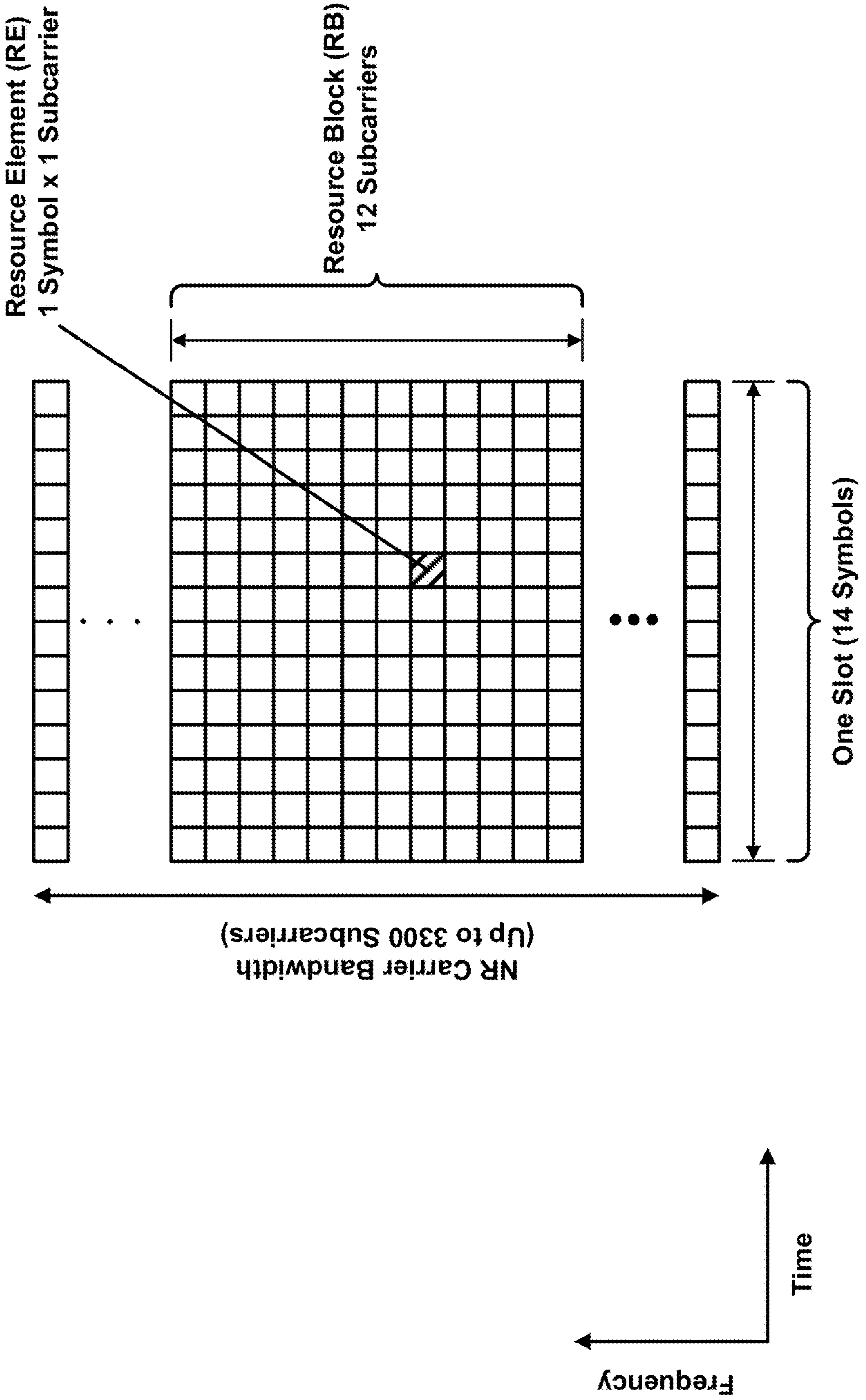
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
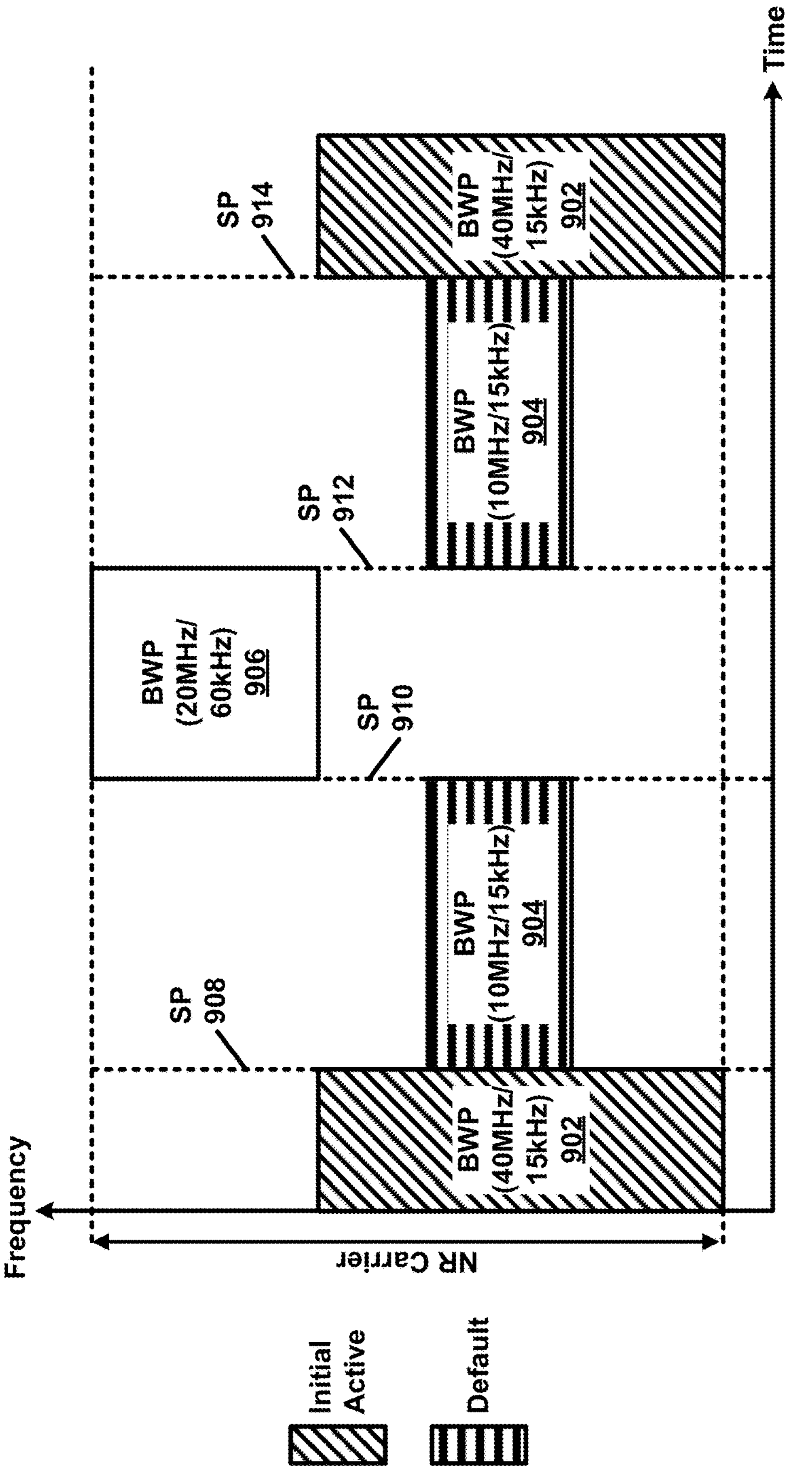
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, a based on (e.g., after or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
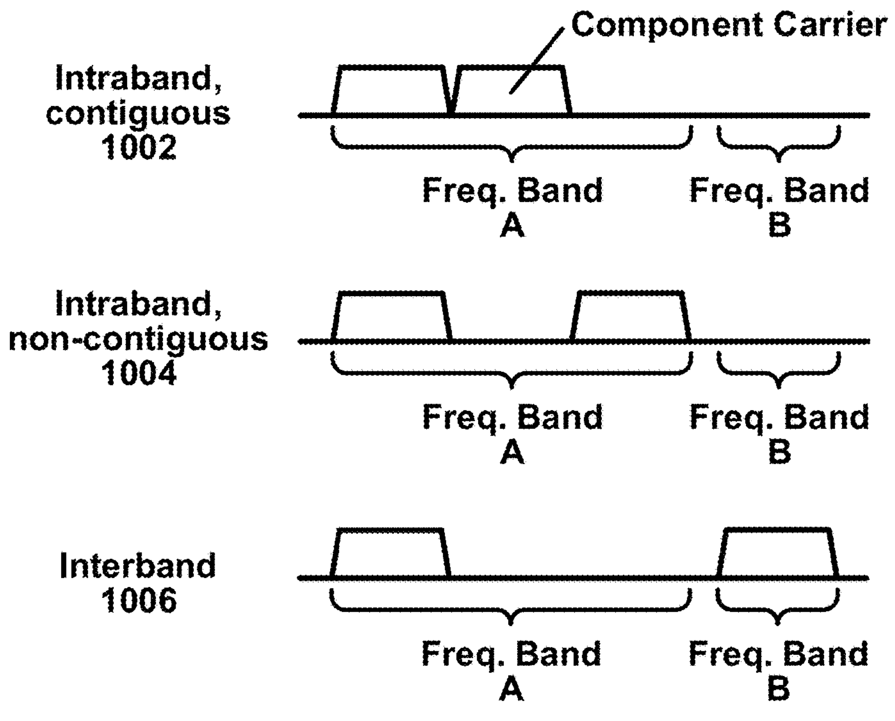
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
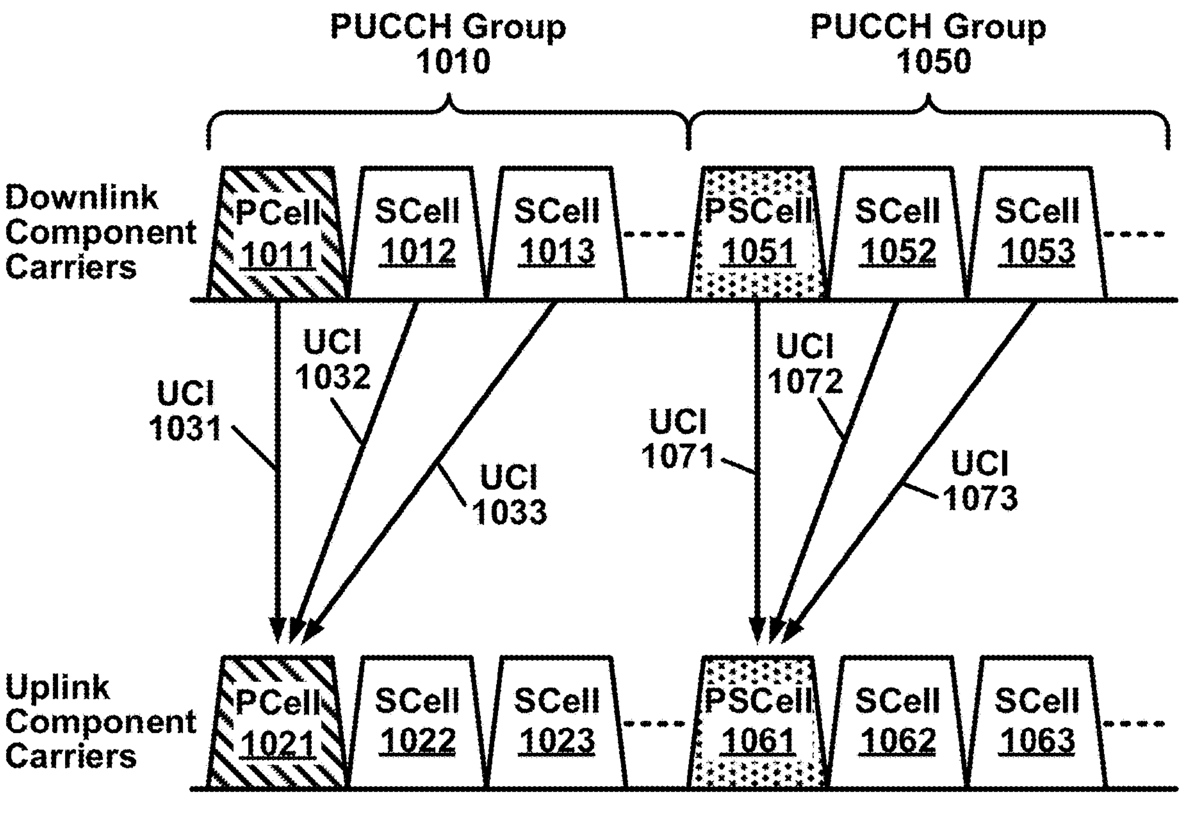
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
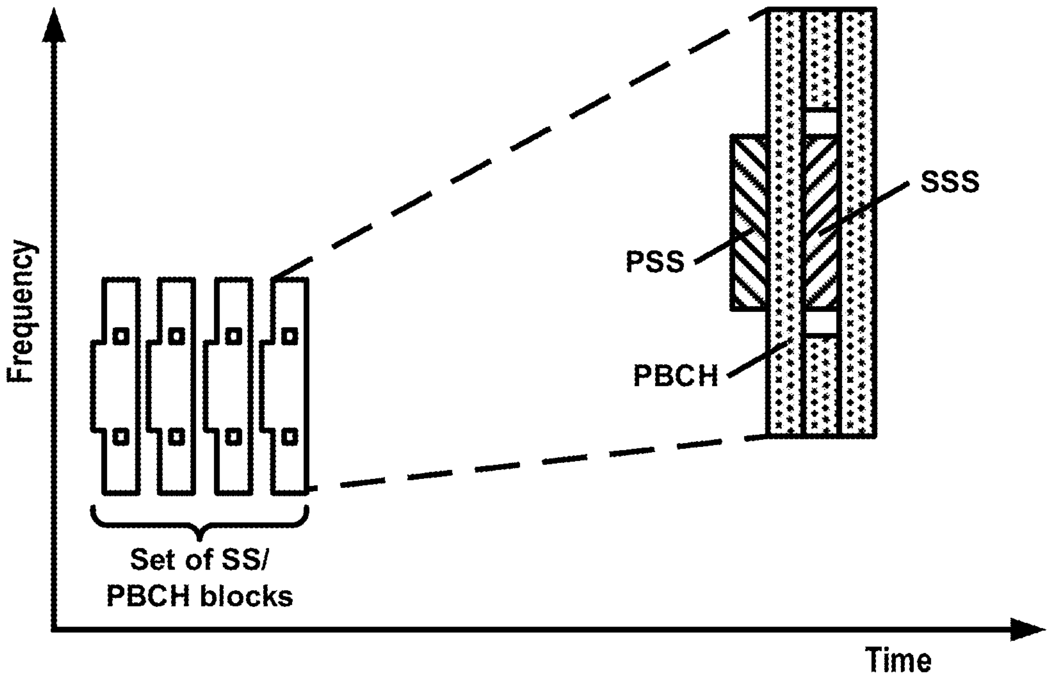
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RS s for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RS s for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RS s may be sent/transmitted by a base station and received/used by a wireless device for a channel estimation. The downlink DM-RS s may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A D M-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RS s for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RS s may be configured to send/transmit at one or more symbols of a PUSCH and/or a PUCCH. The base station may semi-statically configure the wireless device with a number/quantity (e.g., the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RS s (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
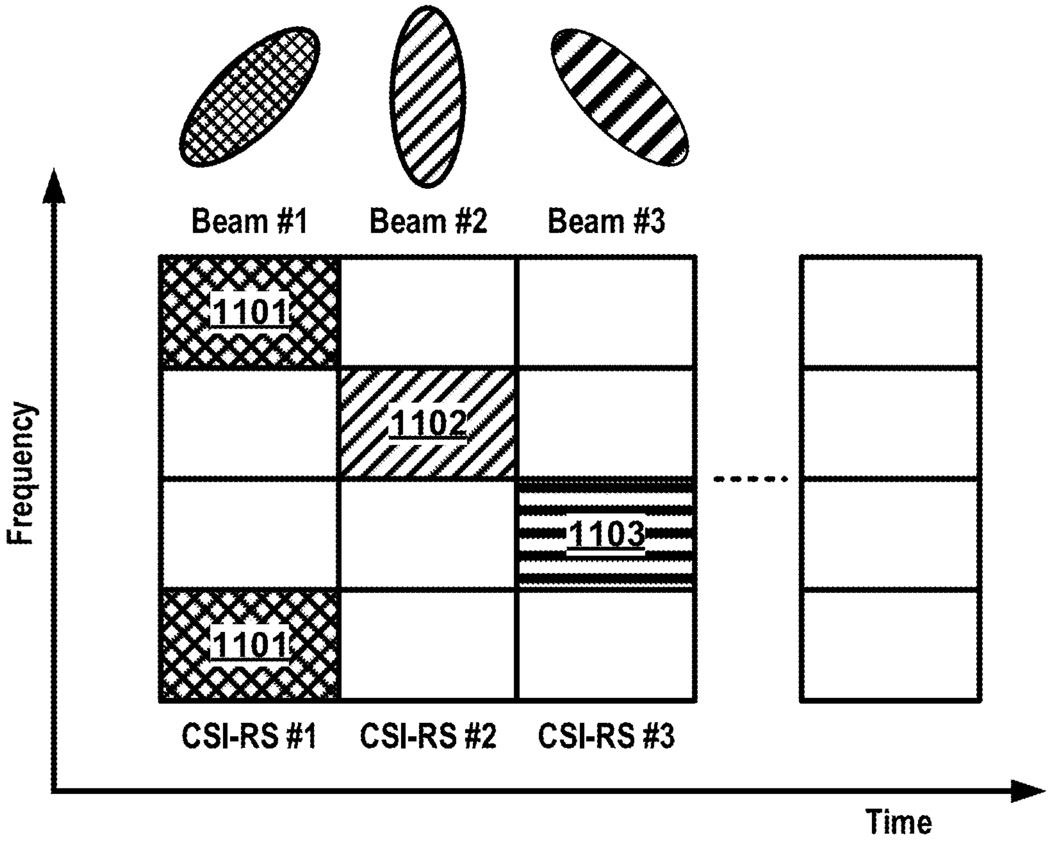
FIG. 11B shows an example mapping of one or more channel state information reference signals (CSI-RSs).

FIG. 11B shows an example mapping of one or more CSI-RSs. The CSI-RS s may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RS s. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RS s 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figure 12A:
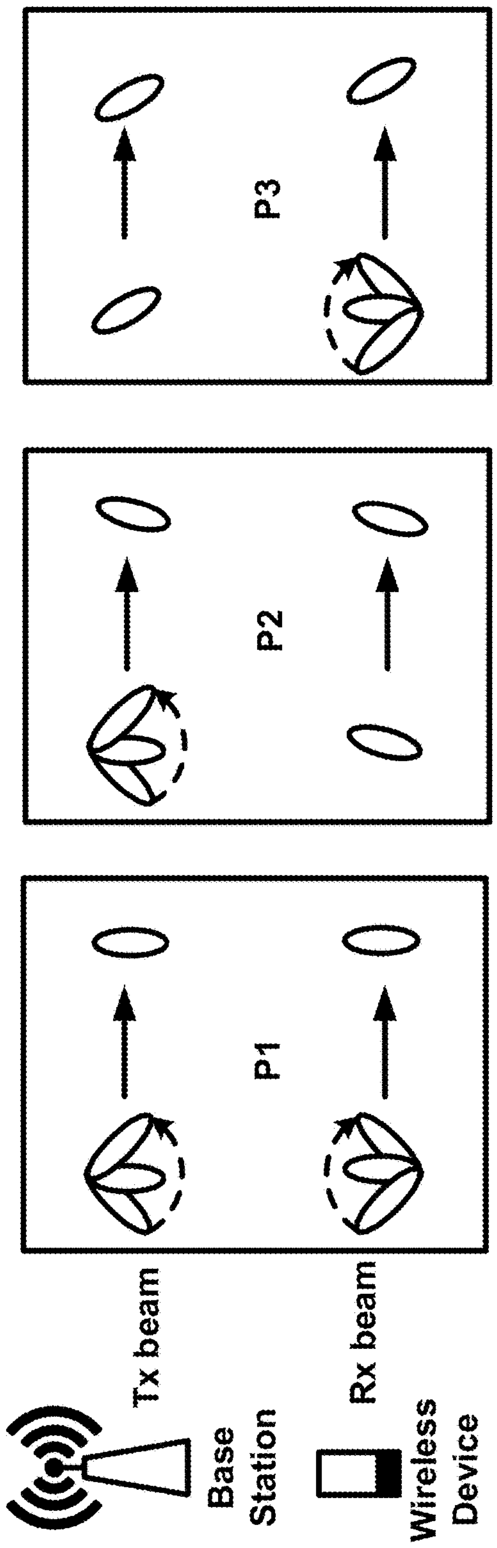
FIG. 12A shows examples of downlink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

Figure 12B:
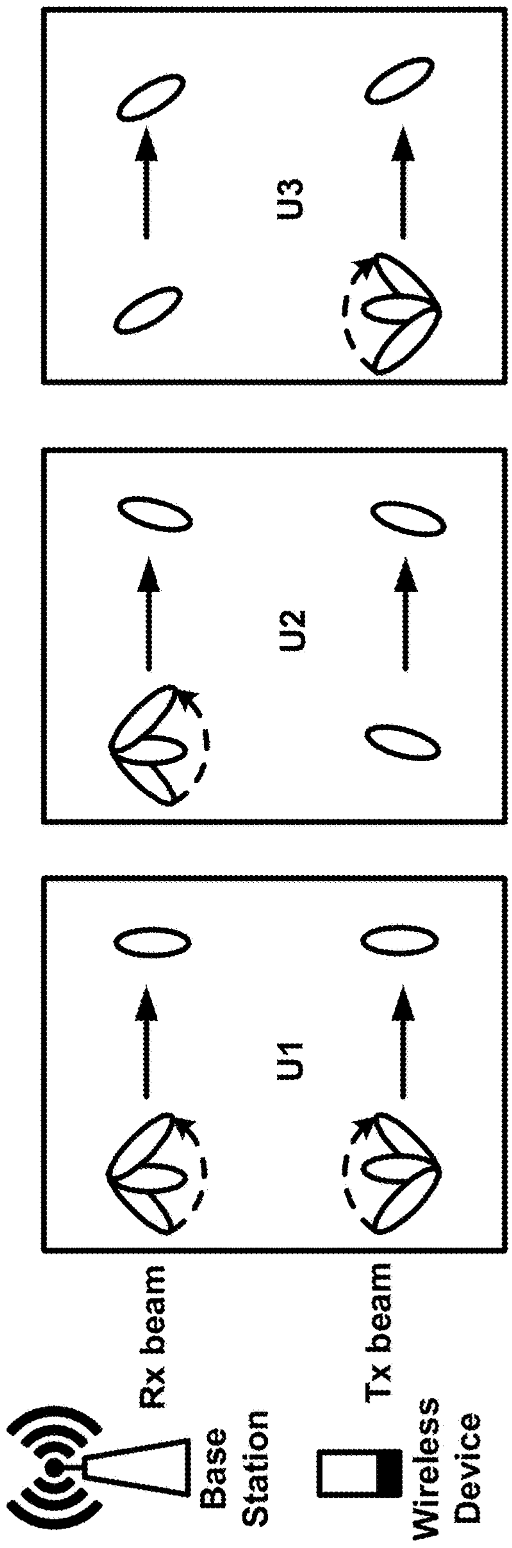
FIG. 12B shows examples of uplink beam management procedures.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RS s) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RS s of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIB s) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13A:
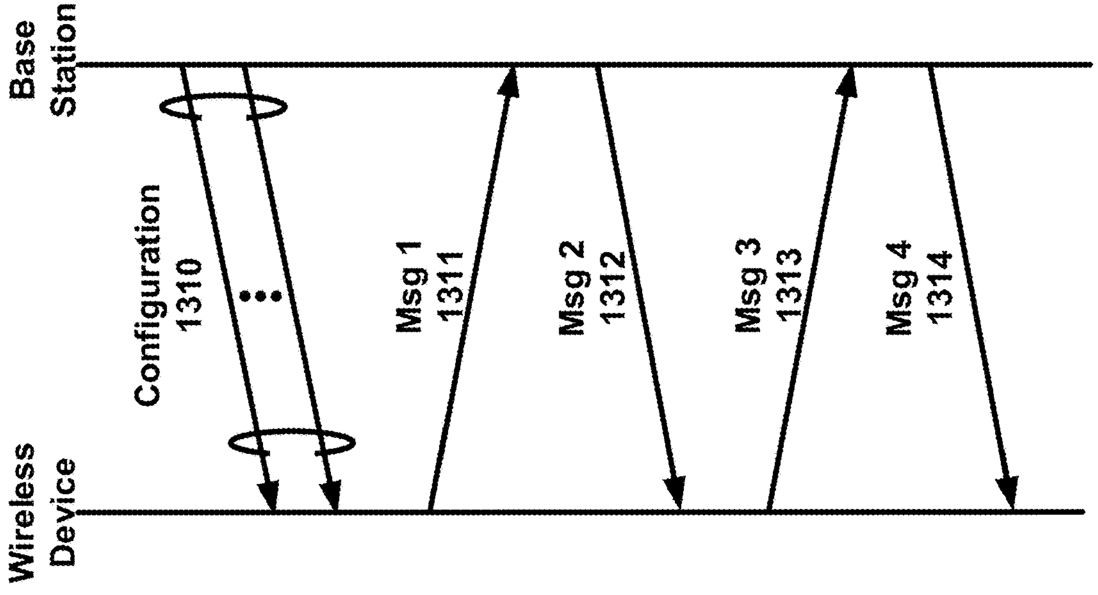
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg1 1311), a second message (e.g., Msg2 1312), a third message (e.g., Msg3 1313), and a fourth message (e.g., Msg4 1314). The first message (e.g., Msg1 1311) may comprise a preamble (or a random access preamble). The first message (e.g., Msg1 1311) may be referred to as a preamble. The second message (e.g., Msg2 1312) may comprise as a random access response (RAR). The second message (e.g., Msg2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg1 1311) and/or the third message (e.g., Msg3 1313). The wireless device may determine a reception timing and a downlink channel for receiving the second message (e.g., Msg2 1312) and the fourth message (e.g., Msg4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg1 1311) and/or third message (e.g., Msg3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg1 1311) and the third message (e.g., Msg3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RS s). The wireless device may determine the preamble to be comprised in first message (e.g., Msg1 1311), for example, based on the association if the association is configured. The first message (e.g., Msg1 1311) may be sent/transmitted to the base station via one or more PRACH occasions. The wireless device may use one or more reference signals (e.g., SSBs and/or CSI-RS s) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/ number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg2 1312) (e.g., received by the wireless device) may comprise an RAR. The second message (e.g., Msg2 1312) may comprise multiple RARs corresponding to multiple wireless devices. The second message (e.g., Msg2 1312) may be received, for example, based on (e.g., after or in response to) the sending/transmitting of the first message (e.g., Msg1 1311). The second message (e.g., Msg2 1312) may be scheduled on the DL-SCH and may be indicated by a PDCCH, for example, using a random access radio network temporary identifier (RA RNTI). The second message (e.g., Msg2 1312) may indicate that the first message (e.g., Msg1 1311) was received by the base station. The second message (e.g., Msg2 1312) may comprise a time-alignment command that may be used by the wireless device to adjust the transmission timing of the wireless device, a scheduling grant for transmission of the third message (e.g., Msg3 1313), and/or a Temporary Cell RNTI (TC-RNTI). The wireless device may determine/start a time window (e.g., ra-ResponseWindow) to monitor a PDCCH for the second message (e.g., Msg2 1312), for example, after sending/transmitting the first message (e.g., Msg1 1311) (e.g., a preamble). The wireless device may determine the start time of the time window, for example, based on a PRACH occasion that the wireless device uses to send/transmit the first message (e.g., Msg1 1311) (e.g., the preamble). The wireless device may start the time window one or more symbols after the last symbol of the first message (e.g., Msg1 1311) comprising the preamble (e.g., the symbol in which the first message (e.g., Msg1 1311) comprising the preamble transmission was completed or at a first PDCCH occasion from an end of a preamble transmission). The one or more symbols may be determined based on a numerology. The PDCCH may be mapped in a common search space (e.g., a Type 1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

RA-RNTI=1+s_id+14×t_id+14×80×f_id+14×80×8×ul_carrier_id where s_id may be an index of a first OFDM symbol of the PRACH occasion (e.g., $0 \leq s\_id < 14$), t_id may be an index of a first slot of the PRACH occasion in a system frame (e.g., $0 \leq t\_id < 80$), fid may be an index of the PRACH occasion in the frequency domain (e.g., $0 \leq f\_id < 8$), and ul_carrier_id may be a UL carrier used for a preamble transmission (e.g., 0 for an NUL carrier, and 1 for an SUL carrier).

The wireless device may send/transmit the third message (e.g., Msg3 1313), for example, based on (e.g., after or in response to) a successful reception of the second message (e.g., Msg2 1312) (e.g., using resources identified in the Msg2 1312). The third message (e.g., Msg3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg3 1313) and the fourth message (e.g., Msg4 1314)) may be used to increase the likelihood that the wireless device does not incorrectly use an identity of another the wireless device. The wireless device may comprise a device identifier in the third message (e.g., Msg3 1313) (e.g., a C-RNTI if assigned, a TC RNTI comprised in the second message (e.g., Msg2 1312), and/or any other suitable identifier), for example, to perform contention resolution.

The fourth message (e.g., Msg4 1314) may be received, for example, based on (e.g., after or in response to) the sending/transmitting of the third message (e.g., Msg3 1313). The base station may address the wireless on the PDCCH (e.g., the base station may send the PDCCH to the wireless device) using a C-RNTI, for example, If the C-RNTI was included in the third message (e.g., Msg3 1313). The random access procedure may be determined to be successfully completed, for example, if the unique C RNTI of the wireless device is detected on the PDCCH (e.g., the PDCCH is scrambled by the C-RNTI). fourth message (e.g., Msg4 1314) may be received using a DL-SCH associated with a TC RNTI, for example, if the TC RNTI is comprised in the third message (e.g., Msg3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg1 1311) and/or the third message (e.g., Msg 3 1313)) may remain on, or may be performed via, the selected carrier. The wireless device may switch an uplink carrier during the random access procedure (e.g., between the Msg1 1311 and the Msg3 1313). The wireless device may determine and/or switch an uplink carrier for the first message (e.g., Msg1 1311) and/or the third message (e.g., Msg3 1313), for example, based on a channel clear assessment (e.g., a listen-before-talk).

Figure 13B:
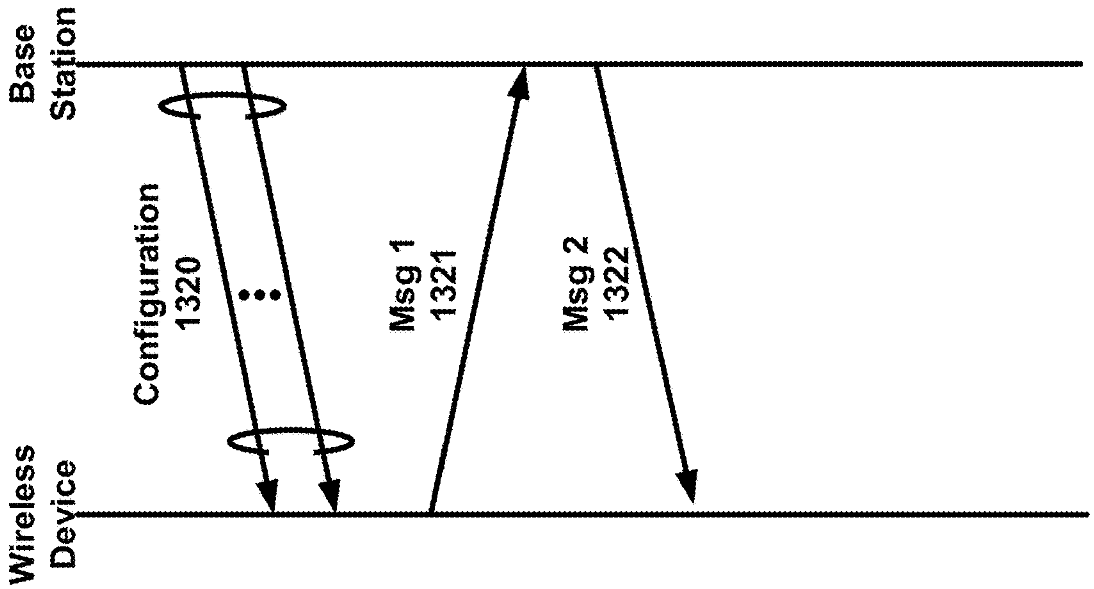
FIG. 13B shows an example two-step random access procedure.

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg1 1321) and a second message (e.g., Msg2 1322). The first message (e.g., Msg1 1321) and the second message (e.g., Msg2 1322) may be analogous in some respects to the first message (e.g., Msg1 1311) and a second message (e.g., Msg2 1312), respectively. The two-step contention-free random access procedure may not comprise messages analogous to the third message (e.g., Msg3 1313) and/or the fourth message (e.g., Msg4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg1 1321) and receiving a corresponding second message (e.g., Msg2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

Figure 13C:
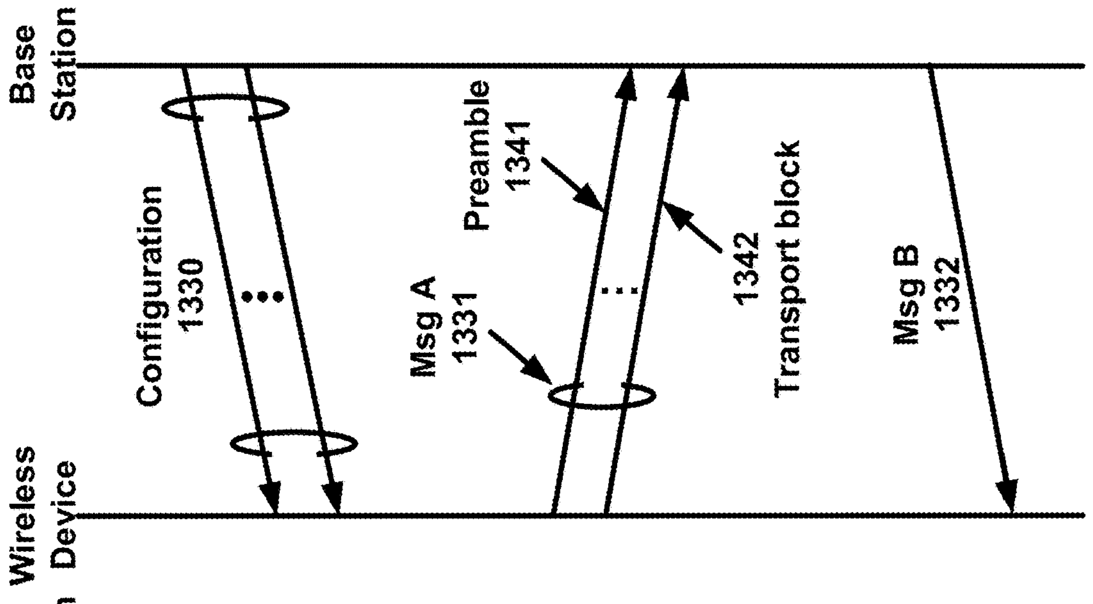
FIG. 13C shows an example two-step random access procedure.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg2 1312) (e.g., an RAR shown in FIGS. 13A), the contents of the second message (e.g., Msg2 1322) (e.g., an RAR shown in FIG. 13B) and/or the fourth message (e.g., Msg4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332)

corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg3 analogous to the Msg3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
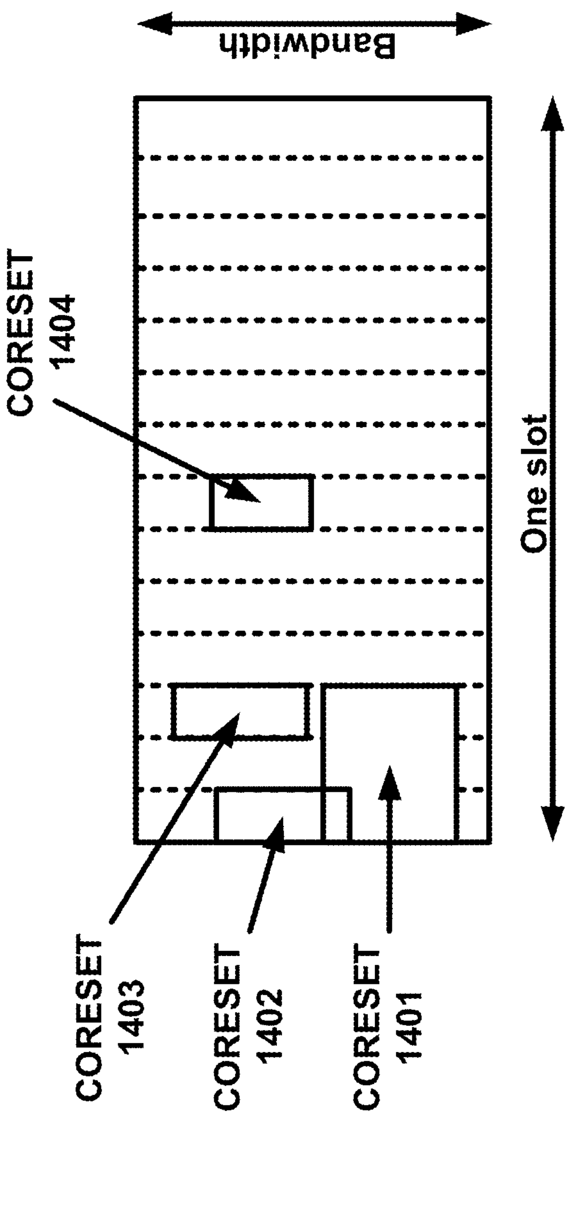
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
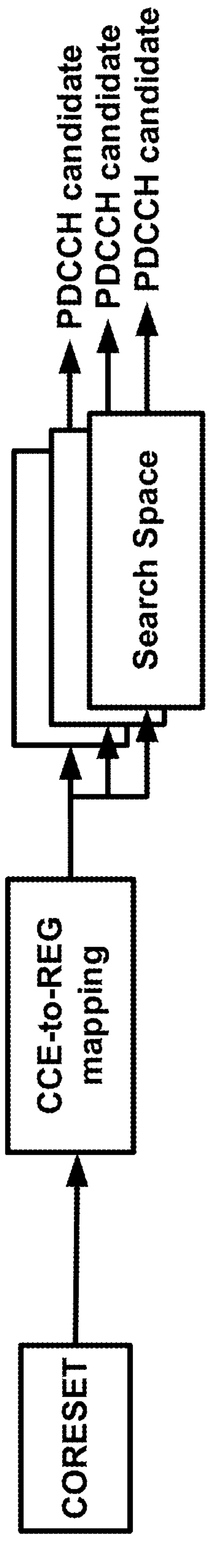
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to “0,” for example, if the total bit length of UCI information bits is two or fewer. The wireless device may select a second PUCCH resource set having a PUCCH resource set index equal to “1,” for example, if the total bit length of UCI information bits is greater than two and less than or equal to a first configured value. The wireless device may select a third PUCCH resource set having a PUCCH resource set index equal to “2,” for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
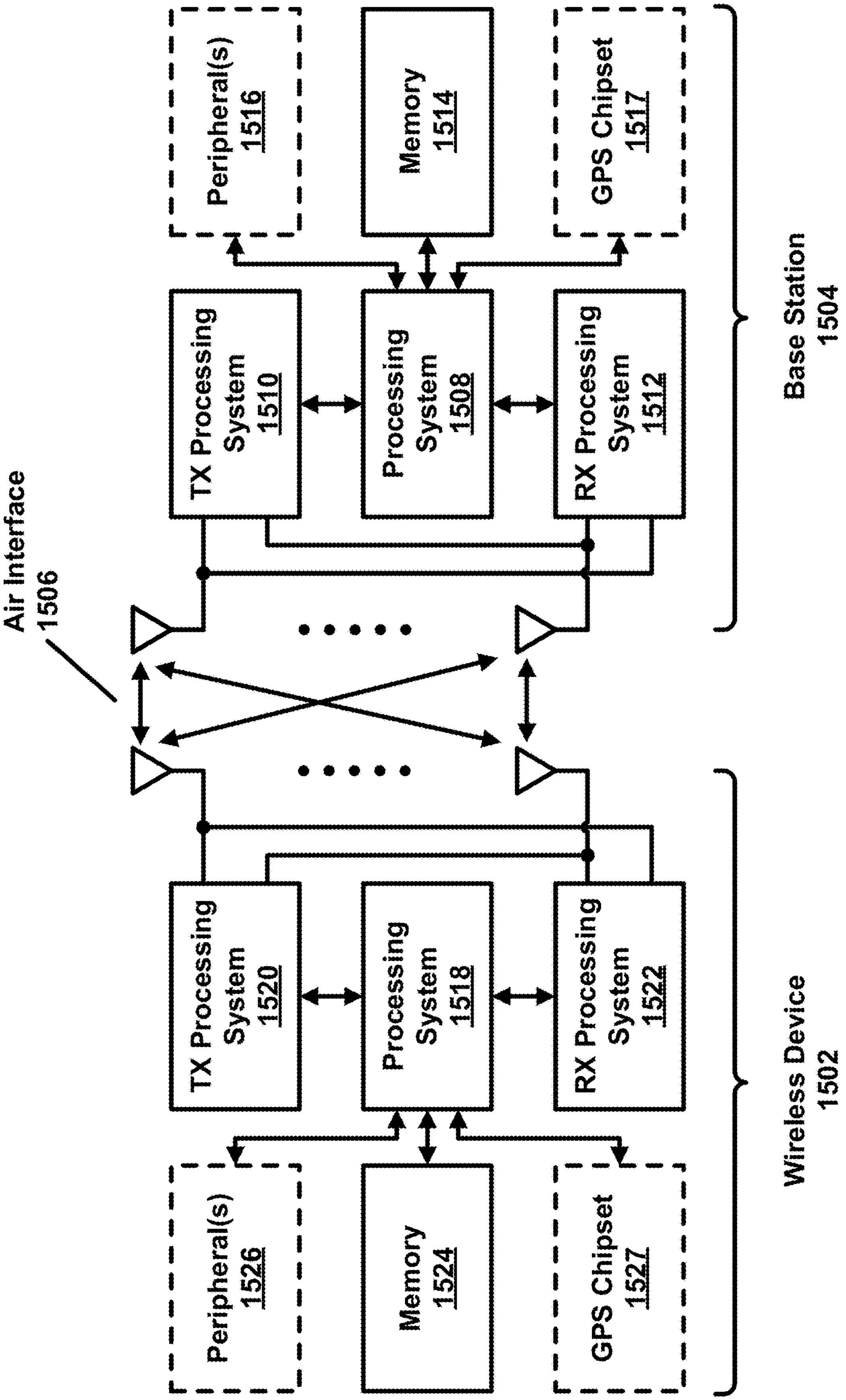
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
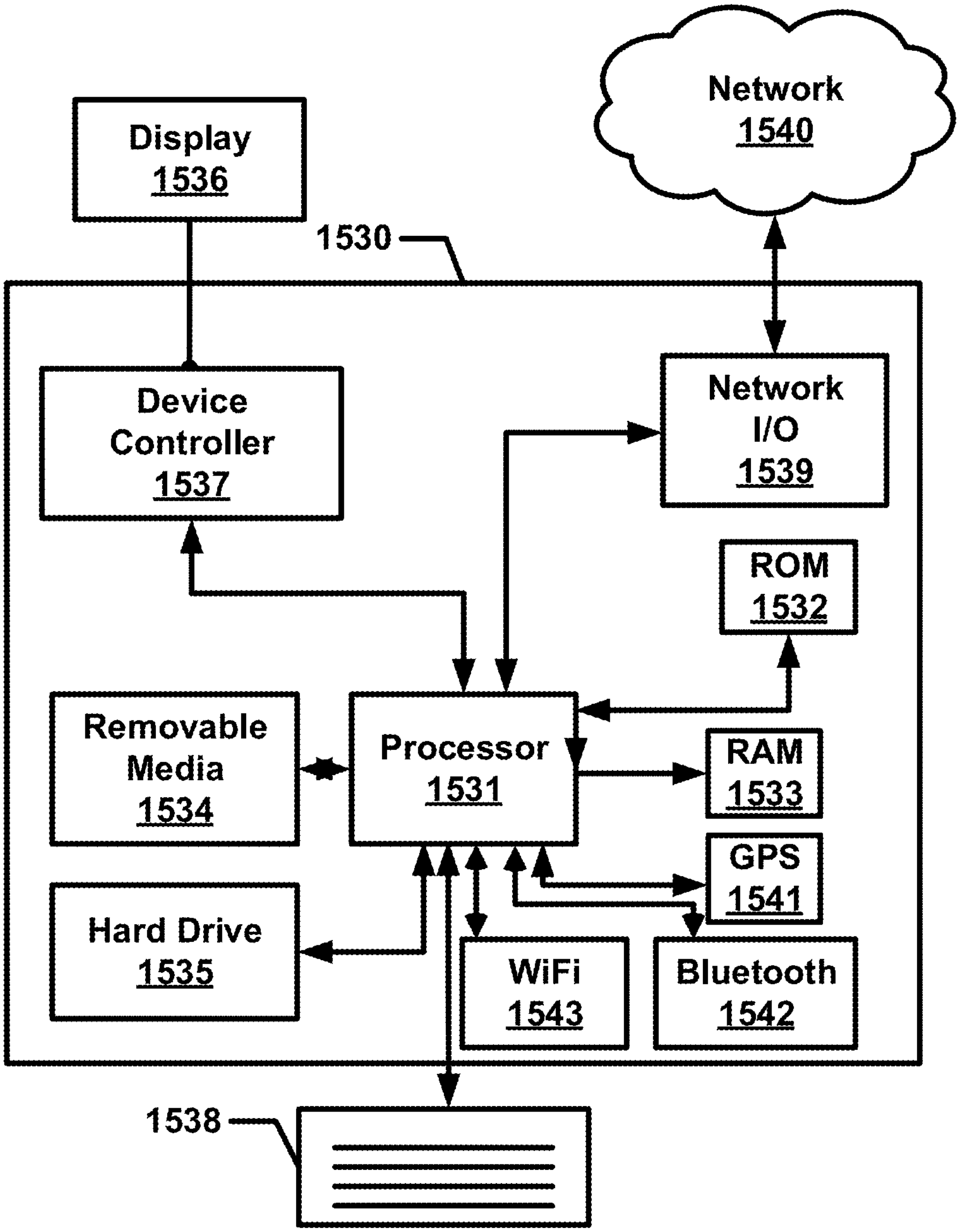
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, 1502, 3210, 3220, 3310, 3320, and/or 3330, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figure 16A:
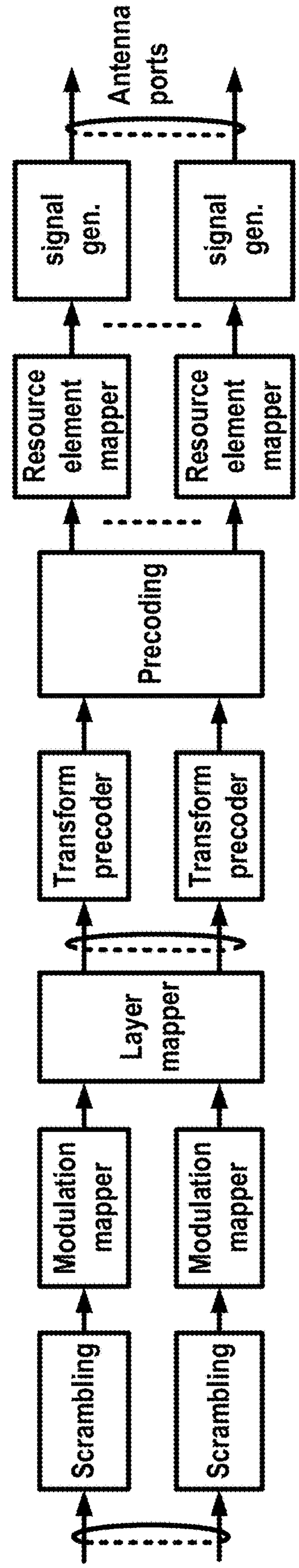
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

Figure 16B:
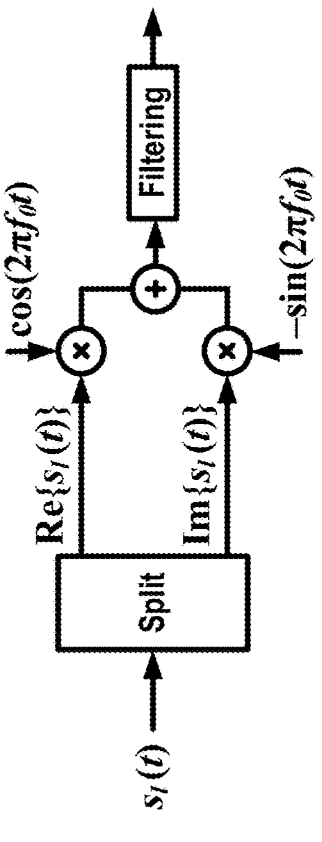

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

Figure 16D:
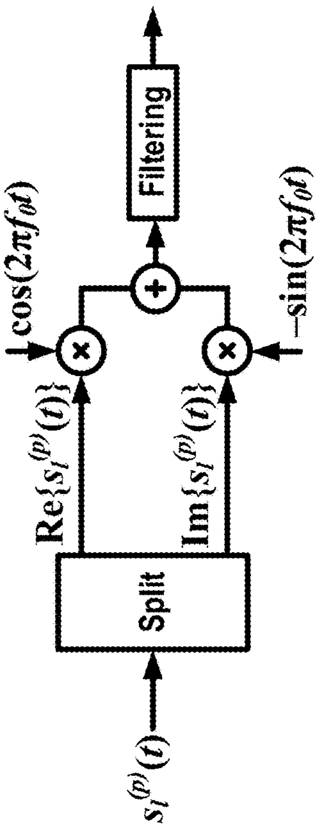
Figure 16C:
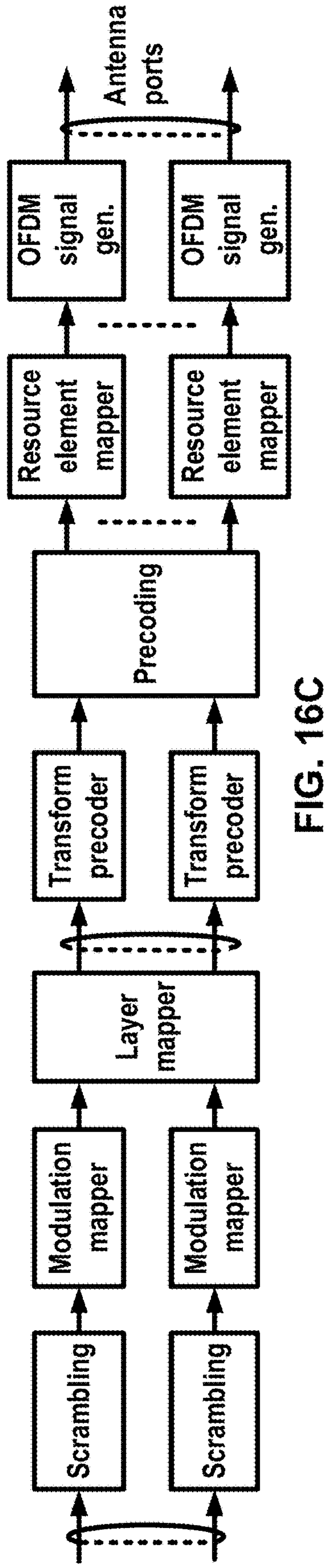

FIG. 16C shows an example structure for downlink transmissions. Processing of a baseband signal representing a physical downlink channel may comprise/perform one or more functions. The one or more functions may comprise:

scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, after it is started and continue running until it is stopped or until it expires. A timer may be started, for example, if it is not running or restarted if it is running. A timer may be associated with a value (e.g., the timer may be started or restarted from a value or may be started from zero and expire after it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Figure 17:
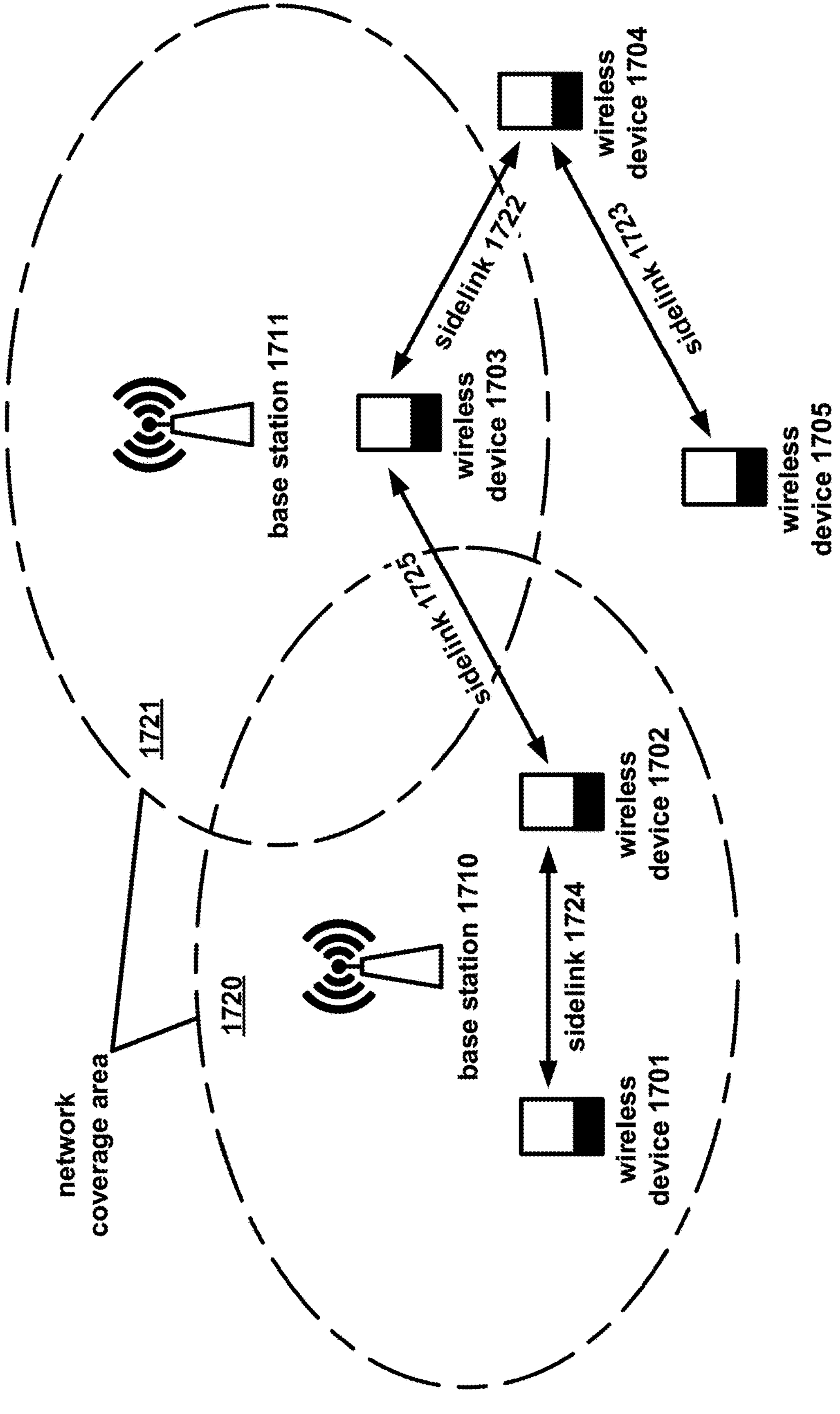
FIG. 17 shows an example of wireless communications.

FIG. 17 shows an example of wireless communications. There may be a direct communication between wireless devices, for example, in wireless communication (e.g., sidelink communications, device-to-device (D2D) communications, vehicle-to-everything (V2X) communications, etc.). The direct communication may be performed via a communications link, such as a sidelink (SL) or any other link. The wireless devices may exchange communications, such as sidelink communications, via an interface such as a sidelink interface (e.g., a PC5 interface). The direct communications, such as sidelink communications, may differ from uplink communications (e.g., in which a wireless device may communicate to a base station) and/or downlink communications (e.g., in which a base station may communicate to a wireless device). Reference made herein to sidelink, SL, and/or to sidelink communications may comprise any link and/or any link communications, including, for example, any direct link and/or any direct link communications between any user devices (e.g., wireless devices, user devices, user equipments, etc.). Although sidelink is used as an example, one skilled in the art will appreciate that any communications can use these concepts. A wireless device and a base station may exchange uplink and/or downlink communications via an interface, such as a user plane interface (e.g., a Uu interface).

A first wireless device (e.g., a wireless device 1701) and a second wireless device (e.g., a wireless device 1702) may be in a first coverage area (e.g., a coverage area 1720) of a first base station (e.g., a base station 1710). The first wireless device and the second wireless device may communicate with the first base station, for example, via a Uu interface. The coverage area may comprise any quantity of wireless devices that may communicate with the base station. A third wireless device (e.g., a wireless device 1703) may be in a second coverage area (e.g., a coverage area 1721) of a second base station (e.g., a base station 1711). The second coverage area may comprise any quantity of wireless devices that may communicate with the second base station. The first base station and the second base station may share a network and/or may jointly establish/provide a network coverage area (e.g., 1720 and 1721). A fourth wireless device (e.g., a wireless device 1704) and a fifth wireless device (e.g., a wireless device 1705) may be outside of the network coverage area (e.g., 1720 and 1721). Any quantity of wireless devices that may be outside of the network coverage area (e.g., 1720 and 1721).

Wireless communications may comprise in-coverage D2D communication. In-coverage D2D communication may be performed, for example, if two or more wireless devices share a network coverage area. The first wireless device and the second wireless device may be in the first coverage area of the first base station. The first wireless device and the second wireless device may perform a direct communication (e.g., an in-coverage intra-cell direct communication via a sidelink 1724). The second wireless device and the third wireless device may be in the coverage areas of different base stations (e.g., 1710 and 1711) and/or may share the same network coverage area (e.g., 1720 and/or 1721). The second wireless device and the third wireless device may perform a direct communication (e.g., an in-coverage inter-cell direct communication via a sidelink 1725). Partial-coverage direct communications (e.g., partial-coverage D2D communications, partial-coverage V2X communications, partial-coverage sidelink communications, etc.) may be performed. Partial-coverage direct communications may be performed, for example, if one wireless device is within the network coverage area and the other wireless device is outside the network coverage area. The third wireless device and the fourth wireless device may perform a partial-coverage direct communication (e.g., via a sidelink 1722). Out-of-coverage direct communications may be performed. Out-of-coverage direct communications may be performed, for example, if both wireless devices are outside of a network coverage area. The fourth wireless device and the fifth wireless device may perform an out-of-coverage direct communication (e.g., via a sidelink 1723).

Wireless communications, such as sidelink communications, may be configured using physical channels. Wireless communications, such as sidelink communications, may be configured using physical channels, for example, a physical sidelink broadcast channel (PSBCH), a physical sidelink feedback channel (PSFCH), a physical sidelink discovery channel (PSDCH), a physical sidelink control channel (PSCCH), and/or a physical sidelink shared channel (PSSCH). PSBCH may be used by a first wireless device to send broadcast information to a second wireless device. A PSBCH may be similar in some respects to a PBCH. The broadcast information may comprise a slot format indication, resource pool information, a sidelink system frame number, and/or any other suitable broadcast information. A PSFCH may be used by a first wireless device to send feedback information to a second wireless device. The feedback information may comprise HARQ feedback information. A PSDCH may be used by a first wireless device to send discovery information to a second wireless device. The discovery information may be used by a wireless device to signal its presence and/or the availability of services to other wireless devices in the area. A PSCCH may be used by a first wireless device to send sidelink control information (SCI) to a second wireless device. A PSCCH may be similar in some respects to PDCCH and/or PUCCH. The control information may comprise time/frequency resource allocation information (e.g., RB size, a number of retransmissions, etc.), demodulation related information (e.g., DM-RS, MCS, redundancy version (RV), etc.), identifying information for a sending (e.g., transmitting) wireless device and/or a receiving wireless device, a process identifier (e.g., HARQ, etc.), and/or any other suitable control information. The PSCCH may be used to allocate, prioritize, and/or reserve sidelink resources for sidelink transmissions. PSSCH may be used by a first wireless device to send and/or relay data and/or network information to a second wireless device. PSSCH may be similar in some respects to PDSCH and/or PUSCH. A sidelink channel may be associated with one or more demodulation reference signals. For example, each of the sidelink channels may be associated with one or more demodulation reference signals. Sidelink operations may utilize sidelink synchronization signals to establish a timing of sidelink operations. Wireless devices configured for sidelink operations may send sidelink synchronization signals, for example, with the PSBCH. The sidelink synchronization signals may include primary sidelink synchronization signals (PSSS) and/or secondary sidelink synchronization signals (SSSS).

A wireless device may be configured with wireless resources (e.g., sidelink resources). A wireless device may be configured (e.g., pre-configured) for a sidelink. A wireless device may be configured (e.g., pre-configured) with sidelink resource information. A network may broadcast system information relating to a resource pool for a sidelink. A network may configure a particular wireless device with a dedicated sidelink configuration. The configuration may identify/indicate sidelink resources to be used for sidelink operation (e.g., configure a sidelink band combination).

A wireless device may operate in one or more (e.g., different) modes. The wireless device may operate in an assisted mode (e.g., mode 1) and/or an autonomous mode (e.g., mode 2). Mode selection may be based on a coverage status of the wireless device, a radio resource control status of the wireless device, information and/or instructions from the network, and/or any other suitable factors. The wireless device may select to operate in autonomous mode. The wireless device may select to operate in autonomous mode, for example, if the wireless device is idle or inactive, or if the wireless device is outside of network coverage. The wireless device may select to operate (or be instructed by a base station to operate) in an assisted mode. The wireless device may select to operate (or be instructed by a base station to operate) in an assisted mode, for example, if the wireless device is in a connected mode (e.g., connected to a base station). The network (e.g., a base station) may instruct a connected wireless device to operate in a particular mode.

The wireless device may request scheduling from the network. The wireless device may request scheduling from the network, for example, in an assisted mode. The wireless device may send a scheduling request to the network and the network may allocate sidelink resources to the wireless device. Assisted mode may be referred to as network-assisted mode, gNB-assisted mode, or a base station-assisted mode. The wireless device may select sidelink resources. The wireless device may select sidelink resources, for example, in an autonomous mode. The wireless device may select sidelink resources, for example, based on measurements within one or more resource pools (e.g., pre-configured resource pools, network-assigned resource pools), sidelink resource selections made by other wireless devices, and/or sidelink resource usage of other wireless devices.

A wireless device may use a sensing window. A wireless device may use a selection window. A wireless device may use a sensing window and/or a selection window, for example, to determine/select sidelink resources. The wireless device may receive/determine SCI sent (e.g., transmitted) by other wireless devices using a sidelink resource pool. The wireless device may receive/determine SCI sent (e.g., transmitted) by other wireless devices using the sidelink resource pool, for example, in the sensing window. The SCIs may identify/determine resources that may be used and/or reserved for sidelink transmissions. The wireless device may determine/select resources within the selection window (e.g., resources that are different from the resources identified in the SCIs). The wireless device may determine/select resources within the selection window, for example, based on the resources identified in the SCIs. The wireless device may send (e.g., transmit) using the selected sidelink resources.

Figure 18:
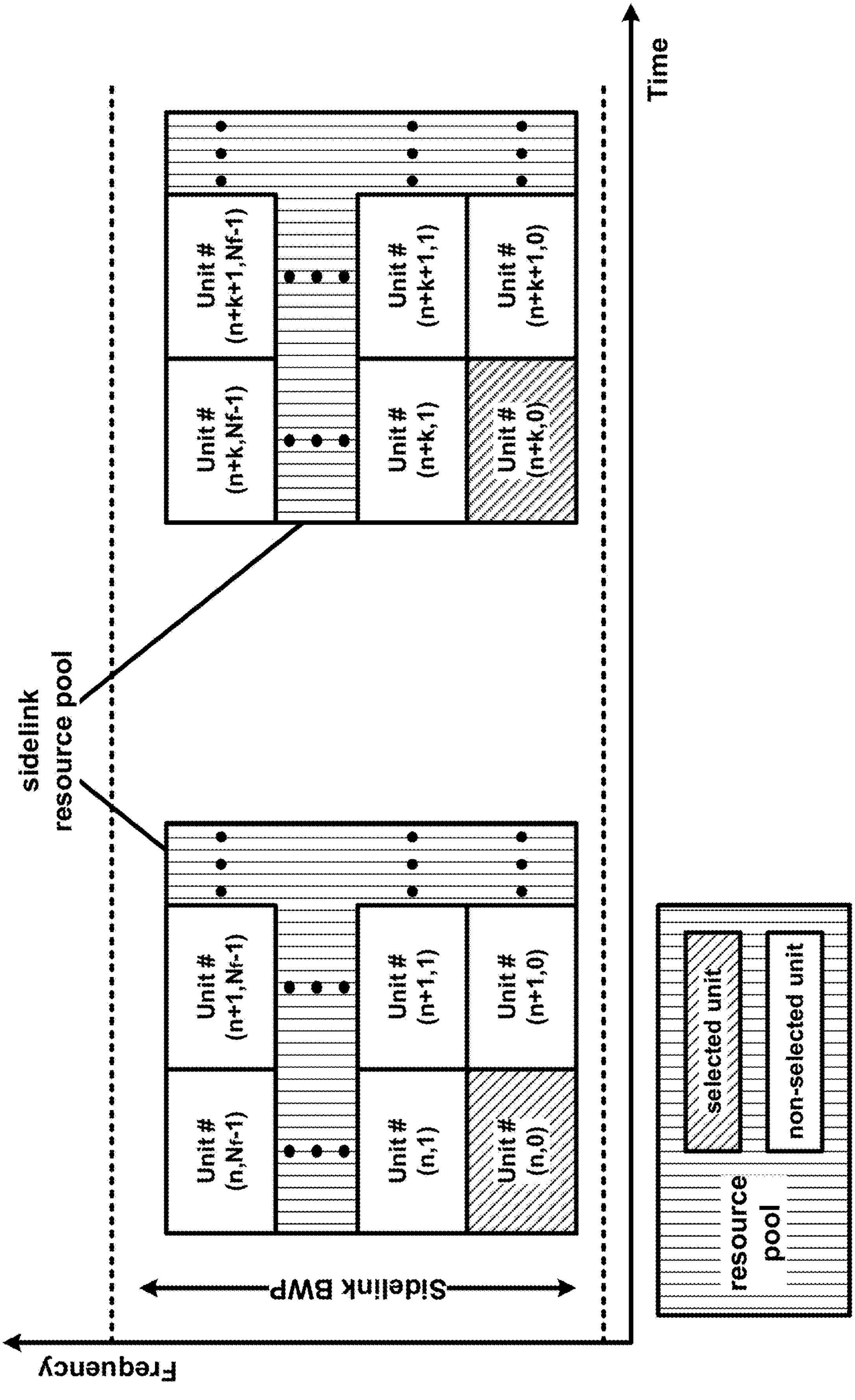
FIG. 18 shows an example of a resource pool for communication link (e.g., a sidelink).

FIG. 18 shows an example of a resource pool for sidelink operations. A wireless device may operate using one or more sidelink cells. A sidelink cell may include one or more resource pools. A resource pool (e.g., each resource pool) may be configured to operate in accordance with a particular mode (e.g., assisted mode, autonomous mode, and/or any other mode). The resource pool may be divided into one or more resource units (e.g., one or more resources). Each resource unit may comprise one or more resource blocks. Each resource unit may comprise one or more resource blocks, for example, in the frequency domain. Each resource unit may comprise one or more resource blocks, for example, which may be referred to as a sub-channel. Each resource unit may comprise one or more slots, one or more subframes, and/or one or more OFDM symbols. Each resource unit may comprise one or more slots, one or more subframes, and/or one or more OFDM symbols, for example, in the time domain. The resource pool may be continuous or non-continuous in the frequency domain and/or the time domain (e.g., comprising contiguous resource units or non-contiguous resource units). The resource pool may be divided into repeating resource pool portions. The resource pool may be shared among one or more wireless devices. Each wireless device may attempt to send (e.g., transmit) using different resource units, for example, to avoid collisions.

A resource pool (e.g., a sidelink resource pool) may be arranged in any suitable manner. The resource pool may be non-contiguous in the time domain and/or confined to a single sidelink BWP, for example, as shown in FIG. 18. Frequency resources may be divided into Nf resource units per unit of time, for example, as shown in FIG. 18. Frequency resources may be numbered from zero to Nf-1, for example, as shown in FIG. 18. The example resource pool may comprise a plurality of portions (e.g., non-contiguous portions) that may repeat every k units of time. Time resources may be numbered as n, n+1 . . . n+k, n+k+1 . . . , etc., for example, as shown in FIG. 18.

A wireless device may determine/select for transmission one or more resource units from a resource pool. The wireless device may select resource unit (n,0) for sidelink transmission. The wireless device may determine/select periodic resource units in later portions of the resource pool, for example, resource unit (n+k,0), resource unit (n+2k,0), resource unit (n+3k,0), etc. The wireless device may determine/select periodic resource units, for example, based on a determination that a transmission using resource unit (n,0) will not (or is not likely) to collide with a sidelink transmission of a wireless device that shares the sidelink resource pool. The determination may be based on behavior of other wireless devices that share the resource pool. The wireless device may select resource unit (n,0), resource (n+k,0), etc., for example, if no sidelink transmissions are detected in resource unit (n−k,0). The wireless device may avoid selection of resource unit (n,1), resource (n+k,1), etc., for example, if a sidelink transmission from another wireless device is detected in resource unit (n−k,1).

Different sidelink physical channels may use different resource pools. PSCCH may use a first resource pool and PSSCH may use a second resource pool. Different resource priorities may be associated with different resource pools. Data associated with a first QoS, service, priority, and/or other characteristic may use a first resource pool and data associated with a second QoS, service, priority, and/or other characteristic may use a second resource pool. A network (e.g., a base station) may configure a priority level for each resource pool, a service to be supported for each resource pool, etc. A network (e.g., a base station) may configure a first resource pool for use by unicast wireless devices (e.g., UEs), a second resource pool for use by groupcast wireless devices (e.g., UEs), etc. A network (e.g., a base station) may configure a first resource pool for transmission of sidelink data, a second resource pool for transmission of discovery messages, etc.

A direct communication between wireless devices may include vehicle-to-everything (V2X) communications. In vehicle-to-everything (V2X) communications via a Uu interface and/or a PC5 interface, the V2X communications may be vehicle-to-vehicle (V2V) communications. The wireless device in the V2V communications may be a vehicle. The V2X communications may be vehicle-to-pedestrian (V2P) communications. A wireless device in the V2P communications may be a pedestrian equipped with a mobile phone (e.g., a handset). The V2X communications may be vehicle-to-infrastructure (V2I) communications. The infrastructure in the V2I communications may be a base station, an access point, a node, and/or a road side unit. A wireless device in the V2X communications may be a sending (e.g., transmitting) wireless device performing one or more sidelink transmissions with a receiving wireless device. The wireless device in the V2X communications may be a receiving wireless device that receives one or more sidelink transmissions from a sending (e.g., transmitting) wireless device.

Figure 19:
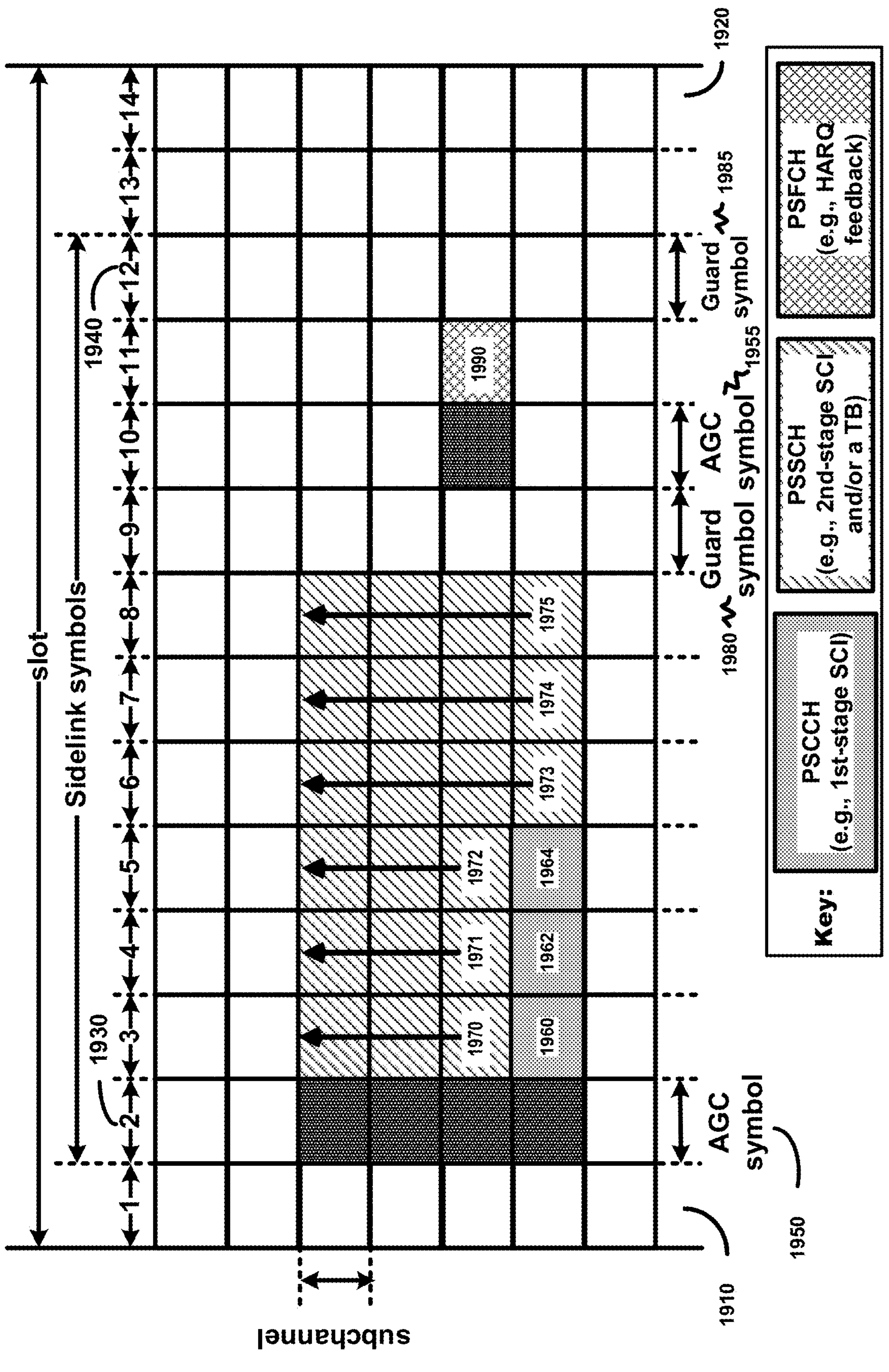
FIG. 19 shows an example of sidelink symbols in a slot.

FIG. 19 shows an example of sidelink symbols in a slot. A sidelink transmission may be sent (e.g., transmitted) in a slot in the time domain. A wireless device may send (e.g., transmit) data via sidelink. The wireless device may segment the data into one or more transport blocks (TBs). The one or more TBs may comprise different pieces of the data. A TB of the one or more TBs may be a data packet of the data. The wireless device may send (e.g., transmit) the TB (e.g., the data packet) of the one or more TBs via one or more sidelink transmissions (e.g., via PSCCH and/or PSSCH in one or more slots). A sidelink transmission (e.g., occupying a slot) may comprise SCI. The sidelink transmission may further comprise a TB. The SCI may comprise a $1^{st}$-stage SCI and/or a $2^{nd}$-stage SCI. A PSCCH of the sidelink transmission may comprise the $1^{st}$-stage SCI for scheduling a PSSCH (e.g., the TB). The PSSCH of the sidelink transmission may comprise the $2^{nd}$-stage SCI. The PSSCH of the sidelink transmission may further comprise the TB. Sidelink symbols in a slot may or may not start from the first symbol of the slot 1910. The sidelink symbols in the slot may or may not end at the last symbol of the slot 1920. Sidelink symbols in a slot may start from the second symbol of the slot 1930. The sidelink symbols in the slot may end at the twelfth symbol of the slot 1940. A first sidelink transmission may comprise a first automatic gain control (AGC) symbol 1950 (e.g., the second symbol in the slot 1930), a PSCCH 1960-1964 (e.g., in the third, fourth and the fifth symbols in a subchannel in the slot), a PSSCH 1970-1975 (e.g., from the third symbol to the eighth symbol in the slot), and/or a first guard symbol 1980 (e.g., the ninth symbol in the slot). A second sidelink transmission may comprise a second AGC symbol 1955 (e.g., the tenth symbol in the slot), a PSFCH 1990 (e.g., the eleventh symbol in the slot), and/or a second guard symbol 1985 for the second sidelink transmission (e.g., the twelfth symbol in the slot). One or more HARQ feedbacks (e.g., a positive acknowledgement or ACK and/or a negative acknowledgement or NACK) may be sent (e.g., transmitted) via the PSFCH 1990. The PSCCH 1960-1964, the PSSCH 1970-1975, and the PSFCH 1990 may have a different number of subchannels (e.g., a different number of frequency resources) in the frequency domain.

A $1^{st}$-stage SCI may be SCI format 1-A. The SCI format 1-A may comprise a plurality of fields used for scheduling of a first TB on a PSSCH and a $2^{nd}$-stage SCI on the PSSCH. The following information may be sent (e.g., transmitted) by means of the SCI format 1-A:

- A priority of the sidelink transmission. The priority may be a physical layer (e.g., a layer 1) priority of the sidelink transmission. The priority may be determined, for example, based on logical channel priorities of the sidelink transmission;
- Frequency resource assignment of a PSSCH;
- Time resource assignment of a PSSCH;
- Resource reservation period/interval for a second TB;
- Demodulation reference signal (DMRS) pattern;
- A format of the $2^{nd}$-stage SCI;
- Beta_offset indicator;
- Number of DMRS port;
- Modulation and coding scheme of a PSSCH;
- Additional MCS table indicator;
- PSFCH overhead indication; and/or
- Reserved bits.

A $2^{nd}$-stage SCI may be SCI format 2-A. The SCI format 2-A may be used for decoding of a PSSCH. The SCI format 2-A may be used with a HARQ operation when the HARQ-ACK information includes an ACK and/or a NACK. The SCI format 2-A may be used when there is no feedback of HARQ-ACK information. The SCI format 2-A may comprise a plurality of fields indicating the following information:

HARQ process number;
New data indicator;
Redundancy version;
Source ID of a transmitter (e.g., a sending (transmitting) wireless device) of a sidelink transmission;
Destination ID of a receiver (e.g., a receiving wireless device) of the sidelink transmission;
HARQ feedback enabled/disabled indicator;
Cast type indicator indicating that the sidelink transmission is a broadcast, a groupcast, and/or a unicast; and/or
CSI request.

A $2^{nd}$-stage SCI may be SCI format 2-B. The SCI format 2-B may be used for decoding a PSSCH. The SCI format 2-B may be used with HARQ operation when HARQ-ACK information includes only NACK. The SCI format 2-B may be used when there is no feedback of HARQ-ACK information. The SCI format 2-B may comprise a plurality of fields indicating the following information:

HARQ process number;
New data indicator;
Redundancy version;
Source ID of a transmitter (e.g., a sending (transmitting) wireless device) of a sidelink transmission;
Destination ID of a receiver (e.g., a receiving wireless device) of the sidelink transmission;
HARQ feedback enabled/disabled indicator;
Zone ID indicating a zone where a transmitter (e.g., a sending (transmitting) wireless device) of the sidelink transmission is geographically located; and/or
Communication range requirement indicating a communication range of the sidelink transmission.

Figure 20:
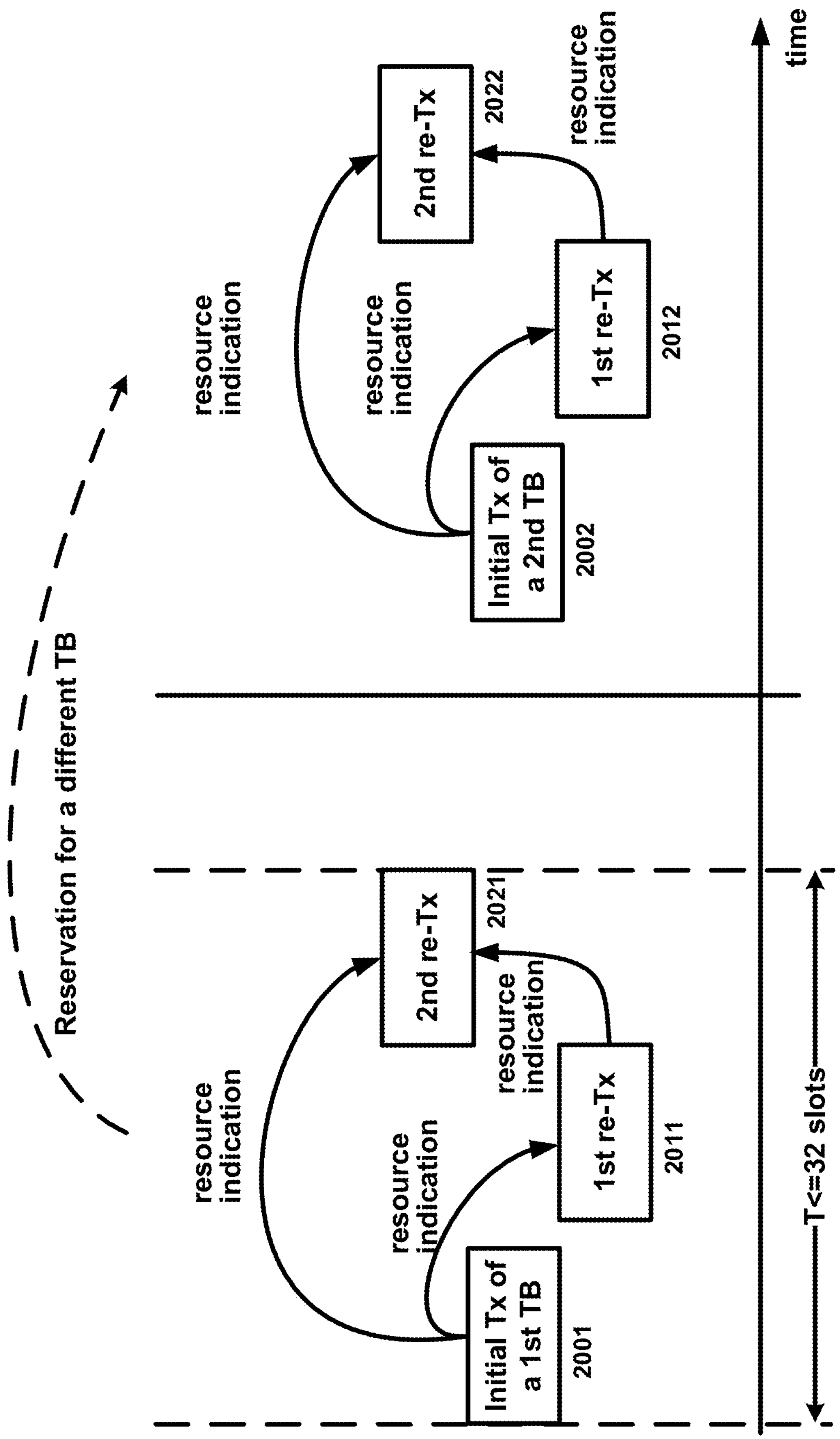
FIG. 20 shows an example of a resource indication for a transport block (TB) and a resource reservation for a TB.

FIG. 20 shows an example of resource indication for a first TB (e.g., a first data packet) and resource reservation for a second TB (e.g., a second data packet). SCI of an initial transmission (e.g., a first transmission, initial Tx of $1^{st}$ TB) 2001 and/or a retransmission (e.g., $1^{st}$ re-Tx, $2^{nd}$ re-Tx) 2011 and 2021 of the first TB (e.g., $1^{st}$ TB) may comprise one or more first parameters (e.g., Frequency resource assignment and Time resource assignment) indicating one or more first time and/or frequency (T/F) resources for transmission (e.g., initial Tx) 2001 and/or retransmission (e.g., $1^{st}$ re-Tx, $2^{nd}$ re-Tx) 2011 and 2021, respectively, of the first TB (e.g., $1^{st}$ TB). The SCI may further comprise one or more second parameters (e.g., Resource reservation period) indicating a reservation period (interval, etc.) of one or more second T/F resources for initial transmission (e.g., initial Tx of $2^{nd}$ TB) 2002 and/or retransmission (e.g., $1^{st}$ re-Tx, $2^{nd}$ re-Tx) 2012 and 2022 of the second TB (e.g., $2^{nd}$ TB).

A wireless device may determine/select one or more first T/F resources for transmission and/or retransmission of a first TB. A wireless device may determine/select one or more first T/F resources for (initial) transmission and/or retransmission of the first TB, for example, based on triggering a resource selection procedure (e.g., as described above in FIG. 19). The wireless device may select three resources for sending (e.g., transmitting) the first TB, for example, such as shown in FIG. 20. The wireless device may send (e.g., transmit) an initial transmission (e.g., an initial Tx of a first TB in FIG. 20) of the first TB via a first resource 2001 of the three resources. The wireless device may send (e.g., transmit) a first retransmission (e.g., a $1^{st}$ re-Tx in FIG. 20) of the first TB via a second resource 2011 of the three resources. The wireless device may send (e.g., transmit) a second retransmission (e.g., a $2^{nd}$ re-Tx in FIG. 20) of the first TB via a third resource 2021 of the three resources. A time duration between a starting time of the initial transmission of the first TB (e.g., via the first resource 2011) and the second retransmission of the first TB (e.g., via the third resource 2021) may be smaller than or equal to 32 sidelink slots (e.g., T≤32 slots in FIG. 20) or any other quantity of sidelink slots or any other duration. A first SCI may associate with the initial transmission of the first TB. The first SCI may indicate a first T/F resource indication for the initial transmission of the first TB, the first retransmission of the first TB, and the second retransmission of the first TB. The first SCI may indicate a reservation period/interval of resource reservation for a second TB, for example, via a fourth resource 2002. A second SCI may associate with the first retransmission of the first TB. The second SCI may indicate a second T/F resource indication for the first retransmission of the first TB (e.g., via the second resource 2011) and the second retransmission of the first TB (e.g., via a fifth resource 2012). The second SCI may indicate the reservation period/interval of resource reservation for the second TB. A third SCI may associate with the second retransmission of the first TB. The third SCI may indicate a third T/F resource indication for the second retransmission of the first TB (e.g., via a sixth resource 2022). The third SCI may indicate the reservation period/interval of resource reservation for the second TB.

FIG. 21 and FIG. 22 show examples of configuration information for sidelink communication. A base station may send (e.g., transmit) one or more radio resource control (RRC) messages to a wireless device for delivering the configuration information for the sidelink communication. Specifically, FIG. 21 shows an example of configuration information for sidelink communication that may comprise a field of SL-UE-SelectedConfigRP. A parameter sl-ThresPSSCH-RSRP-List in the field may indicate a list of 64 thresholds. A wireless device may receive first sidelink control information (SCI) indicating a first priority. The wireless device may have second SCI to be sent (e.g., transmitted). The second SCI may indicate a second priority. The wireless device may select a threshold from the list based on the first priority in the first SCI and the second priority in the second SCI. The wireless device may exclude resources from candidate resource sets based on the threshold (e.g., as described herein in FIG. 26). A parameter sl-MaxNumPerReserve in the field may indicate a maximum number of reserved PSCCH and/or PSSCH resources indicated in SCI. A parameter sl-MultiReserveResource in the field may indicate that a reservation of a sidelink resource for an initial transmission of a TB by SCI associated with a different TB may be allowed, for example, based on or in response to a sensing and resource selection procedure. A parameter sl-ResourceReservePeriodList may indicate a set of possible resource reservation periods (intervals, etc.) (e.g., SL-ResourceReservePeriod) allowed in a resource pool. Up to 16 values may be configured per resource pool. A parameter sl-RS-ForSensing may indicate, for example, if DMRS of PSCCH and/or PSSCH are used for a layer 1 (e.g., physical layer) RSRP measurement in sensing operation. A parameter sl-Sensing Window may indicate the start of a sensing window. A parameter sl-SelectionWindowList may indicate the end of a selection window in a resource selection procedure for a TB with respect to a priority indicated in SCI. Value n1 may correspond to $1*2\mu$, value n5 corresponds to $5*2\mu$, and so on, where $\mu$=0, 1, 2, 3 for subcarrier spacing (SCS) of 15, 30, 60, and 120 kHz respectively. A parameter SL-SelectionWindowConfig (e.g., as described in FIG. 22) may indicate a mapping between a sidelink priority (e.g., sl-Priority) and the end of the selection window (e.g., sl-Selection Window).

Configuration information may further comprise a parameter sl-PreemptionEnable indicating a sidelink pre-emption status (e.g., disabled or enabled) in a resource pool. A priority level p_preemption may be configured, for example, if the sidelink pre-emption is enabled. The sidelink pre-emption may be applicable to all priority levels, for example, if the sidelink pre-emption is enabled, but the p_preemption is not configured.

As described in FIG. 22, configuration information may comprise a parameter sl-TxPercentageList indicating a portion of candidate single-slot PSSCH resources over total resources. A value of p20 may correspond to 20%. A parameter SL-TxPercentageConfig may indicate a mapping between a sidelink priority (e.g., sl-Priority) and a portion of candidate single-slot PSSCH resources over total resources (e.g., sl-TxPercentage).

Figure 23:
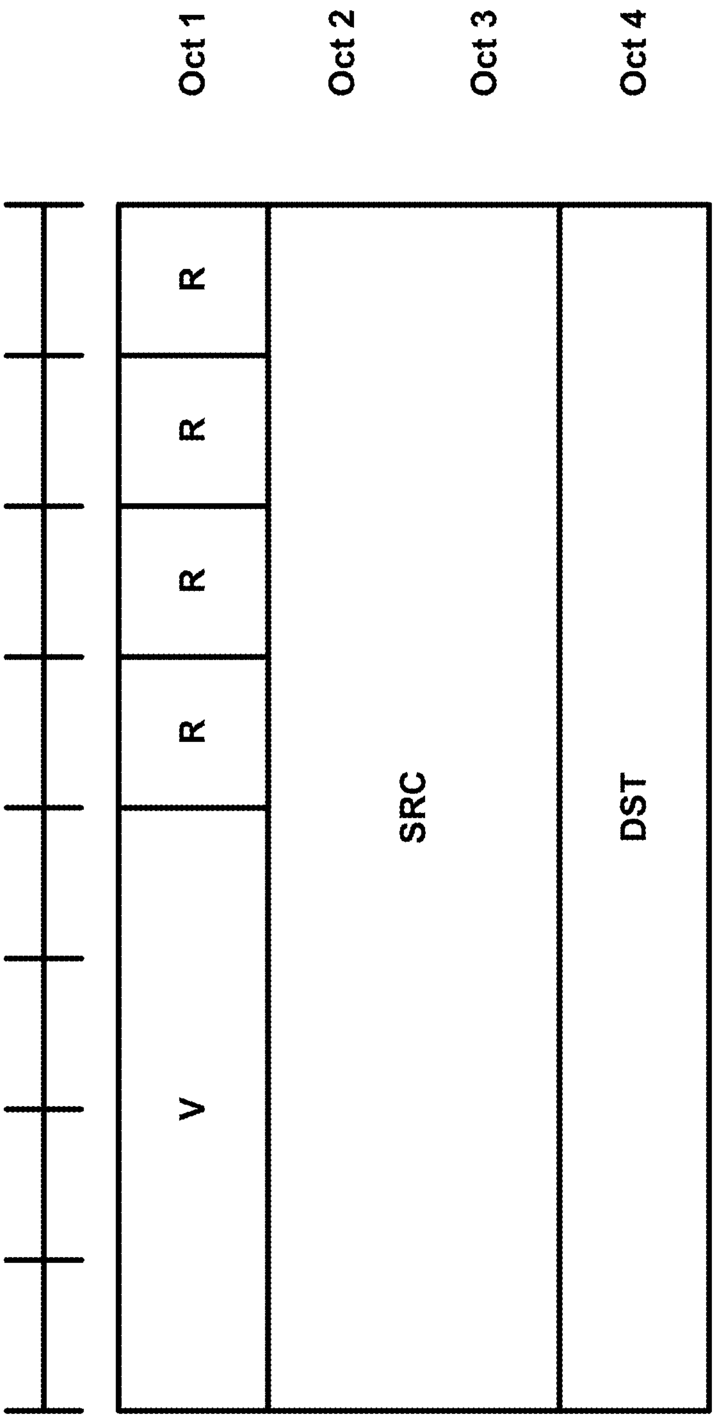
FIG. 23 shows an example format of a MAC subheader for a sidelink shared channel (SL-SCH).

FIG. 23 shows an example format of a MAC subheader for a sidelink shared channel (SL-SCH). The MAC subheader for SL-SCH may comprise seven header fields a version number (V) 2310, reserved bits (R) 2320-2326, a source ID (SRC) 2330, and a destination ID (DST) 2340. The MAC subheader is octet aligned. The V field 2310 may be a MAC protocol data units (PDU) format version number field indicating which version of the SL-SCH subheader may be used. The SRC field 2330 may carry 16 bits of a Source Layer-2 identifier (ID) field set to a first identifier provided by upper layers. The DST field 2340 may carry 8 bits of the Destination Layer-2 ID set to a second identifier provided by upper layers. The second identifier may be a unicast identifier, for example, if the V field 2310 is set to "1." The second identifier may be a groupcast identifier, for example, if the V field 2310 is set to "2." The second identifier may be a broadcast identifier, for example, if the V field 2310 is set to "3."

Figure 24:
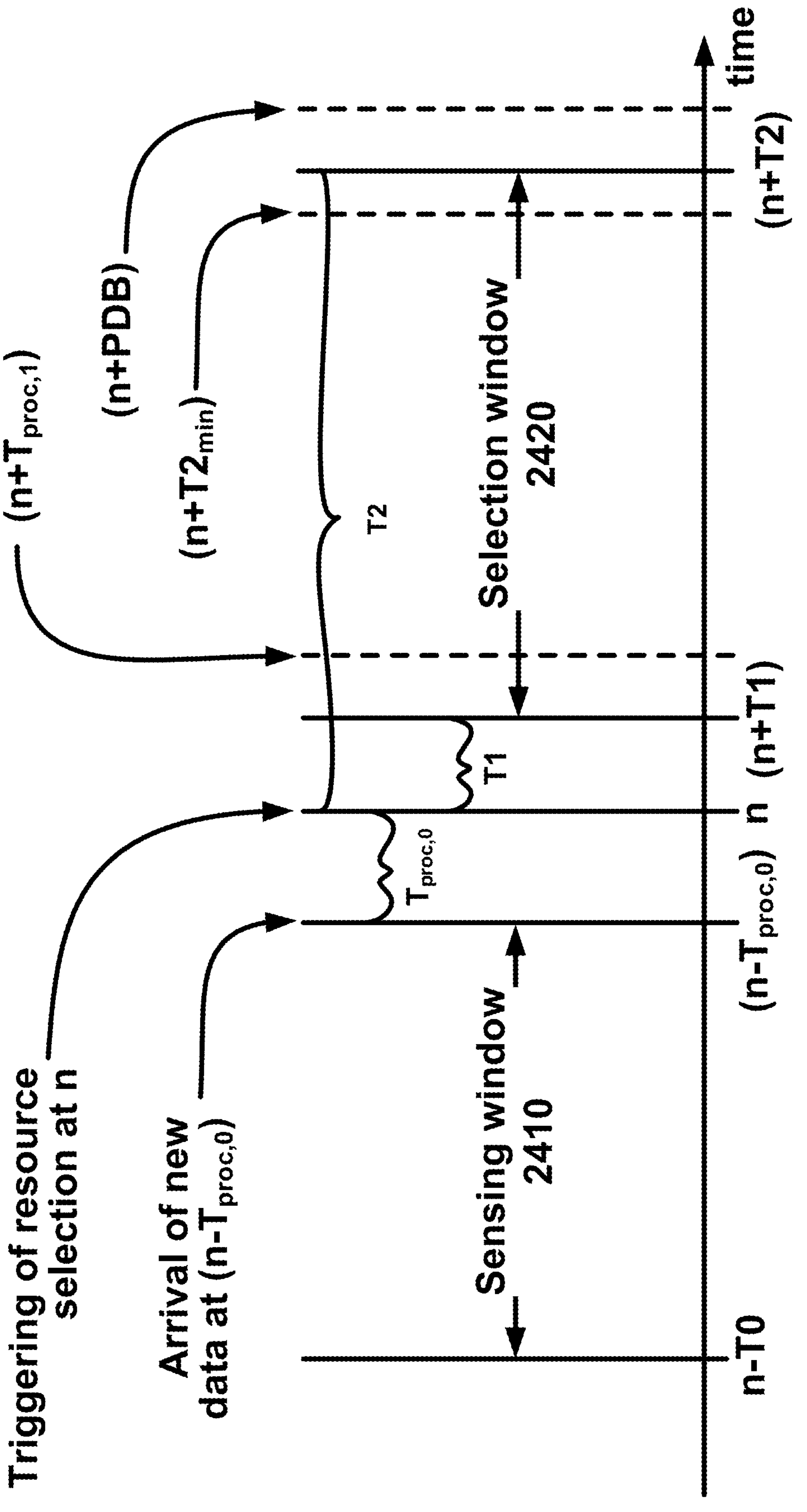
FIG. 24 shows an example timing of a resource selection procedure.

FIG. 24 shows an example timing of a resource selection procedure. A wireless device may perform a resource selection procedure to select resources for one or more sidelink transmissions. A sensing window 2410 of the resource selection procedure may start at a time (n−T0) (e.g., a sl-Sensing Window parameter as described herein in FIG. 21). The sensing window 2410 may end at a time (n−$T_{proc,0}$) New data of the one or more sidelink transmissions may arrive at the wireless device at time (n−$T_{proc,0}$) The time period $T_{proc,0}$ may be a processing delay of the wireless device in determining to trigger a resource selection procedure. The wireless device may determine to trigger the resource selection procedure at a time n to select the resources for the new data that arrived at the time (n−$T_{proc,0}$) The wireless device may complete the resource selection procedure at a time (n+T1). The wireless device may determine the parameter T1 based on a capability of the wireless device. The capability of the wireless device may be a processing delay of a processor of the wireless device. A selection window 2420 of the resource selection procedure may start at time (n+T1). The selection window may end at time (n+T2). The wireless device may determine the parameter T2 based on a parameter T2min (e.g., sl-Selection Window). The wireless device may determine the parameter T2 so that T2min≤T2≤PDB, for example, if the PDB (packet delay budget) is the maximum allowable delay (e.g., a delay budget) for successfully sending (e.g., transmitting) new data via the one or more sidelink transmissions. The wireless device may determine the parameter T2min, for example, based on or in response to a corresponding value for a priority of the one or more sidelink transmissions (e.g., based on a parameter SL-SelectionWindowConfig indicating a mapping between a sidelink priority sl-Priority and the end of the selection window sl-Selection Window). A wireless device may set the parameter T2=PDB, for example, if the parameter T2min>PDB.

Figure 25:
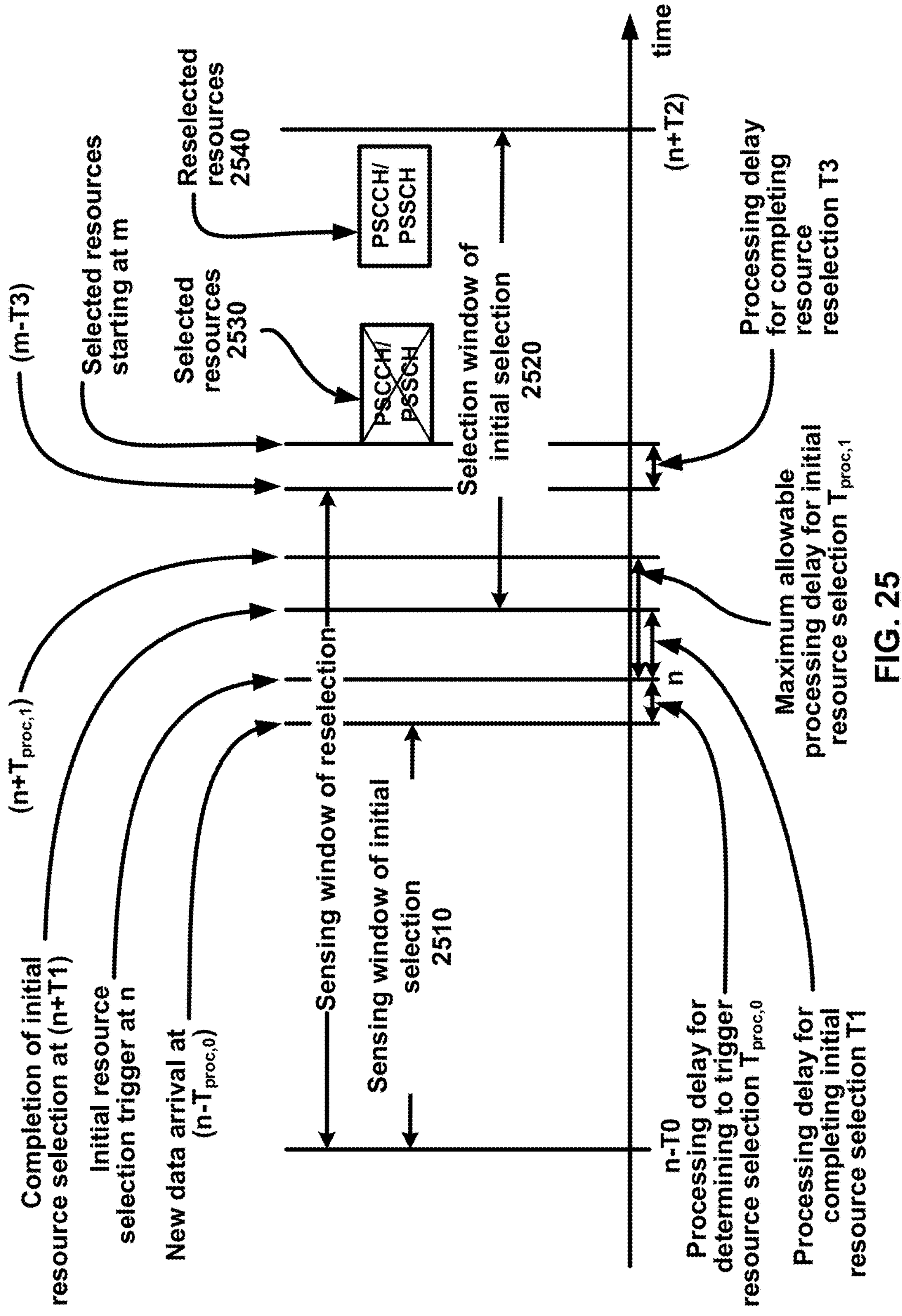
FIG. 25 shows an example timing of a resource selection procedure.

FIG. 25 shows an example timing of a resource selection procedure. A wireless device may perform the resource selection procedure for selecting resources for one or more sidelink transmissions. A sensing window of initial selection 2510 may start at a time (n−T0). The sensing window of initial selection 2510 may end at a time (n−$T_{proc,0}$) New data of the one or more sidelink transmissions may arrive at the wireless device at the time (n−$T_{proc,0}$) The time period $T_{proc,0}$ may be a processing delay for the wireless device to determine to trigger the initial selection of the resources. The wireless device may determine to trigger the initial selection at a time n to select the resources for the new data arrived at the time (n−$T_{proc,0}$). The wireless device may complete the initial resource selection procedure at a time (n+T1), where T1 is the processing delay for completing a resource selection procedure. The time (n+$T_{proc,1}$) may be the maximum allowable processing latency (e.g., $T_{proc,1}$, where 0<T1≤$T_{proc,1}$) for completing the resource selection procedure that was triggered at the time n. A selection window of initial selection 2520 may start at a time (n+T1). The selection window of initial selection 2520 may end at a time (n+T2). The parameter T2 may be configured, preconfigured, and/or determined by the wireless device.

A wireless device may determine first resources (e.g., selected resources) 2530 for one or more sidelink transmissions based on the completion of an initial resource selection procedure at a time (n+T1). The wireless device may select the first resources (e.g., selected resources) 2530 from candidate resources in a selection window of initial selection 2520, for example, based on or in response to measurements in the sensing window for initial selection 2510. The wireless device may determine a resource collision between the first resources (e.g., selected resources) 2530 and other resources reserved by another wireless device. The wireless device may determine to drop first resources (e.g., selected resources) 2530 to avoid interference. The wireless device may trigger a resource reselection procedure (e.g., a second resource selection procedure) at or before a time (m−T3). The time period T3 may be a processing delay for the wireless device to complete the resource reselection procedure (e.g., a second resource selection procedure). The wireless device may determine second resources (e.g., reselected resource) 2540 via the resource reselection procedure (e.g., a second resource selection procedure). The start time of the first resources (e.g., selected resources) 2530 may be the time m (e.g., the first resources may be in slot m).

At least one of time parameters T0, $T_{proc,0}$, $T_{proc,1}$, T2, and/or PDB may be configured by a base station for a wireless device. The at least one of the time parameters T0, $T_{proc,0}$, $T_{proc,1}$, T2, and PDB may be preconfigured for a wireless device. The at least one of the time parameters T0, $T_{proc,0}$, $T_{proc,1}$, T2, and PDB may be stored in a memory of the wireless device. The memory may be a Subscriber Identity Module (SIM) card. The times n, m, T0, T1, $T_{proc,0}$, $T_{proc,1}$, T2, T2min, T3, and PDB, as described herein in FIGS. 24 and 25, may be in terms of slots and/or slot index (e.g., as described herein in FIG. 19).

Figure 26:
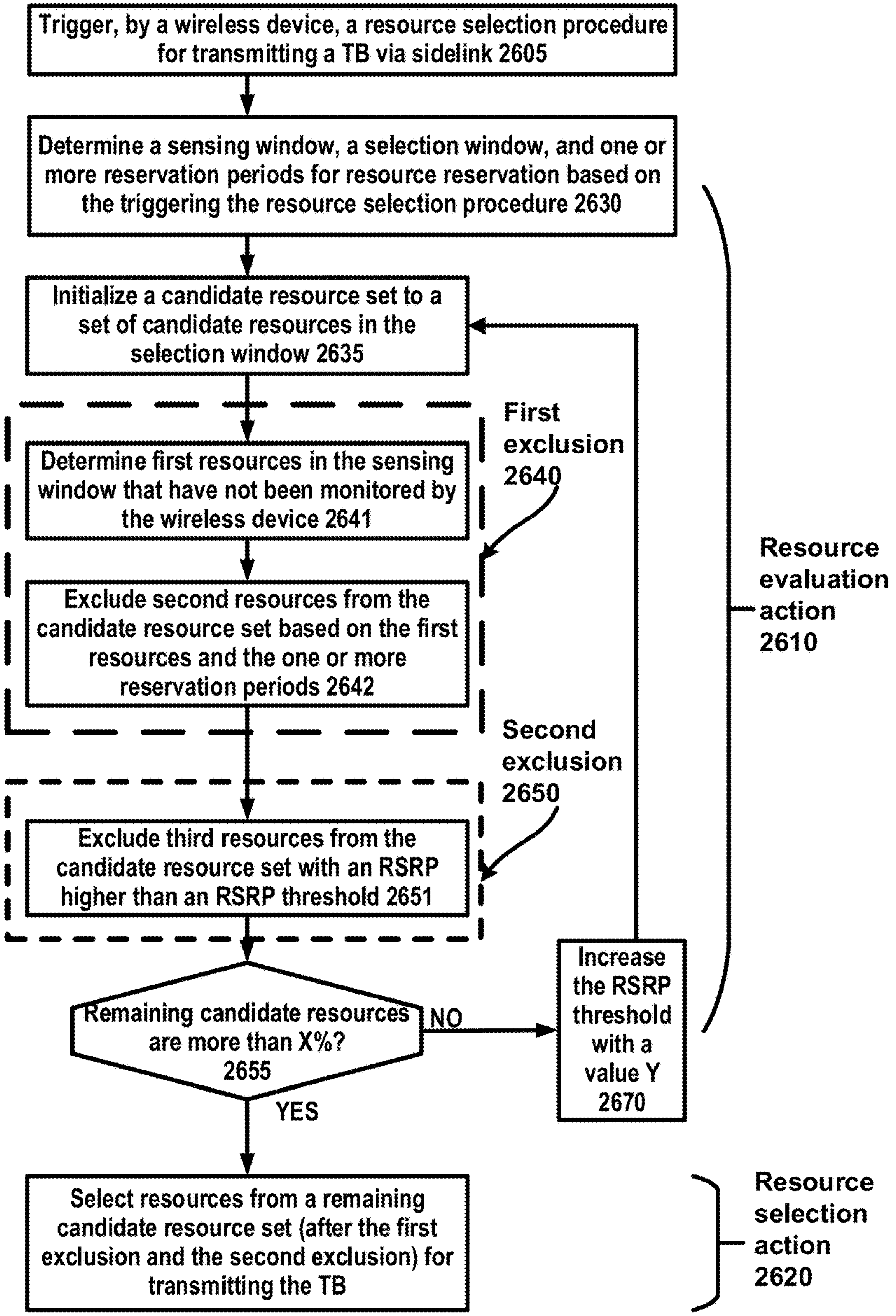
FIG. 26 shows an example flowchart of a resource selection procedure by a wireless device for sending (e.g., transmitting) a TB via sidelink.
Figure 27:
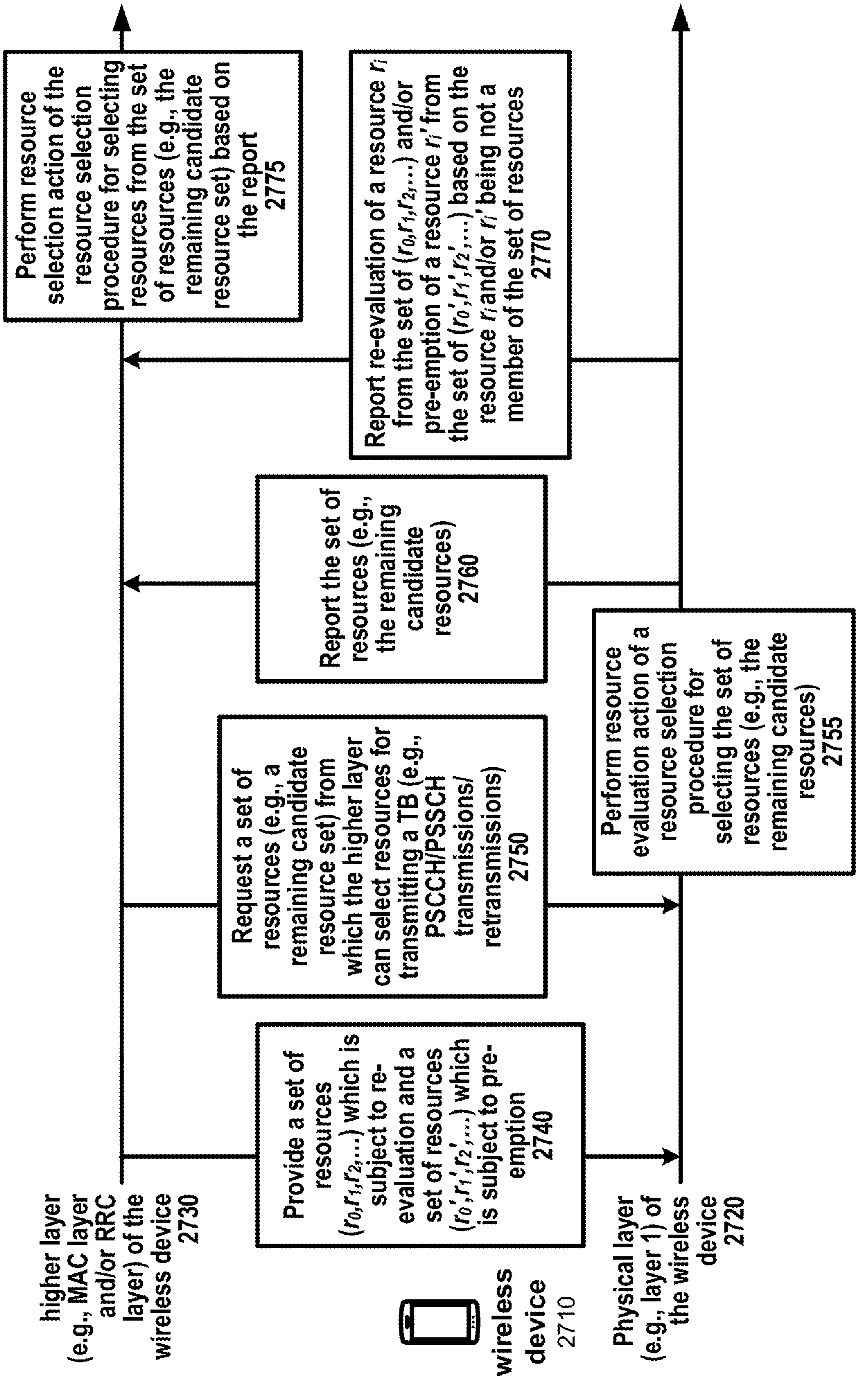
FIG. 27 shows an example diagram of the resource selection procedure among layers of the wireless device.

FIG. 26 shows an example flowchart of a resource selection procedure by a wireless device for sending (e.g., transmitting) a TB (e.g., a data packet) via sidelink. FIG. 27 shows an example diagram of the resource selection procedure among layers of the wireless device.

Referring to FIGS. 26 and 27, a wireless device 2710 may send (e.g., transmit) one or more sidelink transmissions (e.g., a first transmission of the TB and one or more retransmissions of the TB) for sending (e.g., transmitting) the TB. A sidelink transmission of the one or more sidelink transmission may comprise a PSCCH, a PSSCH, and/or a PSFCH (e.g., as described herein in FIG. 19). As described in FIG. 26, the wireless device 2710 may trigger a resource selection procedure for sending (e.g., transmitting) the TB. The resource selection procedure may comprise two actions. The first action of the two actions may be a resource evaluation action 2610. As described in FIG. 27, the physical layer (e.g., layer 1) of the wireless device 2720 may perform the resource evaluation action 2755. The physical layer of the wireless device 2720 may determine a subset of resources based on the first action and report the subset of resources to a higher layer (e.g., a MAC layer and/or a RRC layer) of the wireless device 2730. As described in FIG. 26, the second action of the two actions may be a resource selection action 2620. The higher layer (e.g., the MAC layer and/or the RRC layer) of the wireless device 2730 may perform the resource selection action 2620 based on the reported subset of resources from the physical layer (e.g., layer 1) of the wireless device 2720.

A wireless device/higher layer (e.g., a MAC layer and/or a RRC layer) of a wireless device 2730 may trigger a resource selection procedure (e.g., at step 2605) for requesting the wireless device 2710 to determine a subset of resources. The wireless device/higher layer (e.g., the MAC layer and/or the RRC layer) of the wireless device 2730 may select resources from the subset of resources for a PSSCH and/or a PSCCH transmission. The wireless device/higher layer (e.g., the MAC layer and/or the RRC layer) of the wireless device 2730 may provide the following parameters for the PSSCH and/or the PSCCH transmission to trigger the resource selection procedure (e.g., in slot n):

- a resource pool, from which the wireless device may determine the subset of resources;
- layer 1 priority, $prio_{TX}$ (e.g., sl-Priority as described herein in FIGS. 21 and 22), of the PSSCH and/or the PSCCH transmission;
- remaining packet delay budget (PDB) of the PSSCH and/or the PSCCH transmission;
- a number of sub-channels, $L_{subCH}$, for the PSSCH and/or the PSCCH transmission in a slot; and/or
- a resource reservation period (interval, etc.), $P_{rsvp\_TX}$ in units of millisecond (ms).

A wireless device/higher layer (e.g., a MAC layer and/or a RRC layer) of the wireless device 2730 may provide sets of resources (e.g., a set $(r_0, r_1, r_2)$, which may be subject to a re-evaluation, and/or a set $(r'_0, r'_1, r'_2 \ldots)$, which may be subject to a pre-emption) 2740, for example, if the wireless device/higher layer (e.g., the MAC layer and/or the RRC layer) of the wireless device 2730 requests the wireless 2710 device to determine a subset of resources from which the higher layer will select the resources for PSSCH and/or PSCCH transmissions for re-evaluation and/or pre-emption 2750.

A base station (e.g., network) may send (e.g., transmit) a message comprising one or more parameters to a wireless device for performing a resource selection procedure. The message may be an RRC/SIB message, a MAC CE, and/or DCI. A second wireless device may send (e.g., transmit) a message comprising one or more parameters to the wireless device for performing the resource selection procedure. The message may be an RRC message, a MAC CE, and/or SCI. The one or more parameters may indicate the following information.

- sl-SelectionWindowList (e.g., sl-Selection Window as described herein in FIGS. 21 and 22): an internal parameter T2min (e.g., T2min as described herein in FIG. 24) may be set to a corresponding value from the parameter sl-SelectionWindowList for a given value of $prio_{TX}$ (e.g., based on SL-SelectionWindowConfig as described herein in FIGS. 21 and 22).
- sl-ThresPSSCH-RSRP-List (e.g., sl-ThresPSSCH-RSRP-List as described herein in FIGS. 21 and 22): a parameter may indicate an RSRP threshold for each combination $(p_i, p_j)$, where $p_i$ is a value of a priority field in a received SCI format 1-A and $P_j$ is a priority of a sidelink transmission (e.g., the PSSCH and/or the PSCCH transmission) of the wireless device. In a resource selection procedure, $P_j$ may be defined as $P_j = prio_{TX}$.
- sl-RS-ForSensing (e.g., sl-RS-ForSensing as described herein in FIGS. 21 and 22): a parameter may indicate whether DMRS of a PSCCH and/or a PSSCH is used for layer 1 (e.g., physical layer) RSRP measurement in sensing operation by the wireless device.
- sl-ResourceReservePeriodList (e.g., sl-ResourceReservePeriodList as described herein in FIGS. 21 and 22)
- sl-Sensing Window (e.g., sl-Sensing Window as described herein in FIGS. 21 and 22): an internal parameter $T_0$ may be defined as a number of slots corresponding to t0_SensingWindow ms.
- sl-TxPercentageList (e.g., based on SL-TxPercentageConfig as described herein in FIGS. 21 and 22): an internal parameter X (e.g., sl-TxPercentage as described herein in FIGS. 21 and 22) for a given $prio_{TX}$ (e.g., sl-Priority as described herein in FIGS. 21 and 22) may be defined as sl-xPercentage($prio_{TX}$) converted from percentage to ratio.
- sl-PreemptionEnable (e.g., p_preemption as described herein in FIGS. 21 and 22): an internal parameter $prio_{pre}$ may be set to a higher layer provided parameter sl-PreemptionEnable.

A resource reservation period (interval, etc.), $P_{rsvp\_TX}$ may be converted from units of ms to units of logical slots, resulting in $$P'_{rsvp\_TX},$$

for example, if the resource reservation period (interval, etc.) is provided.

A notation:

$$(t_0^{SL}, t_1^{SL}, t_2^{SL}, \ldots)$$

may denote a set of slots of a sidelink resource pool.

For a resource evaluation action 2610 described in FIG. 26, a wireless device may determine a sensing window 2630 (e.g., a sensing window as described herein in FIGS. 24 and 25 based on sl-Sensing Window), for example, based on or in response to a triggering of a resource selection procedure. The wireless device may determine a selection window 2630 (e.g., a selection window as described herein in FIGS. 24 and 25 based on sl-SelectionWindowList), for example, based on or in response to the triggering of the resource selection procedure. The wireless device may determine one or more reservation periods (intervals, etc.) 2630 (e.g., parameter sl-ResourceReservePeriodList) for resource reservation. A candidate single-slot resource for transmission $R_{x,y}$ may be defined as a set of $L_{subCH}$ contiguous sub-channels with sub-channel x+j in slot $$t_y^{SL} \text{ where } j = 0, \ldots , L_{subCH} - 1.$$

The wireless device may assume that a set of $L_{subCH}$ contiguous sub-channels in the resource pool within a time interval $[n+T_1, n+T_2]$ correspond to one candidate single-slot resource (e.g., as described herein in FIGS. 24 and 25). A total number of candidate single-slot resources may be denoted by $M_{total}$. A sensing window may be defined as a number of slots in a time duration of $[n-T_0, n-T_{proc,0}]$ (e.g., as described herein in FIGS. 24 and 25). The wireless device may monitor a first subset of the slots, of a sidelink resource pool, within the sensing window. The wireless device may not monitor a second subset of the slots different than the first subset of the slots due to half duplex. The wireless device may perform the following actions based on PSCCH decoded and RSRP measured in the first subset of the slots. An internal parameter $Th(p_i, p_j)$ may be set to the corresponding value of the RSRP threshold indicated by the i-th field in sl-ThresPSSCH-RSRP-List, where $i=p_i+(p_j-1)*8$.

For a resource evaluation action 2610, as described in FIG. 26, a wireless device 2710 (e.g., as described herein in FIG. 27) may initialize a candidate resource set 2635 (e.g., a set S A) to be a set of candidate resources. The candidate resource set may be a union of candidate resources within a selection window. A candidate resource may be a candidate single-subframe resource. A candidate resource may be a candidate single-slot resource. the set $S_A$ may be initialized to a set of all candidate single-slot resources.

For a resource evaluation action 2610 (e.g., as described herein in FIG. 26), a wireless device 2710 (e.g., as described herein in FIG. 27) may perform a first exclusion 2640 for excluding second resources from the candidate resource set based on first resources and one or more reservation periods (intervals) 2642. The wireless device 2710 may not monitor the first resources within a sensing window. The one or more reservation periods (intervals, etc.) may be configured and/or associated with a resource pool of the second resources. The wireless device 2710 may determine the second resources within a selection window which may be reserved by a transmission sent (e.g., transmitted) via the first resources based on the one or more reservation periods (intervals, etc.). The wireless device 2710 may exclude a candidate single-slot resource $R_{x,y}$ from the set S A based on following conditions:

the wireless device has not monitored slot $$t_m^{SL}$$

in the sensing window.

for any periodicity value allowed by the parameter sl-ResourceReservePeriodList and a hypothetical SCI format 1-A received in the slot $$t_m^{SL}$$

with "Resource reservation period" field set to that periodicity value and indicating all subchannels of the resource pool in this slot, condition c of a second exclusion would be met.

For a resource evaluation action 2610 (e.g., as described herein in FIG. 26), a wireless device may perform a second exclusion 2650 for excluding third resources from the candidate resource set. SCI may indicate a resource reservation of the third resources. The SCI may further indicate a priority value (e.g., indicated by a higher layer parameter sl-Priority). The wireless device may exclude the third resources from the candidate resource set based on a reference signal received power (RSRP) of the third resources satisfying (e.g., above, higher than, greater than, etc.) an RSRP threshold 2651 (e.g., indicated by a higher layer parameter sl-ThresPSSCH-RSRP-List). The RSRP threshold may be related to the priority value based on a mapping list of RSRP thresholds to priority values configured and/or pre-configured for the wireless device. A base station may send (e.g., transmit) a message to a wireless device to configure a mapping list. The message may be a radio resource control (RRC) message. The mapping list may be pre-configured for the wireless device. The mapping list may be stored in memory of the wireless device. A priority indicated by a priority value may be a layer 1 priority (e.g., a physical layer priority). The priority value (e.g., the layer 1 priority) may be associated with a respective priority level. A higher (larger, bigger, etc.) priority value may indicate a higher priority of a sidelink transmission, and/or a lower (smaller, etc.) priority value may indicate a lower priority of the sidelink transmission. A higher (larger, bigger, etc.) priority value may indicate a lower priority of the sidelink transmission, and/or A lower (smaller, etc.) priority value may indicate a higher priority of the sidelink transmission. A wireless device may exclude a candidate single-slot resource $R_{x,y}$ from a set $S_A$ based on following conditions:

a) the wireless device receives SCI format 1-A in slot $$t_m^{SL},$$

and "Resource reservation period" field, if present, and "Priority" field in the received SCI format 1-A indicate the values $P_{rsvp\_RX}$ and $prio_{RX}$;

b) the RSRP measurement performed, for the received SCI format 1-A, is higher than $Th(prio_{RX}, prio_{TX})$;

c) the SCI format received in slot $$t_m^{SL}$$

or the same SCI format which, if and only if the "Resource reservation period" field is present in the received SCI format 1-A, is assumed to be received in slot(s)

$$t^{SL}_{m+q\times P'_{rsvp\_RX}}$$

determines the set of resource blocks and slots which overlaps with $$R_{x,y+j\times P'_{rsvp\_TX}}$$

for q=1, 2, . . . , Q and j=0, 1, . . . , $C_{resel}$−1. Here, $$P'_{rsvp\_RX}$$

is $P_{rsvp\_RX}$ converted to units of logical slots, $$Q = \left\lceil \frac{T_{scal}}{P_{rsvp\_RX}} \right\rceil$$

if $P_{rsvp\_RX}<T_{scal}$ and $$n' - m' \le P'_{rsvp\_RX}, \text{ where } t^{SL}_{n'} = n$$

if slot n belongs to the set $$(t^{SL}_0, t^{SL}_1, \ldots, t^{SL}_{T_{max}}),$$

otherwise slot $$t^{SL}_{n'}$$

is the first slot after slot n belonging to the set $$(t^{SL}_0, t^{SL}_1, \ldots, t^{SL}_{T_{max}});$$

otherwise Q=1. $T_{scal}$ is set to selection window size T2 converted to units of ms.

As described in FIGS. 26 and 27, in a resource evaluation action 2610, a wireless device 2710 may determine whether remaining candidate resources in a candidate resource set are sufficient for selecting resources for one or more sidelink transmissions of the TB, for example, after performing the first exclusion, the second exclusion, and/or based on or in response to a condition. The condition may be the total amount of the remaining candidate resources in the candidate resource set satisfying (e.g., above, higher than, greater than, more than, higher than or equal to, greater than or equal to, more than or equal to, larger than or equal to, etc.) X percent (e.g., as indicated by a higher layer parameter sl-TxPercentageList) of the candidate resources in the candidate resource set before performing the first exclusion and/or the second exclusion 2655. The wireless device 2710 may increase the RSRP threshold used to exclude the third resources with a value Y and iteratively re-perform the initialization, the first exclusion, and/or the second exclusion 2670, for example, until the condition is met (e.g., the number of remaining candidate single-slot resources in the set $S_A$ satisfies is $X\cdot M_{total}$). The wireless device 2710 may report the set $S_A$ (e.g., the remaining candidate resources of the candidate resource set) 2760 to the higher layer (e.g., MAC layer and/or RRC layer) of the wireless device 2730. The wireless device 2710 may report the set $S_A$ (e.g., the remaining candidate resources of the candidate resource set when the condition is met) 2760 to the higher layer (e.g., MAC layer and/or RRC layer) of the wireless device 2730, for example, based on or in response to the number of remaining candidate single-slot resources in the set $S_A$ being equal to or satisfying (e.g., above, higher than, greater than, more, etc.) $X\cdot M_{total}$.

As described in FIGS. 26 and 27, in a resource selection action 2620 the higher layer (e.g., MAC layer and/or RRC layer) of a wireless device 2710 may select fourth resources from the remaining candidate resources of the candidate resource set 2775 (e.g., a set $S_A$ reported by the physical layer (e.g., layer 1) of the wireless device 2720) for the one or more sidelink transmissions of the TB. The wireless device 2710 may randomly select the fourth resources from the remaining candidate resources of the candidate resource set.

As described in FIG. 27, a wireless device 2710 may report a re-evaluation of a resource $r_i$ 2770 to a higher layer (e.g., MAC layer and/or RRC layer) of the wireless device 2730, for example, if the resource $r_i$ from a set ($r_0$, $r_1$, $r_2$, . . . ) is not a member of $S_A$(e.g., the remaining candidate resources of the candidate resource set when the condition is met).

A wireless device 2710 may report a pre-emption of a resource $$r'_i$$

2770 to a higher layers (e.g., MAC layer and/or RRC layer) of the wireless device 2730, for example, if the resource $$r'_i$$

from the set $$(r'_0, r'_1, r'_2, \ldots)$$

meets the conditions below:

$$r'_i$$

is not a member of $S_A$, and $$r'_i$$

meets the conditions for the second exclusion, with $Th(prio_{RX}, prio_{TX})$ set to a final threshold for reaching $X\cdot M_{total}$, and

- the associated priority $prio_{RX}$, satisfies one of the following conditions:
- sl-PreemptionEnable is provided and is equal to 'enabled' and $prio_{TX}>prio_{RX}$
- sl-PreemptionEnable is provided and is not equal to 'enabled', and $prio_{RX}<prio_{pre}$ and $prio_{TX}>prio_{RX}$ A higher layer (e.g., MAC layer and/or RRC layer) of a wireless device 2730 may remove a resource $r_1$ from a set ($r_0$, $r_1$, $r_2$, . . . ), for example, if the resource $r_i$ is indicated for re-evaluation by the wireless device 2710 (e.g., the physical layer of the wireless device 2720). The higher layer of the wireless device 2730 may remove a resource $$r_i'$$

from a set $$(r_0', r_1', r_2', \ldots),$$

for example, if the resource $$r_i'$$

is indicated for pre-emption by the wireless device 2710 (e.g., the physical layer of the wireless device 2720). The higher layer of the wireless device 2730 may randomly select new time and frequency resources from the remaining candidate resources of the candidate resource set (e.g., the set $S_A$ reported by the physical layer) for the removed resources $r_i$ and/or $$r_i'.$$

The higher layer of the wireless device 2730 may replace the removed resources $r_i$ and/or $$r_i'$$

by the new time and frequency resources. The wireless device 2710 may remove the resources $r_i$ and/or $r_i'$ from the set ($r_0$, $r_1$, $r_2$, . . . ) and/or the set $$(r_0', r_1', r_2', \ldots)$$

and add the new time and frequency resources to the set ($r_0$, $r_1$, $r_2$, . . . ) and/or the set $$(r_0', r_1', r_2', \ldots)$$

based on the removing of the resources $r_i$ and/or $$r_i'.$$

Sidelink pre-emption may happen between a first wireless device and a second wireless device. The first wireless device may select first resources for a first sidelink transmission. The first sidelink transmission may have a first priority. The second wireless device may select second resources for a second sidelink transmission. The second sidelink transmission may have a second priority. The first resources may partially or fully overlap with the second resources. The first wireless device may determine a resource collision between the first resources and the second resources, for example, based on or in response to the first resources and the second resources being partially or fully overlapped. The resource collision may imply a partial and/or a full overlap between the first resources and the second resources in time, frequency, code, power, and/or spatial domain. The first resources may comprise one or more first sidelink resource units in a sidelink resource pool (e.g., as described herein in FIG. 18). The second resources may comprise one or more second sidelink resource units in the sidelink resource pool. A partial resource collision between the first resources and the second resources may indicate that the at least one sidelink resource unit of the one or more first sidelink resource units belongs to the one or more second sidelink resource units. A full resource collision between the first resources and the second resources may indicate that the one or more first sidelink resource units may be the same as, or a subset of, the one or more second sidelink resource units. A higher (bigger, larger, greater, etc.) priority value may indicate a lower (smaller, less, etc.) priority of a sidelink transmission. A lower (smaller, less, etc.) priority value may indicate a higher (bigger, larger, greater, etc.) priority of the sidelink transmission. The first wireless device may determine the sidelink pre-emption based on the resource collision and the second priority being higher than (greater than, bigger, etc.) the first priority. The first wireless device may determine the sidelink pre-emption, for example, based on or in response to the resource collision and a value of the second priority not satisfying (e.g., being smaller than, less than, lower than, etc.) a value of the first priority. A first wireless device may determine a sidelink pre-emption, for example, based on or in response to a resource collision, a value of the second priority not satisfying (e.g., being smaller than, lower than, less than, etc.) a priority threshold, and/or the value of the second priority being less (smaller, lower, etc.) than a value of the first priority.

A first wireless device may trigger a first resource selection procedure for selecting first resources (e.g., selected resources 2530 after a resource selection with collision as described herein in FIG. 25) for a first sidelink transmission. A second wireless device may send (e.g., transmit) SCI indicating resource reservation of the first resource for a second sidelink transmission. The first wireless device may determine a resource collision of the first resources between the first sidelink transmission and the second sidelink transmission. The first wireless device may trigger a resource re-evaluation (e.g., a resource evaluation action of a second resource selection procedure) at or before time (m–T3) (e.g., as described herein in FIG. 25) based on the resource collision. The first wireless device may trigger a resource reselection (e.g., a resource selection action of the second resource selection procedure) for selecting second resources (e.g., reselected resources 2540 after resource reselection as described herein in FIG. 25) based on the resource re-evaluation. The start time of the second resources may be time m (e.g., as described herein in FIG. 25).

Configuration parameters of a sidelink BWP may indicate information in a sidelink communication session. A wireless device may receive one or more messages (e.g., RRC messages and/or SIB messages) comprising the configuration parameters of the sidelink BWP. The configuration parameters may comprise a first parameter (e.g., sl-StartSymbol) indicating a sidelink starting symbol. The first parameter may indicate a starting symbol (e.g., symbol #0, symbol #1, symbol #2, symbol #3, symbol #4, symbol #5, symbol #6, symbol #7, etc.) used for sidelink in a slot. For example, the slot may not comprise a SL-SSB (S-SSB). The wireless device may be (pre-)configured with one or more values of the sidelink starting symbol per sidelink BWP. The configuration parameters may comprise a second parameter (e.g., sl-LengthSymbols) indicating quantity/number of symbols (e.g., 7 symbols, 8 symbols, 9 symbols, 10 symbols, 11 symbols, 12 symbols, 13 symbols, 14 symbols, etc.) used sidelink in a slot. For example, the slot may not comprise a SL-SSB (S-SSB). The wireless device may be (pre-)configured with one or more values of the sidelink quantity/number of symbols (symbol length) per sidelink BWP.

The configuration parameters of the sidelink BWP may indicate one or more sidelink (communication) resource pools of the sidelink BWP (e.g., via SL-BWP-PoolConfig and/or SL-BWP-PoolConfigCommon). A resource pool may be a sidelink receiving resource pool (e.g., indicated by sl-RxPool) on the configured sidelink BWP. For example, the receiving resource pool may be used for PSFCH transmission/reception, if configured. A resource pool may be a sidelink transmission resource pool (e.g., indicated by sl-TxPool, and/or sl-ResourcePool) on the configured sidelink BWP. For example, the transmission resource pool may comprise resources by which the wireless device is allowed to send (e.g. transmit) NR sidelink communication (e.g., in exceptional conditions and/or based on network scheduling) on the configured BWP. For example, the transmission resource pool may be used for PSFCH transmission/reception, if configured.

Configuration parameters of a resource pool may indicate a size of a sub-channel of the resource pool (e.g., via sl-SubchannelSize) in unit of PRB. For example, the sub-channel size may indicate a minimum granularity in frequency domain for sensing and/or for PSSCH resource selection. Configuration parameters of a resource pool may indicate a lowest/starting RB index of a sub-channel with a lowest index in the resource pool with respect to lowest RB index RB index of the sidelink BWP (e.g., via sl-StartRB-Subchannel). Configuration parameters of a resource pool may indicate a quantity/number of sub-channels in the corresponding resource pool (e.g., via sl-NumSubchannel). For example, the sub-channels and/or the resource pool may consist of contiguous PRBs.

Configuration parameters of a resource pool may indicate configuration of one or more sidelink channels on/in the resource pool. For example, the configuration parameters may indicate that the resource pool is configured with PSSCH and/or PSCCH and/or PSFCH.

Configuration parameters of PSCCH may indicate a time resource for a PSCCH transmission in a slot. Configuration parameters of PSCCH (e.g., SL-PSCCH-Config) may indicate a quantity/number of symbols of PSCCH (e.g., 2 or 3) in the resource pool (e.g., via sl-TimeResourcePSCCH). Configuration parameters of PSCCH (e.g., SL-PSCCH-Config) may indicate a frequency resource for a PSCCH transmission in a corresponding resource pool (e.g., via sl-FreqResourcePSCCH). For example, the configuration parameters may indicate a quantity/number of PRBs for PSCCH in a resource pool, which may not be greater than a quantity/number of PRBs of a sub-channel of the resource pool (sub-channel size). Configuration parameters of PSSCH may indicate one or more DMRS time domain patterns (e.g., PSSCH DMRS symbols in a slot) for the PSSCH that may be used in the resource pool.

A resource pool may or may not be configured with PSFCH. Configuration parameters of PSFCH may indicate a period for the PSFCH in unit/number of slots within the resource pool (e.g., via sl-PSFCH-Period). For example, a value 0 of the period may indicate that no resource for PSFCH is configured in the resource pool and/or HARQ feedback for (all) transmissions in the resource pool is disabled. For example, the period may be 1 slot or 2 slots or 4 slots, etc. Configuration parameters of PSFCH may indicate a set of PRBs that are (actually) used for PSFCH transmission and reception (e.g., via sl-PSFCH-RB-Set). For example, a bitmap may indicate the set of PRBs, wherein a leftmost bit of the bitmap may refer to a lowest RB index in the resource pool, and so on. Configuration parameters of PSFCH may indicate a minimum time gap between PSFCH and the associated PSSCH in unit of slots (e.g., via sl-MinTimeGapPSFCH). Configuration parameters of PSFCH may indicate a quantity/number of PSFCH resources available for multiplexing HARQ-ACK information in a PSFCH transmission (e.g., via sl-PSFCH-CandidateResourceType).

A wireless device may be configured by higher layers (e.g., by RRC configuration parameters) with one or more sidelink resource pools. A sidelink resource pool may be for transmission of PSSCH and/or for reception of PSSCH. A sidelink resource pool may be associated with sidelink resource allocation mode 1 and/or sidelink resource allocation mode 2. In the frequency domain, a sidelink resource pool consists of one or more (e.g., sl-NumSubchannel) contiguous sub-channels. A sub-channel consists of one or more (e.g., sl-SubchannelSize) contiguous PRBs. For example, higher layer parameters (e.g., RRC configuration parameters) may indicate a quantity/number of sub-channels in a sidelink resource pool (e.g., sl-NumSubchannel) and/or a quantity/number of PRBs per sub-channel (e.g., sl-SubchannelSize).

A set of slots that may belong to a sidelink resource pool. The set of slots may be denoted by $$\left(t_0^{SL}, t_1^{SL}, \ldots, t_{T_{max}-1}^{SL}\right) \text{ where } 0 \le t_i^{SL} < 10240 \times 2^{\mu}, 0 \le i < T_{max}.$$

The slot index may be relative to slot #0 of the radio frame corresponding to SFN 0 of the serving cell or DFN 0. The set may include all the slots except $N_{s\_ssB}$ slots in which S-SS/PSBCH block (S-SSB) is configured. The set may include all the slots except $N_{nonSL}$ slots in each of which at least one of Y-th, (Y+1)-th, . . . , (Y+X−1)-th OFDM symbols are not semi-statically configured as UL as per the higher layer parameter (e.g., tdd-UL-DL-Configuration-Common-r16 of the serving cell if provided and/or sl-TDD-Configuration-r16 if provided and/or sl-TDD-Config-r16 of the received PSBCH if provided). For example, a higher layer (e.g., MAC or RRC) parameter may indicate a value of Y as the sidelink starting symbol of a slot (e.g., sl-StartSymbol). For example, a higher layer (e.g., MAC or RRC) parameter may indicate a value of X as the quantity/number of sidelink symbols in a slot (e.g., sl-LengthSymbols). The set may include all the slots except one or more reserved slots. The slots in the set may be arranged in increasing order of slot index. The wireless device may determine the set of slot assigned to a sidelink resource pool based on a bitmap $(b_0, b_1, \ldots, b_{L_{bitmap}-1})$ associated with the resource pool where $L_{bitmap}$ the length of the bitmap is configured by higher layers. A slot $$t_k^{SL}\left(0 \le k < 10240 \times 2^{\mu} - N_{S_{SSB}} - N_{nonSL} - N_{reserved}\right)$$

may belong to the set of slots if $b_k=1$ where $k'=k \bmod L_{bitmap}$. The slots in the set are re-indexed such that the subscripts i of the remaining slots $$t_i'^{SL}$$

are successive {0, 1, . . . , $T'_{max}-1$} where $T'_{max}$ is the quantity/number of the slots remaining in the set.

A wireless device may determine the set of resource blocks assigned to a sidelink resource pool, wherein the resource pool may consist of $N_{PRB}$ PRBs. The sub-channel m for m=0, 1, . . . , numSubchannel−1 may consist of a set of $n_{subCHsize}$ contiguous resource blocks with the physical resource block quantity/number $n_{PRB}=n_{subCHRBstart}+m \cdot n_{subCHsize}+j$ for j=0, 1, . . . , $n_{subCHsize}-1$, where $n_{subCHRBstart}$ and $n_{subCHsize}$ are given by higher layer parameters sl-StartRB-Subchannel and sl-SubchannelSize, respectively. A wireless device may not be expected to use the last $N_{PRB} \bmod n_{subCHsize}$ PRBs in the resource pool.

A wireless device may be provided/configured with a quantity/number of symbols in a resource pool for PSCCH (e.g., by sl-TimeResourcePSCCH). The PSCCH symbols may start from a second symbol that is available for sidelink transmissions in a slot. The wireless device may be provided/configured with a quantity/number of PRBs in the resource pool for PSCCH (e.g., by sl-FreqResourcePSCCH). The PSCCH PRBs may start from the lowest PRB of the lowest sub-channel of the associated PSSCH, e.g., for a PSCCH transmission with a SCI format 1-A. PSCCH resource/symbols may be configured in every slot of the resource pool. PSCCH resource/symbols may be configured in a subset of slot of the resource pool (e.g., based on a period comprising two or more slots).

Each PSSCH transmission may be associated with an PSCCH transmission. The PSCCH transmission may carry the 1st stage of the SCI associated with the PSSCH transmission. The 2nd stage of the associated SCI may be carried within the resource of the PSSCH. The wireless device may send (e.g., transmit) a first SCI (e.g., 1st stage SCI, SCI format 1-A) on PSCCH according to a PSCCH resource configuration in slot n and PSCCH resource m. For the associated PSSCH transmission in the same slot, the wireless device may send (e.g., transmit) one transport block (TB) with up to two layers (e.g., one layer or two layers). The quantity/number of layers (U) may be determined according to the 'Number of DMRS port' field in the SCI. The wireless device may determine the set of consecutive symbols within the slot for transmission of the PSSCH. The wireless device may determine the set of contiguous resource blocks for transmission of the PSSCH. Transform precoding may not be supported for PSSCH transmission. For example, wideband precoding may be supported for PSSCH transmission.

A wireless device may set the contents of the second SCI (e.g., 2nd stage SCI, SCI format 2-A). The wireless device may set values of the SCI fields comprising the 'HARQ process number' field, the 'NDI' field, the 'Source ID' field, the 'Destination ID' field, the 'HARQ feedback enabled/disabled indicator' field, the 'Cast type indicator' field, and/or the 'CSI request' field, as indicated by higher (e.g., MAC and/or RRC) layers. The wireless device may set the contents of the second SCI (e.g., 2nd stage SCI, SCI format 2-B). The wireless device may set values of the SCI fields comprising the 'HARQ process number' field, the 'NDI' field, the 'Source ID' field, the 'Destination ID' field, the 'HARQ feedback enabled/disabled indicator' field, the 'Zone ID' field, and/or the 'Communication range requirement' field, as indicated by higher (e.g., MAC and/or RRC) layers.

In an example, a transmission scheme may be defined for the PSSCH and may be used for all PSSCH transmissions. PSSCH transmission may be performed with up to two antenna ports, e.g., with antenna ports 1000-1001.

Dynamic grant, configured grant type 1, and/or configured grant type 2 may be supported for PSSCH and/or PSCCH transmission, for example, in sidelink resource allocation mode 1. The configured grant Type 2 sidelink transmission may be semi-persistently scheduled by a SL grant in a valid activation DCI.

A wireless device may send (e.g., transmit) the PSSCH in the same slot as the associated PSCCH. The (minimum) resource allocation unit in the time domain may be a slot. The wireless device may send (e.g., transmit) the PSSCH in consecutive symbols within the slot. The wireless device may not send (e.g., transmit) PSSCH in symbols which are not configured for sidelink. A symbol may be configured for sidelink, according to higher layer parameters indicating the starting sidelink symbol (e.g., startSLsymbols) and a quantity/number of consecutive sidelink symbols (e.g., lengthSLsymbols). For example, startSLsymbols is the symbol index of the first symbol of lengthSLsymbols consecutive symbols configured for sidelink. Within the slot, PSSCH resource allocation may start at symbol startSLsymbols+1 (e.g., second sidelink symbol of the slot). The wireless device may not send (e.g., transmit) PSSCH in symbols which are configured for use by PSFCH, if PSFCH is configured in this slot. The wireless device may not send (e.g., transmit) PSSCH in the last symbol configured for sidelink (e.g., last sidelink symbol of the slot). The wireless device may not send (e.g., transmit) PSSCH in the symbol immediately preceding the symbols which are configured for use by PSFCH, if PSFCH is configured in this slot. FIG. 19 shows an example of sidelink symbols and the PSSCH resource allocation within the slot.

A sidelink grant may be received dynamically on the PDCCH, and/or configured semi-persistently by RRC, and/or autonomously selected by the MAC entity of the wireless device. The MAC entity may have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 may be considered as a dynamic sidelink grant. The wireless device may be configured with sidelink resource allocation mode 1. The wireless device may for each PDCCH occasion and for each grant received for this PDCCH occasion (e.g., for the SL-RNTI or SLCS-RNTI of the wireless device), use the sidelink grant to determine PSCCH duration(s) and/or PSSCH duration(s) for initial transmission and/or one or more retransmission of a MAC PDU for a corresponding sidelink process (e.g., associated with a HARQ buffer and/or a HARQ process ID).

A wireless device may be configured with sidelink resource allocation mode 2 to send (e.g., transmit) using pool(s) of resources in a carrier, based on sensing or random selection. The MAC entity for each sidelink process may select to create a selected sidelink grant corresponding to transmissions of multiple MAC PDUs, and SL data may be available in a logical channel. The wireless device may select a resource pool, e.g., based on a parameter enabling/disabling sidelink HARQ feedback. The wireless device may perform the TX resource (re-)selection check on the selected pool of resources. The wireless device may select the time and frequency resources for one transmission opportunity from the resources pool and/or from the resources indicated by the physical layer, according to the amount of selected frequency resources and the remaining PDB of SL data available in the logical channel(s) allowed on the carrier. The wireless device may use the selected resource to select a set of periodic resources spaced by the resource reservation interval for transmissions of PSCCH and PSSCH corresponding to the quantity/number of transmission opportunities of MAC PDUs. The wireless device may consider the first set of transmission opportunities as the initial transmission opportunities and the other set(s) of transmission opportunities as the retransmission opportunities. The wireless device may consider the sets of initial transmission opportunities and retransmission opportunities as the selected sidelink grant. The wireless device may consider the set as the selected sidelink grant. The wireless device may use the selected sidelink grant to determine the set of PSCCH durations and the set of PSSCH durations.

A wireless device may, for each PSSCH duration and/or for each sidelink grant occurring in this PSSCH duration, select a MCS table allowed in the pool of resource which is associated with the sidelink grant. The wireless device may determine/set the resource reservation interval to a selected value (e.g., 0 or more). The wireless device may set the HARQ Process ID to the HARQ Process ID associated with this PSSCH duration and, if available, all subsequent PSSCH duration(s) occurring in this period for the configured sidelink grant, if the configured sidelink grant has been activated and this PSSCH duration corresponds to the first PSSCH transmission opportunity within this period of the configured sidelink grant. The wireless device may flush the HARQ buffer of sidelink process associated with the HARQ Process ID. The wireless device may deliver the sidelink grant, the selected MCS, and the associated HARQ information to the sidelink HARQ Entity for this PSSCH duration.

The MAC entity of the wireless device may include at most one sidelink HARQ entity for transmission on SL-SCH, which may maintain a quantity/number of parallel sidelink processes. The (maximum) quantity/number of sending (e.g., transmitting) sidelink processes associated with the sidelink HARQ entity may be a value (e.g., 16). A sidelink process may be configured for transmissions of multiple MAC PDUs. For transmissions of multiple MAC PDUs with sidelink resource allocation mode 2, the (maximum) quantity/number of sending (e.g., transmitting) sidelink processing associated with the sidelink HARQ Entity may be a second value (e.g., 4). A delivered sidelink grant and its associated sidelink transmission information may be associated with a sidelink process. Each sidelink process may support one TB.

For each sidelink grant and for the associated sidelink process, the sidelink HARQ Entity may obtain the MAC PDU to send (e.g., transmit) from the Multiplexing and assembly entity, if any. The wireless device may determine sidelink transmission information of the TB for the source and destination pair of the MAC PDU. The wireless device may set the Source Layer-1 ID to the 8 LSB of the Source Layer-2 ID of the MAC PDU, and set the Destination Layer-1 ID to the 16 LSB of the Destination Layer-2 ID of the MAC PDU. The wireless device may set the following information of the TB: cast type indicator, HARQ feedback enabler/disabler, priority, NDI, RV. The wireless device may deliver the MAC PDU, the sidelink grant and the sidelink transmission information of the TB to the associated sidelink process. The MAC entity of the wireless device may instruct the associated sidelink process to trigger a new transmission or a retransmission.

In sidelink resource allocation mode 1, for sidelink dynamic grant, the PSSCH transmission may be scheduled by DCI (e.g., DCI format 3_0). In sidelink resource allocation mode 1, for sidelink configured grant type 2, the configured grant may be activated by DCI (e.g., DCI format 3_0). In sidelink resource allocation mode 1, for sidelink dynamic grant and sidelink configured grant type 2 the "Time gap" field value m of the DCI may provide an index m+1 into a slot offset table (e.g., the table may be configured by higher layer parameter sl-DCI-ToSL-Trans). The table value at index m+1 may be referred to as slot offset $K_{SL}$. The slot of the first sidelink transmission scheduled by the DCI may be the first SL slot of the corresponding resource pool that starts not earlier than $$T_{DL} - \frac{T_{TA}}{2} + K_{SL} \times T_{slot},$$

where $T_{DL}$ may be the starting time of the downlink slot carrying the corresponding DCI, $T_{TA}$ may be the timing advance value corresponding to the TAG of the serving cell on which the DCI is received and $K_{SL}$ may be the slot offset between the slot of the DCI and the first sidelink transmission scheduled by DCI and $T_{slot}$ is the SL slot duration. The "Configuration index" field of the DCI, if provided and not reserved, may indicate the index of the sidelink configured type 2. In sidelink resource allocation mode 1, for sidelink configured grant type 1, the slot of the first sidelink transmissions may follow the higher layer configuration.

The resource allocation unit in the frequency domain may be the sub-channel. The sub-channel assignment for sidelink transmission may be determined using the "Frequency resource assignment" field in the associated SCI. The lowest sub-channel for sidelink transmission may be the sub-channel on which the lowest PRB of the associated PSCCH is sent (e.g., transmitted). For example, the resources corresponding to a union of the PSCCH that scheduled the PSSCH and associated PSCCH DM-RS may not be available for the PSSCH if a PSSCH scheduled by a PSCCH would overlap with resources containing the PSCCH.

The redundancy version for sending (e.g., transmitting) a TB may be given by the "Redundancy version" field in the $2^{nd}$ stage SCI (e.g., SCI format 2-A or 2-B). The modulation and coding scheme $I_{MCS}$ may be given by the 'Modulation and coding scheme' field in the $1^{st}$ stage SCI (e.g., SCI format 1-A). The wireless device may determine the MCS table based on the following: a pre-defined table may be used if no additional MCS table is configured by higher layer parameter sl-MCS-Table; otherwise an MCS table is determined based on the 'MCS table indicator' field in the $1^{st}$ stage SCI (e.g., SCI format 1-A). The wireless device may use $I_{MCS}$ and the MCS table determined according to the previous step to determine the modulation order ($Q_m$) and Target code rate (R) used in the physical sidelink shared channel.

A wireless device may determine the TB size (TBS) based on the quantity/number of REs ($N_{RE}$) within the slot. The wireless device may determine the quantity/number of REs allocated for PSSCH within a PRB $$(N'_{RE}) \text{ by } N'_{RE} = N_{SC}^{RB}\left(N_{symb}^{sh} - N_{symb}^{PSFCH}\right) - N_{oh}^{PRB} - N_{RE}^{DMRS},$$

where $N_{sc}^{RB} = 12$ is the quantity/number of subcarriers in a physical resource block;

$$N_{symb}^{sh} = sl - LengthSymbols - 2,$$

where sl-LengthSymbols is the quantity/number of sidelink symbols within the slot provided by higher layers;

$$N_{symb}^{PSFCH} = 3$$

if 'PSFCH overhead indication' field of SCI format 1-A indicates "1", and $$N_{symb}^{PSFCH} = 0$$

otherwise, if higher layer parameter $$sl\text{-}PSFCH\text{-}Period \text{ is } 2 \text{ or } 4.\ N_{symb}^{PSFCH} = 0$$

if higher layer parameter sl-PSFCH-Period is 0.

$$N_{symb}^{PSFCH} = 3$$

if higher layer parameter sl-PSFCH-Period is 1.

$$N_{oh}^{PRB}$$

may be the overhead given by higher layer parameter sl-X-Overhead.

$$N_{RE}^{DMRS}$$

is given by higher layer parameter sl-PSSCH-DMRS-TimePattern. The wireless device may determine the total quantity/number of REs allocated for $$PSSCH(N_{RE}) \text{ by } N_{RE} = N'_{RE} \cdot n_{PRB} - N_{RE}^{SCI,1} - N_{RE}^{SCI,2},$$

where $n_{PRB}$ may be the total quantity/number of allocated PRBs for the PSSCH;

$$N_{RE}^{SCI,1}$$

may be the total quantity/number of REs occupied by the PSCCH and PSCCH DM-RS;

$$N_{RE}^{SCI,2}$$

may be the quantity/number of coded modulation symbols generated for $2^{nd}$-stage SCI transmission (prior to duplication for the $2^{nd}$ layer, if present). The wireless device may determine the TBS based on the total quantity/number of REs allocated for PSSCH ($N_{RE}$) and/or the modulation order ($Q_m$) and Target code rate (R) used in the physical sidelink shared channel.

For the single codeword q=0 of a PSSCH, the block of bits $$b^{(q)}(0), \ldots, b^{(q)}\left(M_{bit}^{(q)} - 1\right), M_{bit}^{(q)} = M_{bit,SCI2}^{(q)} + M_{bit,data}^{(q)}$$

is the quantity/number of bits in codeword q sent (e.g., transmitted) on the physical channel, may be scrambled prior to modulation (e.g., using a scrambling sequence based on a CRC of the PSCCH associated with the PSSCH). For the single codeword q=0, the block of scrambled bits may be modulated, resulting in a block of complex-valued modulation symbols $$d^{(q)}(0), \ldots, d^{(q)}\left(M_{symb}^{(q)} - 1\right) \text{ where } M_{symb}^{(q)} = M_{symb,1}^{(q)} + M_{symb,2}^{(q)}.$$

Layer mapping may be done with the quantity/number of layers $v \in \{1,2\}$, resulting in $$x(i) = \left[x^{(0)}(i) \ldots x^{(v-1)}(i)\right]^T, i = 0, 1, \ldots, M_{symb}^{layer} - 1.$$

The block of vectors $[x^{(0)}(i) \ldots x^{(v-1)}(i)]^T$ may be pre-coded where the precoding matrix W equals the identity matrix and $$M_{symb}^{ap} = M_{symb}^{layer}.$$

For each of the antenna ports used for transmission of the PSSCH, the block of complex-valued symbols $$z^{(p)}(0), \ldots, z^{(p)}\left(M_{symb}^{ap} - 1\right)$$

may be multiplied with the amplitude scaling factor $$\beta_{DMRS}^{PSSCH}$$

in order to conform to the transmit power and mapped to resource elements $(k', l)_{p,\mu}$ in the virtual resource blocks assigned for transmission, where k'=0 may be the first subcarrier in the lowest-numbered virtual resource block assigned for transmission. The mapping operation may be done in two steps: first, the complex-valued symbols corresponding to the bit for the $2^{nd}$-stage SCI in increasing order of first the index k' over the assigned virtual resource blocks and then the index 1, starting from the first PSSCH symbol carrying an associated DM-RS, wherein the corresponding resource elements in the corresponding physical resource blocks may not be used for transmission of the associated DM-RS, PT-RS, or PSCCH; secondly, the complex-valued modulation symbols not corresponding to the $2^{nd}$-stage SCI may be in increasing order of first the index k' over the assigned virtual resource blocks, and then the index 1 with the starting position, wherein the resource elements may not be used for 2nd-stage SCI in the first step; and/or the corresponding resource elements in the corresponding physical resource blocks may not be used for transmission of the associated DM-RS, PT-RS, CSI-RS, or PSCCH.

The resource elements used for the PSSCH in the first OFDM symbol in the mapping operation above, including DM-RS, PT-RS, and/or CSI-RS occurring in the first OFDM symbol, may be duplicated in the OFDM symbol immediately preceding the first OFDM symbol in the mapping (e.g., for AGC training purposes). Virtual resource blocks may be mapped to physical resource blocks according to non-interleaved mapping. For non-interleaved VRB-to-PRB mapping, virtual resource block n is mapped to physical resource block n.

For a PSCCH, the block of bits b(0), . . . , $b(M_{bit}-1)$, where $M_{bit}$ may be the quantity/number of bits sent (e.g., transmitted) on the physical channel, may be scrambled prior to modulation, resulting in a block of scrambled bits $\tilde{b}(0), \ldots, \tilde{b}(M_{bit}-1)$ according to $\tilde{b}(i)=(b(i)+c(i)) \bmod 2$. The block of scrambled bits $\tilde{b}(0), \ldots, \tilde{b}(M_{bit}-1)$ may be modulated using QPSK, resulting in a block of complex-valued modulation symbols d(0), . . . , $d(M_{symb}-1)$ where $M_{symb}=M_{bit}/2$. The set of complex-valued modulation symbols d(0), . . . , $d(M_{symb}-1)$ may be multiplied with the amplitude scaling factor $$\beta_{DMRS}^{PSCCH}$$

in order to conform to the transmit power and mapped in sequence starting with d(0) to resource elements $(k,l)_{p,\mu}$ assigned for transmission, and not used for the demodulation reference signals associated with PSCCH, in increasing order of first the index k over the assigned physical resources, and then the index 1 on antenna port p (e.g., p=2000). The resource elements used for the PSCCH in the first OFDM symbol in the mapping operation above, including DM-RS, PT-RS, and/or CSI-RS occurring in the first OFDM symbol, may be duplicated in the immediately preceding OFDM symbol (e.g., for AGC training purposes).

For sidelink resource allocation mode 1, a wireless device upon detection of a first SCI (e.g., SCI format 1-A) on PSCCH may decode PSSCH according to the detected second SCI (e.g., SCI formats 2-A and/or 2-B), and associated PSSCH resource configuration configured by higher layers. The wireless device may not be required to decode more than one PSCCH at each PSCCH resource candidate. For sidelink resource allocation mode 2, the wireless device upon detection of a first SCI (e.g., SCI format 1-A) on PSCCH may decode PSSCH according to the detected second SCI (e.g., SCI formats 2-A and/or 2-B), and associated PSSCH resource configuration configured by higher layers. The wireless device may not be required to decode more than one PSCCH at each PSCCH resource candidate. The wireless device may be required to decode neither the corresponding second SCI (e.g., SCI formats 2-A and/or 2-B) nor the PSSCH associated with a first SCI (e.g., SCI format 1-A) if the first SCI indicates an MCS table that the wireless device does not support.

Throughout this disclosure, a (sub)set of symbols of a slot, associated with a resource pool of a sidelink BWP, that is (pre-)configured for sidelink communication (e.g., transmission and/or reception) may be referred to as 'sidelink symbols' of the slot. The sidelink symbols may be contiguous/consecutive symbols of a slot. The sidelink symbols may start from a sidelink starting symbol (e.g., indicated by an RRC parameter), e.g., sidelink starting symbol may be symbol #0 or symbol #1, and so on. The sidelink symbols may comprise one or more symbols of the slot, wherein a parameter (e.g., indicated by RRC) may indicate the quantity/number of sidelink symbols of the slot. The sidelink symbols may comprise one or more guard symbols, e.g., to provide a time gap for the wireless device to switch from a transmission mode to a reception mode. For example, the OFDM symbol immediately following the last symbol used for PSSCH, PSFCH, and/or S-SSB may serve as a guard symbol. As shown in FIG. 19, the sidelink symbols may comprise one or more PSCCH resources/occasions and/or one or more PSCCH resources and/or zero or more PSFCH resources/occasions. The sidelink symbols may comprise one or more AGC symbols.

An AGC symbol may comprise duplication of (content of) the resource elements of the immediately succeeding/following symbol (e.g., a TB and/or SCI may be mapped to the immediately succeeding symbol). The AGC symbol may be a dummy OFDM symbol. The AGC symbol may comprise a reference signal. For example, the first OFDM symbol of a PSSCH and its associated PSCCH may be duplicated (e.g., in the AGC symbol that is immediately before the first OFDM symbol of the PSSCH). For example, the first OFDM symbol of a PSFCH may be duplicated (e.g., for AGC training purposes).

In a sidelink slot structure configuration, the first symbol may be used for automatic ga in control (AGC) and the last symbol is used for a gap. During an AGC symbol, a receiving and/or sensing wireless device may perform AGC training. For AGC training, a wireless device may detect the energy/power of a signal in the channel during the AGC symbol and apply a hardware gain to maximize the signal amplitude to the dynamic range of the analog to digital convertor (ADC) at the receiver. The receiver may determine a gain for a received signal, and an AGC duration may allow time for the receiver to determine the gain and apply the gain (e.g., hardware gain component) such that when the receiver receives the data (e.g., in the next symbol(s)), the gain of the amplifier has already been adjusted.

For sidelink communication, the transmitter wireless device may not map data/control information to the AGC symbol. The AGC symbol may not be used for communication and sending information other than energy. The AGC symbol may be a last symbol prior to an earliest symbol of a transmission, such that a gap between AGC symbol and signal/channel transmission may be minimized and an accurate gain may be determined for receiving the following signal/channel. For example, the AGC symbol, as shown in FIG. 19, may be a symbol immediately preceding the first/earliest symbol of a resource used for a transmission via a channel (e.g., PSCCH and/or PSSCH and/or PSFCH transmission).

The AGC symbol may comprise duplication of resource elements of the next (immediately following) OFDM symbol. The AGC symbol may comprise any signal, e.g., a per-defined signal/sequence and/or dummy information. The purpose of the AGC symbol is to allow the receiver wireless device to perform AGC training and adjust the hardware gain for a most efficient reception of the following signal. Throughout this disclosure, the "AGC symbol" may be referred to as "duplicated symbol" and/or "duplication"

and/or “the symbol used for duplication” and/or “the immediately preceding symbol comprising the duplication of a first symbol”.

Figure 28:
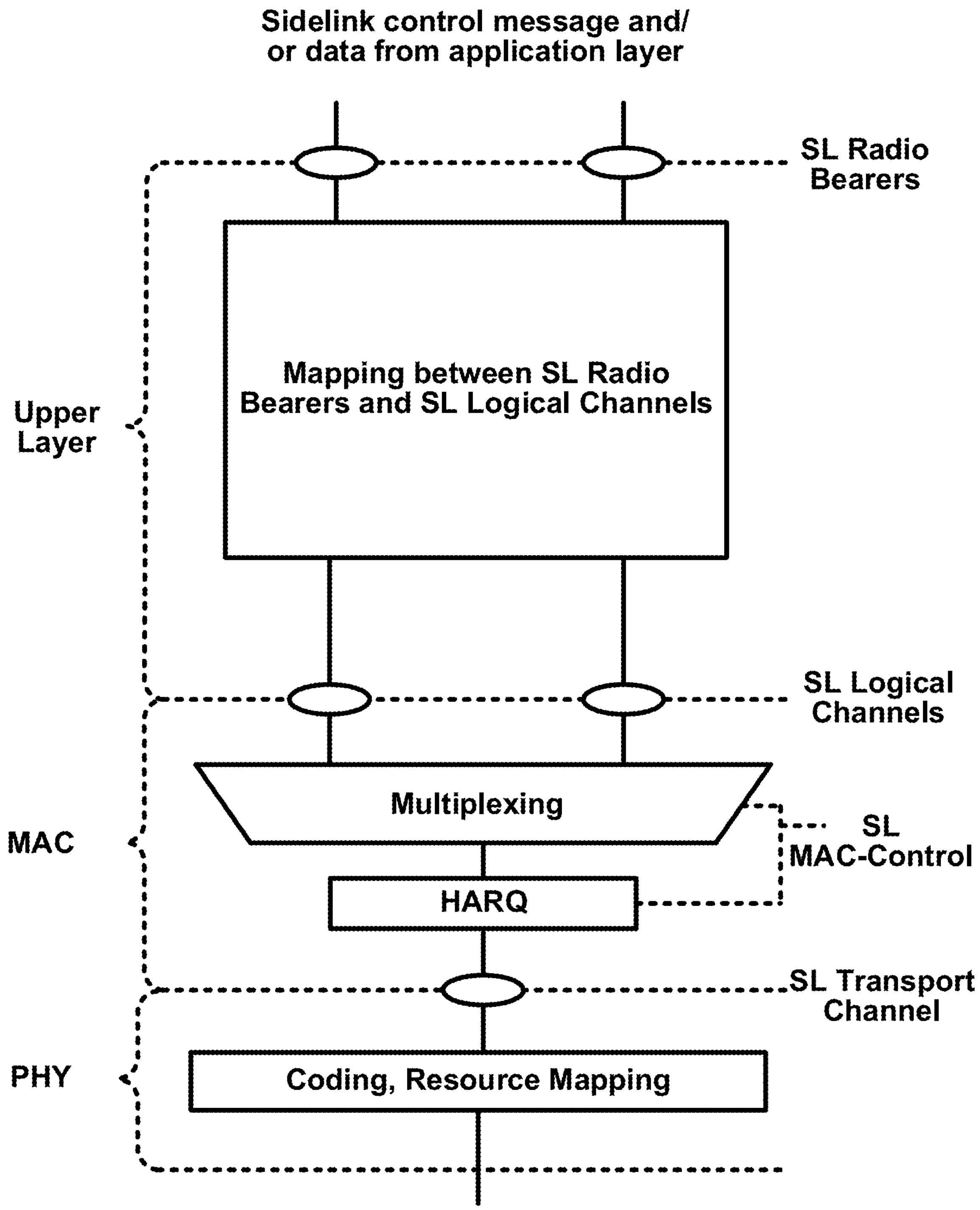
FIG. 28 shows an example of services provided between protocol layers of the sidelink protocol stack.

FIG. 28 shows an example of services provided between protocol layers of the sidelink protocol stack. Starting from the top of FIG. 28, the wireless device may receive sidelink control data/messages and/or sidelink services through a PDU session. The PDU session may have one or more QoS flows. The wireless device may map SL IP packets to the one or more QoS flows of the PDU session based on QoS requirements (e.g., in terms of delay, data rate, and/or error rate). The upper layers may perform mapping/de-mapping between the one or more QoS flows and one or more sidelink data radio bearers (e.g., SL-DRBs). The upper layers may perform mapping/de-mapping between the one or more control messages and one or more sidelink signaling radio bearers (e.g., SL-SRBs). The mapping/de-mapping between the QoS flows and the data radio bearers may be determined by the base station. The upper layer at the wireless device may be informed of the mapping between the QoS flows and the data radio bearers through reflective mapping or control signaling received from the base station.

As shown in FIG. 28, the upper layers may perform mapping/de-mapping between the SL radio bearers, including SL-DRBs and SL-SRBs, and SL logical channels. SL logical channels may comprise sidelink broadcast control channel (SBCCH), sidelink control channel (SCCH), and sidelink traffic channel (STCH).

A wireless device (e.g., the MAC entity of the wireless device) may perform multiplexing/demultiplexing of SL logical channels and/or mapping between SL logical channels and SL transport channels. SL transport channels may comprise sidelink broadcast channel (SL-BCH) and sidelink shared channel (SL-SCH). The multiplexing/demultiplexing may include multiplexing/demultiplexing of data units, belonging to the one or more SL logical channels, into/from SL Transport Blocks (TBs) delivered to/from the PHY. The multiplexing/demultiplexing may comprise multiplexing/demultiplexing of SL control information (e.g., SL MAC control elements or SL MAC-CEs) from MAC-control unit. The wireless device (e.g., the MAC entity of the wireless device) may be configured to perform scheduling, scheduling information reporting, and priority handling between wireless devices by means of dynamic scheduling, error correction through Hybrid Automatic Repeat Request (HARQ) (e.g., one HARQ entity per carrier in case of Carrier Aggregation (CA)), priority handling between SL logical channels of the wireless device by means of logical channel prioritization (LCP), and/or padding. The wireless device (e.g., the MAC entity of the wireless device) may support one or more numerologies and/or transmission timings. Mapping restrictions in a logical channel prioritization may control which numerology and/or transmission timing a SL logical channel may use.

A wireless device (e.g., the MAC entity of the wireless device) may provide the following services and functions over the PC5 interface: Radio resource selection (referring to FIG. 24 and FIG. 25), packet filtering, priority handling between uplink and sidelink transmissions for a given wireless device, and/or sidelink CSI reporting. With LCP restrictions in a wireless device (e.g., a MAC entity of a wireless device), only sidelink logical channels belonging to the same destination may be multiplexed into a MAC PDU for every unicast, groupcast and broadcast transmission which is associated to the destination. NG-RAN may control whether a sidelink logical channel can utilize the resources allocated to a configured sidelink grant Type 1. For transmissions to RX wireless device (s) using SL DRX operation, LCP may ensure that a TX wireless device sends (e.g., transmits) data in the active time of the RX UE(s). For packet filtering, a SL-SCH MAC header, including portions of both Source Layer-2 ID and a Destination Layer-2 ID, is added to each MAC PDU. LCID included within a MAC subheader may uniquely identify a logical channel within the scope of the Source Layer-2 ID and Destination Layer-2 ID combination.

The PHY layer may perform mapping of SL transport channels to SL physical channels and digital and analog signal processing functions for sending and receiving information over the air interface. These digital and analog signal processing functions may include, for example, coding/decoding and modulation/demodulation. The PHY may perform multi-antenna mapping. As shown in FIG. 28, the PHY may provide one or more SL transport channels as a service to the MAC.

Figure 29:
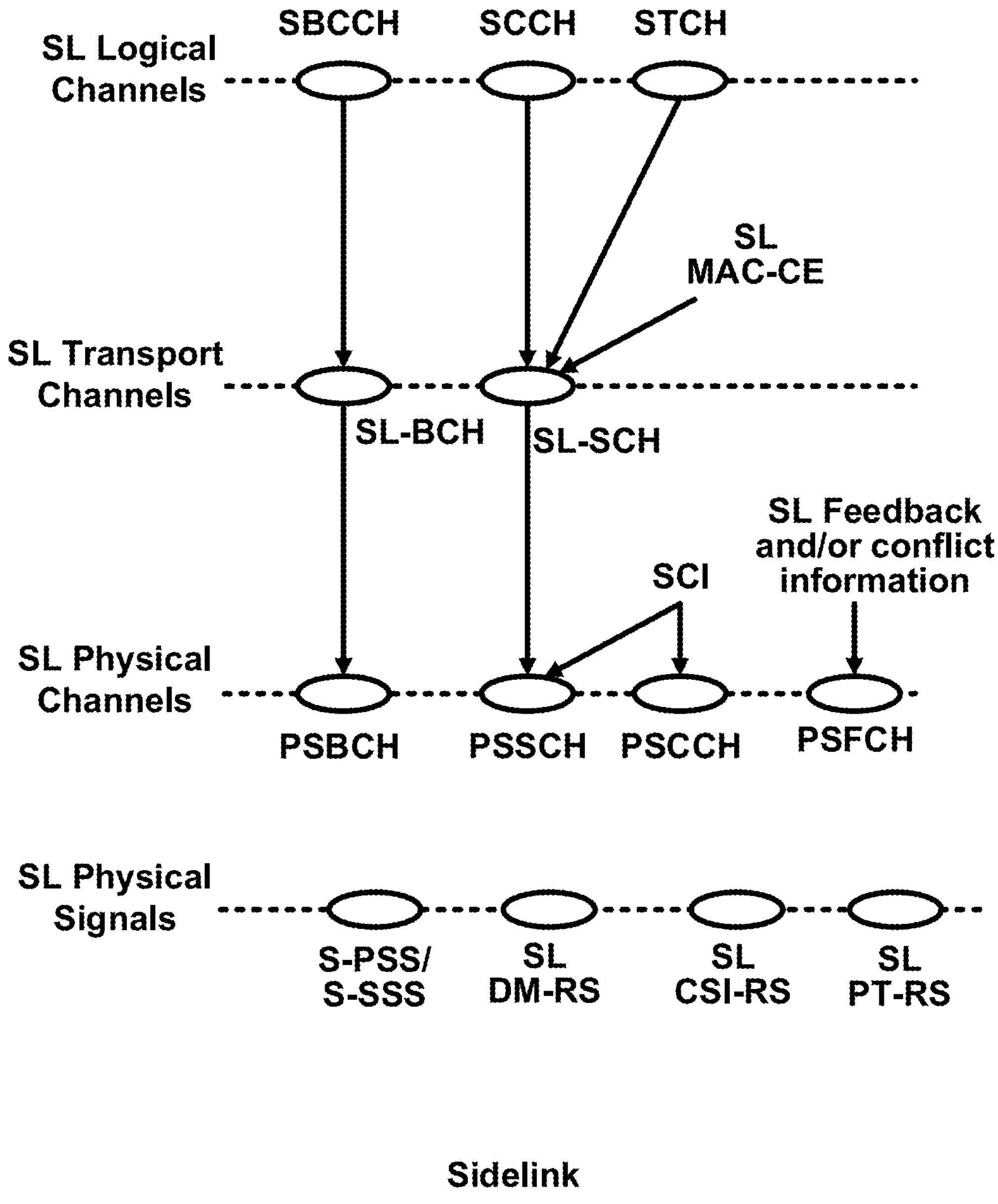
FIG. 29 shows, for sidelink, a mapping between SL logical channels, SL transport channels, and SL physical channels.

FIG. 29 shows, for sidelink, a mapping between SL logical channels, SL transport channels, and SL physical channels. Information may be passed through channels between the RLC, the MAC, and the PHY of the SL protocol stack. A SL logical channel may be used between the RLC and the MAC and may be classified as a sidelink control channel that carries control and configuration information in the SL control plane or as a SL traffic channel that carries data in the SL user plane. A SL logical channel may be defined by the type of information it carries. The set of SL logical channels defined by SL may include, for example: sidelink Control Channel (SCCH): a sidelink channel for sending (e.g., transmitting) control information (i.e. PC5-RRC and PC5-S messages) from one wireless device to other wireless device(s); sidelink Traffic Channel (STCH): a sidelink channel for sending (e.g., transmitting) user information from one wireless device to other wireless device(s); and sidelink Broadcast Control Channel (SBCCH): a sidelink channel for broadcasting sidelink system information from one wireless device to other wireless device(s).

SL transport channels may be used between the MAC and PHY layers and may be defined by how the information they carry is sent (e.g., transmitted) over the air interface. The set of SL transport channels may be defined by SL include, for example: Sidelink Broadcast Channel (SL-BCH); and Sidelink Shared Channel (SL-SCH). As shown in FIG. 29, the following connections between SL logical channels and SL transport channels may exist: SCCH can be mapped to SL-SCH; STCH can be mapped to SL-SCH; and SBCCH can be mapped to SL-BCH.

The PHY may use SL physical channels to pass information between processing levels of the PHY. A SL physical channel may have an associated set of time-frequency resources for carrying the information of one or more SL transport channels. The PHY may generate sidelink control information (SCI) to support the low-level operation of the PHY and provide the control information to the lower levels of the PHY via physical control channels, known as L1/L2 control channels. Similar to the SL physical control channels, the physical layer may generate SL physical signals to support the low-level operation of the physical layer. As shown in FIG. 29, the SL physical signals defined by SL may include: sidelink primary synchronization signals (S-PSS), sidelink secondary synchronization signals (S-SSS), sidelink channel state information reference signals (SL CSI-RS), sidelink demodulation reference signals (SL DMRS), and sidelink phase-tracking reference signals (SL PT RS).

The set of physical SL channels and signals defined by SL may include, for example: the sidelink synchronization signal consisting of sidelink primary and sidelink secondary synchronization signals (S-PSS, S-SSS), each occupying 2 symbols and 127 subcarriers, and Physical Sidelink Broadcast Channel (PSBCH) occupying 9 and 5 symbols for normal and extended CP cases respectively, including the associated SL DM-RS; Physical Sidelink Shared Channel (PSSCH) sending (e.g., transmitting) the TBs of data themselves, and control information for HARQ procedures and SL CSI-RS and CSI feedback triggers, etc., at least 6 OFDM symbols within a slot are used for PSSCH transmission, and PSSCH transmission is associated with a SL DM-RS and may be associated with a SL PT-RS; Physical Sidelink Control Channel (PSCCH) which indicates resource and other transmission parameters used by a wireless device for PSSCH, and PSCCH transmission is associated with a SL DM-RS. Physical Sidelink Feedback Channel (PSFCH) may carry HARQ feedback over the sidelink from a wireless device which is an intended recipient of a PSSCH transmission to the wireless device which performed the transmission, and PSFCH sequence may be sent (e.g., transmitted) in one PRB repeated over two OFDM symbols near the end of the sidelink resource in a slot.

For one or more PDUs associated with one SCI, wireless device (e.g., the MAC entity of the wireless device) may consider only logical channels with the same Source Layer-2 ID-Destination Layer-2 ID pair for one of unicast, groupcast and broadcast which is associated with the pair. Multiple transmissions for different sidelink processes may be allowed to be independently performed in different PSSCH durations. Sidelink data for discovery and sidelink data for non-discovery sent (e.g., transmitted) by a wireless device may not be multiplexed into the same TB because they are always associated with different destination L2 IDs.

When mapping SL logical channels and/or MAC-CEs to SL transport channels, the MAC layer may perform logical channel prioritization (LCP). The sidelink Logical Channel Prioritization procedure may be applied whenever a new transmission is performed. RRC may control the scheduling of sidelink data by signaling for each logical channel: a logical channel priority (e.g., via sl-Priority) where an increasing priority value indicates a lower priority level; a sidelink Prioritized Bit Rate (sPBR) (e.g., via sl-Prioritised-BitRate); and a sidelink Bucket Size Duration (sBSD) (e.g., via sl-BucketSizeDuration). RRC may additionally control the LCP procedure by configuring mapping restrictions for each logical channel: sl-configuredGrantType1Allowed which sets whether a configured grant Type 1 can be used for sidelink transmission; sl-AllowedCG-List which sets the allowed configured grant(s) for sidelink transmission; and sl-HARQ-FeedbackEnabled which sets whether the logical channel is allowed to be multiplexed with logical channel(s) with sl-HARQ-FeedbackEnabled set to enabled or disabled. The following UE variable may be used for the Logical channel prioritization procedure: SBj which is maintained for each logical channel j. The wireless device (e.g., the MAC entity of the wireless device) may initialize SBj of the logical channel to zero when the logical channel is established. For each logical channel j, the wireless device (e.g., the MAC entity of the wireless device) may increment SBj by the product sPBR×T before every instance of the LCP procedure, where T is the time elapsed since SBj was last incremented; if the value of SBj is greater than the sidelink bucket size (i.e. sPBR×sBSD): set SBj to the sidelink bucket size.

For each SCI corresponding to a new transmission, the wireless device may select a Destination UE/ID (e.g., associated with sidelink discovery, and/or associated to one of unicast, groupcast and broadcast), and having at least one of the MAC CE and/or the logical channel. The at least one MAC-Ce and/or logical channel may have the highest priority (e.g., based on the RRC parameter indicating the corresponding logical channel priority), among the logical channels and MAC CE(s), if any, for the SL grant associated to the SCI. SL data for sidelink communication may be available for transmission in the logical channels. SBj>0, in case there is any logical channel having SBj>0. For the SL grant being a Configured Grant Type 1, an RRC parameter may indicate that multiplexing the respective logical channel in CG type 1 is allowed (e.g., sl-configuredGrantType1Allowed, if configured, is set to true). sl-AllowedCG-List, if configured, may include the configured grant index associated to the SL grant. sl-HARQ-FeedbackEnabled may be set to disabled, if PSFCH is not configured for the SL grant associated to the SCI.

A wireless device may select the logical channels satisfying the following conditions among the logical channels belonging to the selected Destination:

1) SL data may be available for transmission; and/or
2) sl-configuredGrantType1Allowed, if configured, may be set to true in case the SL grant is a Configured Grant Type 1; and/or
3) sl-AllowedCG-List, if configured, may include the configured grant index associated to the SL grant.
4) sl-HARQ-FeedbackEnabled may be set to a value that satisfies the following conditions:
    i) if PSFCH is configured for the sidelink grant associated to the SCI and the wireless device is capable of PSFCH reception,
        a) the RRC parameter indicating HARQ feedback enablement of the logical channel (e.g., sl-HARQ-FeedbackEnabled) may be set to enabled, if sl-HARQ-FeedbackEnabled is set to enabled for the highest priority logical channel satisfying the above conditions; or
        b) the RRC parameter indicating HARQ feedback enablement of the logical channel (e.g., sl-HARQ-FeedbackEnabled) may be set to disabled, if sl-HARQ-FeedbackEnabled is set to disabled for the highest priority logical channel satisfying the above conditions.
    ii) the RRC parameter indicating HARQ feedback enablement of the logical channel (e.g., sl-HARQ-FeedbackEnabled) may be set to disabled if PSFCH is not configured for the sidelink grant associated to the SCI or the wireless device is not capable of PSFCH reception. HARQ feedback enabled/disabled indicator may be set to disabled for the transmission of a MAC PDU only carrying CSI reporting MAC CE or Sidelink DRX Command MAC CE or Sidelink Inter-UE Coordination Request MAC CE or Sidelink Inter-wireless device Coordination Information MAC CE.

For each SCI corresponding to a new transmission, the wireless device may allocate resources to the logical channels as follows: one or more logical channels selected for the SL grant with SBj>0 are allocated resources in a decreasing priority order (e.g., order of logical channel priority indicated by the RRC configuration parameters). The wireless device (e.g., the MAC entity of the wireless device) shall allocate resources for all the data that is available for transmission on the logical channel before meeting the sPBR of the lower priority logical channel(s) if the sPBR of a logical channel is set to infinity. The wireless device may decrement SBj by the total size of MAC SDUs served to logical channel j above. All the selected logical channels may be served in a strict decreasing priority order (e.g., regardless of the value of SBj) until either the data for that logical channel or the SL grant is exhausted, whichever comes first, if any resources remain. Logical channels configured with equal priority may be served equally.

A wireless device may prioritize logical channels in accordance with the following order (highest priority listed first): data from SCCH; Sidelink CSI Reporting MAC CE; Sidelink Inter-UE Coordination Request MAC CE and Sidelink Inter-UE Coordination Information MAC CE; Sidelink DRX Command MAC CE; and data from any STCH. The priority order between Sidelink Inter-UE Coordination Request MAC CE and Sidelink Inter-UE Coordination Information MAC CE may be up to wireless device implementation. The wireless device (e.g., the MAC entity of the wireless device) may multiplex one or more MAC CEs and one or more MAC SDUs in a MAC PDU, based on the logical channel prioritization procedure above.

The sidelink data flow may begin if SDAP receives SL IP packets from one or more QoS flows and maps the SL IP packets to SL data radio bearers (SL DRBs). The SDAP may map a first SL IP packet to a first SL DRB and map a second SL IP packet to a second SL DRB. An SDAP header may be added to an SL IP packet. The data unit from/to a higher protocol layer may be referred to as a service data unit (SDU) of the lower protocol layer and the data unit to/from a lower protocol layer is referred to as a protocol data unit (PDU) of the higher protocol layer. For example, the data unit from the SDAP may be an SDU of lower protocol layer PDCP and may be a PDU of the SDAP.

The SDAP may receive SL control messages/data (e.g., from the control plane) and map the control messages/data to SL signaling radio bearers (SL SRBs). The SDAP may map a first SL control message/data to a first SL SRB and map a second SL control message/data to a second SL SRB. An SDAP header may be added to an SL control message/data.

The remaining protocol layers may perform their associated functionality (e.g., with respect to FIG. 28), add corresponding headers, and forward their respective outputs to the next lower layer. For example, the PDCP may perform IP-header compression and ciphering, and may forward its output to the RLC. The RLC may optionally perform segmentation and forward its output (RLC PDU=MAC SDU) to the wireless device (e.g., the MAC entity of the wireless device). The wireless device (e.g., the MAC entity of the wireless device) may multiplex a quantity/number of RLC PDUs (or MAC SDUs) and may attach a MAC subheader to a MAC SDU to form a MAC PDU (or a PHY SDU or a SL transport block).

A MAC SDU may comprise one or more SCCH SDUs (e.g., data from one or more SL control (SCCH) logical channels) associated with one or more SL SRBs. For example, data from a SL SRB may be multiplexed/inserted in a SCCH SDU. A MAC SDU may comprise one or more STCH SDUs (e.g., data from one or more SL traffic (STCH) logical channels) associated with one or more SL DRBs. For example, data from a SL DRB may be multiplexed/inserted in a STCH SDU.

A SL MAC PDU may comprise one SL-SCH subheader and one or more MAC subPDUs (e.g., MAC SDU and/or MAC-CE and/or padding). Each MAC subPDU may comprise one of the following: A MAC subheader only (including padding); A MAC subheader and a MAC SDU; A MAC subheader and a MAC CE; A MAC subheader and padding. The MAC SDUs may be of variable sizes. Each MAC subheader (e.g., except SL-SCH subheader) may correspond to either a MAC SDU, a MAC CE, or padding.

The data unit from MAC layer (MAC PDU) to PHY layer (PHY SDU) may be referred to as a transport block (TB). Throughout this disclosure, the terms MAC PDU and PHY SDU and TB may be used interchangeably.

Figure 30A:
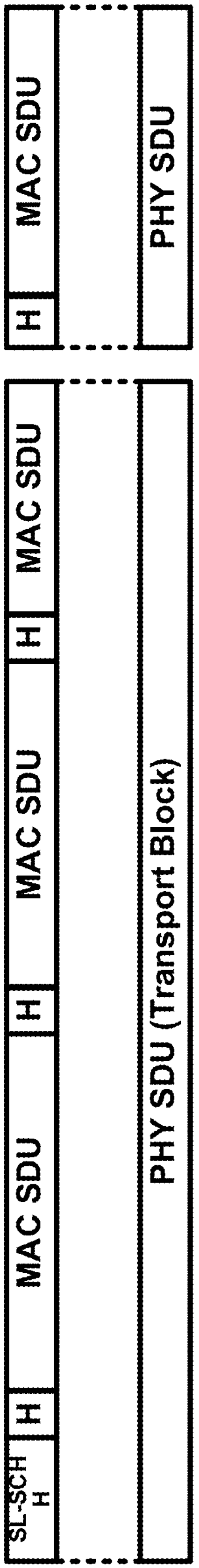
FIG. 30A and FIG. 30B show examples of TB generation for SL.
Figure 30B:
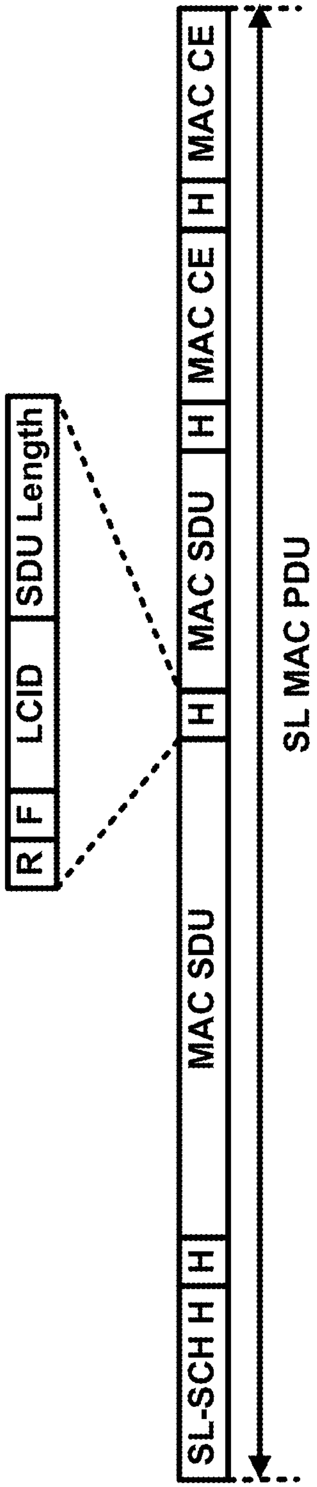

FIG. 30A and FIG. 30B show examples of TB generation for SL. In FIG. 30A, wireless device (e.g., the MAC entity of the wireless device) may generate two SL TBs (or SL MAC PDUs) by multiplexing one or more MAC SDUs in each SL MAC PDU. The wireless device may multiplexe three MAC SDUs in a first SL MAC PDU (or SL PHY SDU or SL transport block (TB)), and one MAC SDU in a second SL MAC PDU (or SL PHY SDU or SL transport block). The wireless device (MAC) may attach a MAC subheader to a MAC SDU to form a SL MAC PDU.

The MAC subheaders (labeled with an "H" in FIG. 30A and FIG. 30B) may be distributed across the SL MAC PDU, as shown in FIG. 30A. For example, one MAC subheader may be placed before a corresponding MAC SDU. As shown in FIG. 30A, a SL-SCH subheader may be inserted at the beginning of a SL MAC PDU. For example, the SL-SCH subheader may be placed before all MAC subPDUs. An example of SL-SCH subheader is depicted in FIG. 23. The SL-SCH subheader may be a fixed size and may comprise the seven header fields V/R/R/R/R/SRC/DST, as shown in FIG. 23, which is used for determining the source ID and destination ID of logical channels multiplexed in the SL MAC PDU.

FIG. 30B shows an example format of a MAC subheader in a SL MAC PDU. The MAC subheader may include: an SDU length field for indicating the length (e.g., in bytes) of the (following) MAC SDU to which the MAC subheader corresponds; a logical channel identifier (LCID) field for identifying the SL logical channel from which the MAC SDU originated to aid in the demultiplexing process; a flag (F) for indicating the size of the SDU length field; and a reserved bit (R) field for future use.

A wireless device may multiplex one or more MAC CEs and/or padding in a SL MAC PDU (TB). FIG. 30B further shows MAC control elements (CEs) inserted/multiplexed into the SL MAC PDU by a wireless device. The SL MAC PDU may comprise two MAC CEs and two MAC SDUs. For example, FIG. 30B shows two MAC CEs multiplexed into the SL MAC PDU. SL MAC subPDU(s) with MAC SDU(s) may be placed after the SL-SCH subheader and before the MAC subPDU with a MAC CE and the MAC subPDU with padding in the SL MAC PDU as depicted in FIG. 30B. SL MAC subPDU with a MAC CE may be placed after all the MAC subPDU(s) with MAC SDU and before the MAC subPDU with padding in the SL MAC PDU. The size of padding may be zero. SL MAC CEs may be used for in band control signaling. Example SL MAC CEs may comprise: sidelink buffer status report (e.g., BSR MAC CEs); sidelink channel state information (CSI) reporting MAC CE; sidelink discontinuous reception (DRX) command MAC CE; sidelink configured grant confirmation MAC CE.

The amount of data traffic carried over cellular networks may be expected to increase for many years to come. The quantity/number of users/devices may be increasing, and each user/device may access an increasing quantity/number and/or variety of services (e.g., video delivery, large files, images, etc.). These increases not only may require high(er) capacity in the network, but also may require very high data rates to meet user expectations on interactivity and/or responsiveness. More spectrum may therefore be needed for cellular operators to meet the increasing demand. Considering user expectations of high data rates along with seamless mobility, it may be beneficial for more spectrum to be made available for deploying macro cells and/or small cells for wireless communication systems.

Striving to meet the market demands, there has been increasing interest from operators in deploying some complementary access utilizing unlicensed spectrum to meet the traffic growth. This increasing interest/demand is exemplified by a large quantity/number of operator-deployed Wi-Fi networks and/or the 3GPP standardization of interworking solutions with Wi-Fi (e.g., LTE/WLAN interworking). This interest may indicate that unlicensed spectrum, if/when present, may be an effective complement to licensed spectrum for operators (e.g., cellular operators) to address an increase in traffic (e.g., a traffic explosion) in some scenarios, such as hotspot areas. For example, licensed assisted access (LAA) and/or new radio on unlicensed band(s) (NR-U) may offer an alternative for operators to make use of unlicensed spectrum while managing one radio network, thus offering new possibilities for optimizing the network's efficiency.

Similar to the LAA feature introduced in LTE, the NR-U (e.g., in Rel-16 and Rel-17, and/or other releases), a motivation and/or primary use of unlicensed spectrum may be to expand technologies (e.g., 3GPP technologies) into more vertical domains to support wider applications, which may enable new services and/or create more wireless product types. By not restricting to always rely on operator licensed carriers and/or dedicated carriers (e.g., for V2X/D2D or public safety), which may not be always available depending on network deployment and availability, if devices are able to communicate directly with each other and/or send out messages/signals on a frequency spectrum that is always readily available, this operation may be used to create enhanced performance, such as creating exciting new services, new/improved applications, and even saving lives in disaster areas (e.g., in response to devastating flooding, earthquakes, fires, and/or other environmental events throughout the world).

Sidelink in unlicensed spectrum (e.g., SL-U) may be used for a variety of applications and/or services. For example, for applications such as augmented reality (AR)/virtual reality (VR) interactive and gaming services, which often demands very low latency and high data rate communication over sidelink directly between devices. In another example, SL over unlicensed may also be ideal for smart home applications, where tens of low-cost devices connecting to a central node like a customer premise equipment (CPE) within a home network to gain access to internet or just directly communicating with each other to share contents such as movies, videos, music, etc. If there are hundreds or thousands of these devices located within a cell area, it is not expected that all of these devices are to be connected to the mobile network and/or need to have the capability of supporting the Uu interface. Therefore, for enabling these types of applications and expanding the usage of sidelink, the making use of unlicensed bands is the only choice. For wearable devices such as smart watches, bands, etc., it may be common not to have the capability to connect to a mobile network. In this case, unlicensed spectrum and/or sidelink connection to a wireless device (e.g., a smartphone) may be the only way for gaining access to the Internet. Out of coverage network areas, such as disaster zones, rural sites, mines, deep basements, coast lines, and/or dangerous areas where unmanned vehicles, robots or UAVs may need to gain access into, unlicensed spectrum and NR sidelink communication may be an ideal combination. IIoT/smart factory application may be equally able to take an advantage of sidelink communication utilizing unlicensed spectrum. For traffic offloading from the Uu interface to sidelink in unlicensed band in a factory setting where not all communication data may need to go through a base station. Especially for coordination data messages between factory/warehouse moving equipment such that they do not collide with each other or to perform a synchronized movement between wheels. If a premise (e.g., factory/warehouse) is operating at least some wireless communication technologies (e.g., NR-U), the sidelink operation in the licensed spectrum may be dynamically controlled by the base station. In at least some wireless communication technologies (e.g., for a cellular V2X (C-V2X) application), an allocation of ITS spectrum (e.g., in 5.9 GHz band dedicated for V2X communication) may have very limited spectrum bandwidth. In some regions, a relatively small quantity of bandwidth may be allocated (e.g., a total of 30 MHz may be allocated in some areas while others have at most 40 MHz of bandwidth allocated). An allocated bandwidth may be shared between various wireless communication technologies (e.g., at least between LTE and NR V2X). Limited bandwidth allocation may not be able to support high data rate applications such as extended sensor data sharing and fully autonomous driving. With the local/regional regulators to increase the ITS bandwidth and/or designating additional spectrum (e.g., for C-V2X), utilizing unlicensed spectrum may be a viable option via SL carrier aggregation, where a vehicle wireless device may send (e.g., transmit) its data (e.g., essential/safety message data) on the ITS band and the high data rate imaging over an unlicensed spectrum.

Increased sidelink data rate may be motivated by applications such as sensor information (video) sharing between vehicles with high degree of driving automation. Commercial use cases may require data rates in excess of what is currently possible. Increased data rate may be achieved with the support of sidelink carrier aggregation and/or sidelink over unlicensed spectrum. Furthermore, by enhancing the FR2 sidelink operation, increased data rate can be more efficiently supported on FR2. While the support of new carrier frequencies and larger bandwidths would also allow to improve its data rate, the main benefit would come from making sidelink more applicable for a wider range of applications. More specifically, with the support of unlicensed spectrum and the enhancement in FR2, sidelink will be in a better position to be implemented in commercial devices since utilization of the ITS band is limited to ITS safety related applications.

Sidelink communication(s) (e.g., in FIG. 17) may use radio resource(s) in an unlicensed band. For example, a sidelink BWP may be (pre-)configured in an unlicensed band/carrier. For example, a sidelink resource pool of the sidelink BWP may be pre-configured or configured in an unlicensed band. For example, a base station may configure the sidelink BWP and/or the sidelink resource pool of the sidelink BWP in an unlicensed band. A first communication (e.g., UL and/or DL transmission) between a first device (e.g., a base station) and a second device (e.g., a first wireless device) via Uu interface and a second communication (e.g., sidelink transmission) between the second device (e.g., the first wireless device) and a third device (e.g., a second wireless device) via a sidelink may be performed in a same band or in different spectrum bands. For example, a wireless device may receive, from the base station, configuration parameters of communications via Uu interface and configuration parameters of communications via a sidelink. The configuration parameters may indicate that communications via Uu interface and via a sidelink are configured/scheduled in a same unlicensed band. The configuration parameters may indicate that communications via Uu interface and via a sidelink are configured/scheduled in different unlicensed bands. The configuration parameters may indicate that communications via Uu interface are configured/scheduled in a licensed band, and the communications via a sidelink are configured/scheduled in an unlicensed band. The configuration parameters may indicate that communications via Uu interface are configured/scheduled in an unlicensed band, and the communications via a sidelink are configured/scheduled in a licensed band.

Listen-before-talk (LBT) may be required for transmission in an unlicensed/shared band. A cell configured in unlicensed/shared cell may be referred to as an unlicensed/shared cell. The unlicensed/shared cell may be referred to as a LAA cell and/or a NR-U cell. The unlicensed/shared cell may be operated as non-standalone with an anchor cell in a licensed band or standalone without an anchor cell in a licensed band. LBT may comprise a clear channel assessment (CCA). For example, a carrier that is configured in the unlicensed/shared cell may be referred to as an unlicensed carrier. The base station may configure a cell on the carrier. For example, the unlicensed/shared cell may be configured on the unlicensed carrier.

For example, in an LBT procedure, equipment may apply a CCA before using the unlicensed/shared cell or channel. The CCA may comprise an energy detection (ED) that determines the presence of other signals on a channel (e.g., channel is occupied) or absence of other signals on a channel (e.g., channel is clear). A regulation of a country may impact the LBT procedure. For example, European and Japanese regulations mandate the usage of LBT in the unlicensed/shared bands, such as the 5 GHz unlicensed/shared band. Apart from regulatory requirements, carrier sensing via LBT may be one way for fairly sharing the unlicensed/shared spectrum among different devices and/or networks attempting to utilize the unlicensed/shared spectrum.

Discontinuous transmission on an unlicensed/shared band with limited maximum transmission duration may be enabled. Some of these functions may be supported by one or more signals to be sent (e.g., transmitted) from the beginning of a discontinuous downlink transmission and/or a sidelink transmission in the unlicensed/shared band. Channel reservation may be enabled by the transmission of signals, after or based on (e.g., in response to) gaining channel access based on a successful LBT operation. Other nodes may receive the signals (e.g., sent/transmitted for the channel reservation) with an energy level above a certain threshold that may sense the channel to be occupied. Functions that may need to be supported by one or more signals for operation in unlicensed/shared band with the discontinuous downlink transmission and/or sidelink transmission may comprise one or more of the following: detection of the downlink transmission, sidelink transmission in unlicensed/shared band (comprising cell identification) by wireless devices and/or time & frequency synchronization of wireless devices.

Downlink/uplink and/or sidelink transmission and frame structure design for operation in an unlicensed/shared band may employ subframe, slot, mini-slot, and/or symbol boundary alignment according to timing relationships, e.g., across serving cells (e.g., configured on one or more carriers) aggregated by carrier aggregation. This may not imply that base station transmissions start at the subframe, (mini-)slot, and/or symbol boundary. The operation via the unlicensed/shared band may support sending (e.g., transmitting) PDCCH, PDSCH, PSBCH, PSCCH, PSSCH, and/or PSFCH, for example, when not all OFDM symbols are available for transmission in a slot according to LBT.

An LBT procedure may be employed for fair and friendly coexistence of a 3GPP system (e.g., LTE and/or NR) with other operators and/or radio access technologies (RATs), e.g., WiFi, and/or the like, operating in unlicensed/shared band. For example, a node attempting to send (e.g., transmit) on a carrier in unlicensed/shared band may perform a CCA as a part of an LBT procedure to determine if a channel is free (e.g., idle) for use. For example, the channel may be confined within a range of frequency. For example, a regulation of a country may indicate the range of frequency that requires the LBT procedure to use the channel in the unlicensed/shared bands. For example, the channel may be 20 MHz or a multiple of 20 MHz. The channel may be referred to as an LBT band, a subband, and/or the like. The LBT procedure may comprise an ED performed by the node to determine if the channel is being free (e.g., idle) or used (e.g., occupied) for use. The wireless device may perform the ED for the range of frequency comprising the channel. For example, regulatory requirements in some regions, e.g., in Europe, specify an ED threshold such that if a node measures, detects, and/or receives energy greater than the ED threshold, the node determines that the channel is being used/occupied, e.g., by another node(s) (and/or is not free or idle for use/access). While nodes may follow such regulatory requirements, a node may optionally use a lower ED threshold for ED than that specified by regulatory requirements. A radio access technology (e.g., WiFi, LTE and/or NR) may employ a mechanism to adaptively change the ED threshold. For example, NR-U may employ a mechanism to adaptively lower the ED threshold from an upper bound. An adaptation mechanism may not preclude static or semi-static setting of the ED threshold. Category 4 LBT (CAT4 LBT) mechanism or other type of LBT mechanisms may be implemented.

The device may access the channel for a period referred to as Channel Occupancy Time (COT) if the detected energy during a CCA (e.g., initial CCA) period is lower than an ED threshold. Otherwise, the device may start an extended CCA period, in which the detected energy is again compared against the ED threshold until channel access is granted. The regulation may specify the CCA slot duration (e.g., 9 μs in the 5 GHz band, and 5 μs in the 60 GHz band), the initial and extended CCA check times (e.g., a multiple of 5 μs for initial CCA and 8+m×5 μs for extended CCA in the 60 GHz band, where m controls the backoff), and the ED threshold (e.g., −72 dBm for a 20 MHz channel bandwidth in the 5 GHz band, and −47 dBm for 40 dBm of radiated power in the 60 GHz band).

A LBT failure of a LBT procedure on the channel in an unlicensed band may indicate a channel access failure on the channel. For example, a LBT failure of a LBT procedure on the channel may indicate that the channel is not idle or is busy (e.g., occupied by another device(s)) during one or more sensing slot durations (e.g., CCA periods) before a transmission via the channel (e.g., or immediately before the transmission via the channel). A LBT success of a LBT procedure on the channel may indicate a channel access success of the channel. A LBT success of a LBT procedure on the channel may indicate that the channel is idle during one or more sensing slot durations (e.g., CCA periods) before a transmission via the channels (e.g., or immediately before the transmission via channels).

Various example LBT mechanisms may be implemented. No LBT procedure may be performed by the transmitting entity for some signals, in some implementation scenarios, in some situations, and/or in some frequencies. An LBT procedure referred in example embodiment(s) may comprise Category 1 LBT, Category 2 LBT, Category 3 LBT, and/or Category 4 LBT. A type of an LBT (e.g., Category 1 LBT, Category 2 LBT, Category 3 LBT, and/or Category 4 LBT) may be indicated Category 1 (CAT1 LBT, e.g., no LBT) may be implemented in one or more cases. For example, a channel in unlicensed/shared band may be hold by a first device (e.g., for uplink, downlink, and/or sidelink transmissions). The first device may share the channel with a second device. For example, a second device may take over the channel in unlicensed/shared band for uplink, downlink, and/or sidelink transmissions, e.g., of a control signal (e.g., HARQ feedback of the uplink, downlink, and/or the sidelink transmissions) without performing the CAT1 LBT.

Category 2 (CAT2 LBT that may be referred to as one-shot LBT and/or a short LBT) may be implemented. The Category 2 may be an LBT without random back-off. The duration of time determining that the channel is idle may be deterministic (e.g., by a regulation). A transmitting device (e.g., a base station in Uu interface, a wireless device in Uu interface, and/or a transmitting device in a sidelink communication) may send (e.g., transmit) a grant (e.g., uplink grant and/or a sidelink grant) indicating a type of LBT (e.g., CAT2 LBT) to a receiving device (e.g., a base station in Uu interface, a wireless device in Uu interface, and/or a receiving device in a sidelink communication).

Category 3 (CAT3, e.g. LBT with random back-off with a contention window of fixed size) may be implemented. The LBT procedure may have the following procedure as one of its components. The transmitting device may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting device sends (e.g., transmits) on the channel.

Category 4 (CAT4, e.g. LBT with random back-off with a contention window of variable size) may be implemented. The transmitting device may draw a random number N within a contention window. The size of contention window may be specified by the minimum and maximum value of N. The transmitting device may vary the size of the contention window when drawing the random number N. The random number N may be used in the LBT procedure to determine the duration of time that the channel is sensed to be idle before the transmitting device sends (e.g., transmits) on the channel.

A transmission burst(s) may comprise a continuous (unicast, multicast, broadcast, and/or combination thereof) transmission on a carrier component (CC). A first transmission burst(s) may be a continuous transmission from a first device (e.g., a base station in Uu interface, a wireless device in Uu interface, and/or a transmitting device in a sidelink communication) to a second device (e.g., a base station in Uu interface, a wireless device in Uu interface, and/or a receiving device in a sidelink communication) on the channel of the CC in an unlicensed/shared band. A second transmission burst(s) may be a continuous transmission from the second device (e.g., a base station in Uu interface, a wireless device in Uu interface, and/or a transmitting device in a sidelink communication) to the first device (e.g., a base station in Uu interface, a wireless device in Uu interface, and/or a receiving device in a sidelink communication) on the channel of the CC in the unlicensed/shared band. The first transmission burst(s) and the second transmission burst(s) on the channel in the unlicensed/shared band may be scheduled in a TDM manner over the same unlicensed/shared band. Switching between the first transmission burst and the second transmission burst(s) may require an LBT (e.g., CAT1 LBT, CAT2 LBT, CAT3 LBT, and/or CAT4 LBT). For example, an instant in time may be part of the first transmission burst or the second transmission burst.

COT sharing may comprise a mechanism by which one or more devices share a channel, in an unlicensed/shared band, that is sensed as idle by at least one of the one or more devices. For example, one or more first devices may occupy the channel via an LBT (e.g., the channel is sensed as idle based on CAT4 LBT) and one or more second devices may use and/or share, for a transmission of the one or more second devices, the channel using a particular type of an LBT within a maximum COT (MCOT) limit.

Various of LBT types may be employed for Channel occupancy time (COT) sharing. A transmitting device (e.g., a base station in Uu interface, a wireless device in Uu interface, and/or a transmitting device in a sidelink communication) may send (e.g., transmit) a grant (e.g., uplink grant and/or a sidelink grant) to a receiving device (e.g., a base station in Uu interface, a wireless device in Uu interface, and/or a receiving device in a sidelink communication). For example, the grant (e.g., uplink grant and/or a sidelink grant) may indicate a trigger of the COT sharing and/or a type of LBT (e.g., CAT1 LBT, CAT2 LBT, CAT2 LBT, and/or CAT2 LBT) to be used for the receiving device during the COT acquired and/or shared by the transmitting device.

A regulation of certain region(s), e.g., Europe and Japan, may prohibit continuous transmission in the unlicensed band and may impose limits on the COT, e.g., the maximum continuous time a device may use the channel. The maximum continuous time, in which the device may gain an access based on LBT procedure and use the channel, may be referred to as a maximum channel occupancy time (MCOT). The MCOT in the 5 GHz band may be limited to a certain period, e.g., 2 ms, 4 ms, or 6 ms, depending on the channel access priority class, and it may be increased up to 8-10 ms.

The MCOT in the 60 GHz band may be 9 ms. For example, the regulation (e.g., for the 5 GHz and 60 GHz bands) may allow the device (e.g., a wireless device of a Uu interface and/or a transmitting wireless device in a sidelink communication) to share the COT with the associated devices. For example, the associated device may be a wireless device and/or a base station in the Uu interface. For example, the associated device may be a wireless device of the sidelink (e.g., unicast, multicast, and/or broadcast) communication. For example, the device may get an (e.g., initial) access to the channel through the LBT procedure, e.g., for COT (or MCOT). The device may send (e.g., transmit), to the associated device, a control message and/or a control signal indicating sharing the COT (or MCOT) with the associated device and/or remaining time of the COT, and starting/ending times (e.g., in terms of symbol(s), slot(s), SFN(s), and/or a combination thereof) of the COT that the associated device to use/share the channel. The associated device may skip (e.g., may not perform) the CCA check and/or may perform Category 1 LBT procedure on the channel during the shared COT. The associated wireless device may transmit data via the channel during the shared COT based on a particular LBT type. The particular LBT type may comprise Category 1, Category 2, Category 3, and/or Category 4. For example, the MCOT may be defined and/or configured per priority class, logical channel priority, and/or device specific.

A first device may gain an access through the LBT procedure for a first (e.g., UL, DL, and/or sidelink) transmission in an unlicensed band. If the first device shares, with a second device, the channel, the second device may perform a second (e.g., UL, DL, and/or sidelink) transmission with a dynamic grant and/or a configured grant (e.g., Type 1 and/or Type 2) with a particular LBT (e.g., CAT2 LBT) that the second device performs on a channel shared by a first device. The second device may use and/or occupy, e.g., by performing UL, DL, and/or sidelink transmission, the channel during the COT. For example, the first device performing the first transmission based on a configured grant (e.g., Type 1, Type2, autonomous UL) may send (e.g., transmit) a control information (e.g., DCI, UCI, SCI, and/or MAC CE) indicating the COT sharing. The COT sharing may comprise switching, within a (M)COT, from the first transmission (e.g., UL, DL, and/or sidelink transmission) of the first device to the second transmission (e.g., UL, DL, and/or sidelink transmission) of the second device. A starting time of the second transmission in the COT sharing, e.g., triggered by the first device, may be indicated in one or more ways. For example, one or more parameters in the control information may indicate the starting time of the COT sharing at which the second device starts to access the channel and/or an ending time of the COT sharing at which the second device terminates/ends to use the channel. For example, resource configuration(s) of configured grant(s) may indicate the starting time and/or the ending time.

Single and/or multiple switching of transmissions within a shared COT may be supported. For example, a switching of transmissions within the shared COT may comprise switching from the first transmission (e.g., UL, DL, and/or sidelink transmission) of the first device to the second transmission (e.g., UL, DL, and/or sidelink transmission) of the second device within the shared COT. A type of LBT required/performed, by the second device, for the second transmission may be different depending on a time gap between the first transmission and the second transmission. The time gap may be referred to as a COT gap. For example, the second wireless device may perform CAT1 LBT (e.g., may not perform or may skip LBT procedure) for the second transmission switched from the first transmission within the shared COT, e.g., if the time gap is less than a first time value, e.g., 16 us. For example, the second wireless device may perform CAT2 LBT for the second transmission switched from the first transmission within the shared COT, e.g., if the time gap is longer than the first time value and does not exceed a second time value, e.g., 25 us. For example, the second wireless device may perform CAT2 LBT for the second transmission switched from the first transmission within the shared COT, e.g., if the time gap exceeds the second time value. For example, the second wireless device may perform CAT4 LBT for the second transmission switched from the first transmission within the shared COT, e.g., if the time gap exceeds the second time value.

A sidelink resource of a sidelink communication may be configured in an unlicensed band. For example, a first wireless device may perform, during a period in one or more symbols, an LBT procedure on a channel comprising a sidelink resource (e.g., comprising PSBCH, PSCCH, PSSCH, and/or PSFCH) via which the first wireless device schedules (or is scheduled) to send (e.g., transmit) a data and/or a signal to a second wireless device. For example, the LBT procedure may start during a first symbol that is at least one symbol or a certain period (e.g., in terms of p or ms) before and/or prior to a starting symbol of the sidelink resource (and/or a starting symbol of the transmission of the data and/or the signal). For example, the LBT procedure may end before and/or prior to the starting symbol of the sidelink resource (and/or the starting symbol of the transmission of the data and/or the signal). The wireless device may not send (e.g., transmit), via the sidelink resource (e.g., comprising PSBCH, PSCCH, PSSCH, and/or PSFCH), the data and/or the signal to the second wireless device, e.g., based on (e.g., in response to) the LBT procedure indicating the channel is busy. The wireless device may send (e.g., transmit), via the sidelink resource (e.g., comprising PSBCH, PSCCH, PSSCH, and/or PSFCH), the data and/or the signal to the second wireless device, e.g., based on (e.g., in response to) the LBT procedure indicating the channel is idle.

For example, the first wireless device may determine an AGC symbol located before or prior to a starting symbol of the PSBCH, PSCCH, PSSCH, and/or PSFCH via which the first wireless device schedules (or is scheduled) to send (e.g., transmit) the data and/or the signal to the second wireless device. For example, the AGC symbol may be located one symbol before the starting symbol of sidelink resource (e.g., PSBCH, PSCCH, PSSCH, and/or PSFCH). Referring to FIG. 19, the AGC symbol may be the second symbol in the slot (e.g., one symbol before a starting symbol (e.g., the third symbol in the slot) of a PSCCH (in the third, fourth and the fifth symbols in a subchannel in the slot) and/or a starting symbol (e.g., the third symbol in the slot) of PSSCH (e.g., from the third symbol to the eighth symbol in the slot), and/or a starting symbol (e.g., the tenth symbol in the slot) of a PSFCH (e.g., the eleventh symbol in the slot). For example, the first wireless device may start the LBT procedure at least one symbol or a certain period (e.g., in terms of p or ms) before and/or prior to a starting symbol of the AGC symbol. For example, the first wireless device may end the LBT procedure at least one symbol or a certain period (e.g., in terms of p or ms) before and/or prior to a starting symbol of the AGC symbol. For example, referring to FIG. 19, the first wireless device may start the LBT procedure For example, the LBT procedure may start during a first symbol that is at least one symbol or a certain period (e.g., in terms of p or ms) before and/or prior to a starting symbol of the AGC symbol (e.g., located one symbol before the PSCCH, PSSCH, and/or PSFCH in FIG. 19). For example, the LBT procedure may end before and/or prior to the starting symbol. The wireless device may not send (e.g., transmit), via the AGC symbol, an AGC signal (e.g., that is for the second wireless device to determine/adjust/train parameter values of its AGC) to the second wireless device, e.g., based on (e.g., in response to) the LBT procedure indicating the channel is busy. The wireless device may send (e.g. transmit), via the AGC symbol, the AGC signal to the second wireless device, e.g., based on (e.g., in response to) the LBT procedure indicating the channel is idle.

A wireless device may receive message(s) comprising configuration parameters of one or more sidelink resource pools configured in an unlicensed spectrum. The wireless device may select and/or determine a sidelink resource pool from the one or more sidelink resource pools for a sidelink transmission and/or a sidelink reception in the unlicensed spectrum. The wireless device may select and/or a sidelink resource from the sidelink resource pool for the sidelink transmission and/or sidelink reception in the unlicensed spectrum A first wireless device may be a transmitting wireless device of one or more sidelink transmissions. A second wireless device may be a receiving wireless device of the one or more sidelink transmissions. For example, the second wireless device may be a desired/intended receiver of the one or more sidelink transmissions. For example, a SCI (e.g., a second-stage SCI) scheduling the one or more sidelink transmissions may comprise/indicate an ID (e.g., destination ID) of the second wireless device indicating that the second wireless device is a desired/intended/destination receiver of the one or more sidelink transmissions. For example, the second wireless device may not be a desired/intended receiver of the one or more sidelink transmissions, e.g., if a SCI (e.g., a second-stage SCI) scheduling the one or more sidelink transmissions may not comprise/indicate an ID (e.g., destination ID) of the second wireless device. For example, the second wireless device that is not a desired/intended receiver of the one or more sidelink transmissions may be a device that monitors and/or receives the SCI (e.g., comprising an ID (e.g., destination ID) of another wireless device) sent (e.g. transmitted) by the first wireless devices using the one or more sidelink resource pools. The one or more sidelink transmissions may comprise PSCCH and/or PSSCH transmissions. The one or more sidelink transmissions may comprise one or more unicast transmissions, one or more groupcast transmissions, and/or one or more broadcast transmissions.

A base station and/or a wireless device may send (e.g., transmit) a message to the first wireless device. The message may comprise an RRC message, SIB, a MAC CE, DCI, and/or SCI. The message may comprise a field indicating/configuring one or more sidelink resource pools in a sidelink BWP. The message may further indicate/configure (e.g., frequency location of) the sidelink BWP in a frequency band, e.g., an unlicensed band. The sidelink BWP may be in an unlicensed/shared spectrum/carrier/band/cell with a plurality of RATs (e.g., wifi, etc.). The one or more sidelink resource pools and/or sidelink BWP may be pre-configured to the first wireless device. A bandwidth of the frequency band may be at least as wide as (e.g., wider than or equal to) a minimum regularized bandwidth in a respective unlicensed band. The message sent (e.g., transmitted) by the base station and/or the wireless device may comprise/indicate a threshold indicating a bandwidth (e.g., a minimum bandwidth). The bandwidth indicated by the threshold may be wider than or equal to the minimum regularized bandwidth in the unlicensed spectrum. The threshold indicating the bandwidth may be pre-configured to the first wireless device. The frequency band may have a frequency band identifier (ID)/index. Each of the one or more sidelink resource pools (e.g., in the frequency band) may have a sidelink resource pool ID/index. The message, received by the first wireless device and/or the second wireless device from the base station and/or the wireless device, may comprise/indicate/configure the frequency band ID/index and the sidelink resource pool ID/index for the each of the one or more sidelink resource pools in the frequency band. The message may comprise/indicate/configure a mapping (e.g., an association) between the frequency band and the one or more sidelink resource pools in the frequency band. The mapping may indicate that the ID/index of the frequency band is associated with the IDs/Indexes of the one or more sidelink resource pools in the frequency band. The frequency ID/index, the sidelink resource pool IDs/indexes of the one or more sidelink resource pools in the frequency band, and/or the mapping between the frequency band and the one or more sidelink resource pools in the frequency band may be pre-configured to the first wireless device and/or the second wireless device. The first wireless device may select, from the one or more sidelink resource pools, a sidelink grant comprising one or more resources for the one or more sidelink transmissions. The first wireless device may select the sidelink grant based on a resource selection procedure in the frequency band (e.g., unlicensed band). In an example, the resource selection procedure may comprise at least one of sensing procedures and/or actions described in FIG. 25, FIG. 26, and/or FIG. 27.

A sidelink resource pool may be confined within an unlicensed band. The unlicensed band may comprise a channel having a bandwidth (e.g., a range of frequency) requiring an LBT procedure. For example, a wireless device determine/select the sidelink resource pool and determine/select a sidelink resource among one or more sidelink resources of the sidelink resource pool. The wireless device may perform the LBT on the channel. The bandwidth may comprise one or more subchannel of the sidelink resource. The sidelink BWP comprising the sidelink resource pool may be confined in the unlicensed band. The sidelink BWP comprising the sidelink resource pool may be confined in the unlicensed band.

Figure 31:
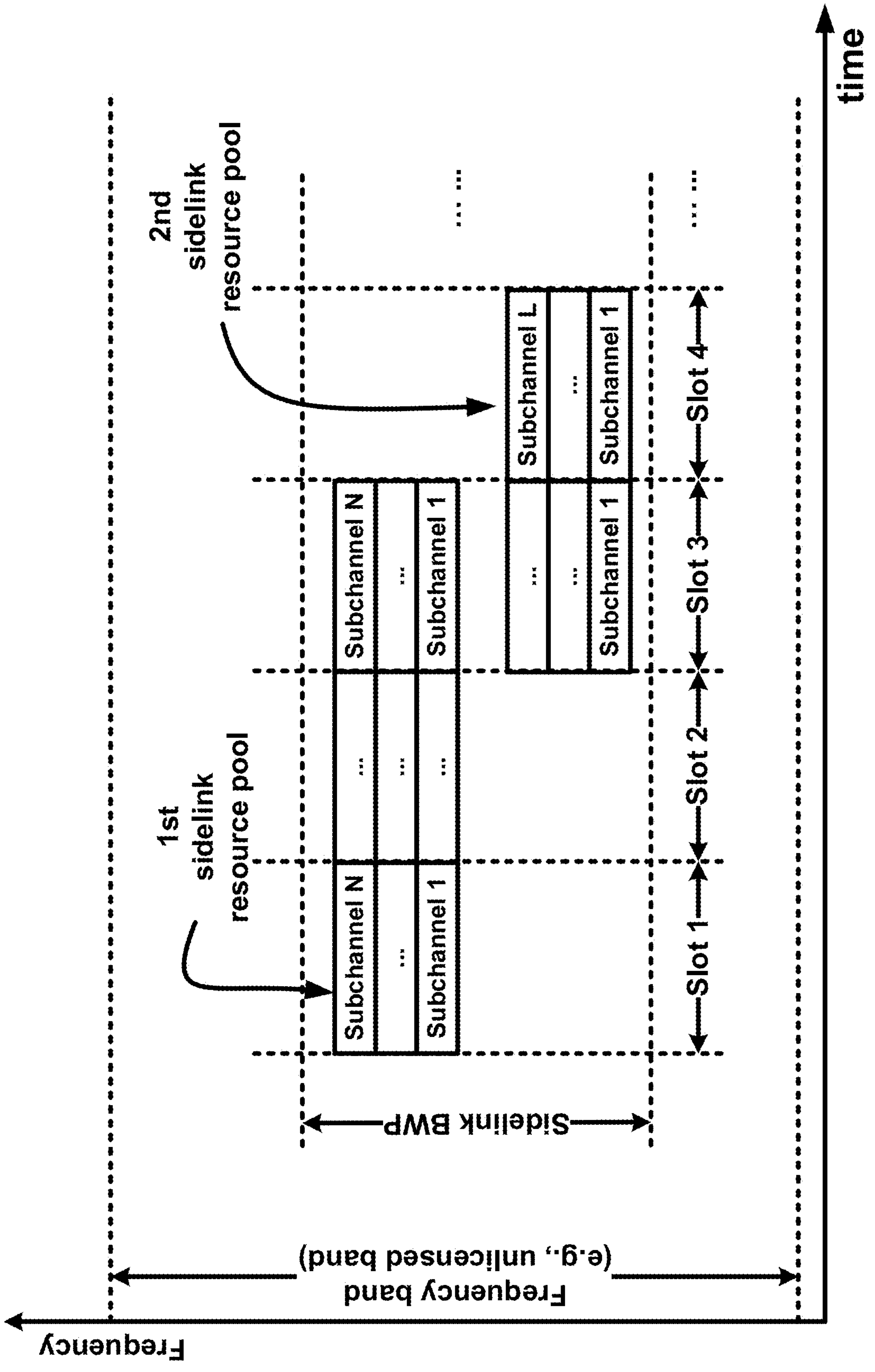
FIG. 31 shows an example configuration of a sidelink resource pool in a frequency band as per an aspect of an example embodiment of the present disclosure.

FIG. 31 shows an example configuration of a sidelink resource pool in a frequency band as per an aspect of an example embodiment of the present disclosure. In FIG. 31, a sidelink resource pool may refer to the one in FIG. 18. For example, a wireless device may receive a message (e.g., RRC message and/or a SIB) from a base station and/or another wireless device. The message may comprise configuration parameters of sidelink BWP. The configuration parameters may indicate a bandwidth (e.g., and/or frequency size) of the sidelink BWP. The configuration parameters may indicate a first sidelink resource pool is configured in the sidelink BWP. The configuration parameters may indicate that the sidelink BWP is confined and/or configured in a particular frequency band (e.g., unlicensed band). For example, the size of the sidelink BWP may be equal to or smaller than a minimum regularized bandwidth for which the wireless device performs an LBT procedure to gain access on a channel. For example, the size of the sidelink BWP may be smaller than or equal to 20 MHz, e.g., the particular frequency band may be an unlicensed band in 5 GHz, 6 GHz, and/or FR1 band. For example, the configuration parameters may further indicate a second sidelink resource pool is configured in the sidelink BWP. A first sidelink resource of the first sidelink resource pool may overlap in time with a second sidelink resource of the second sidelink resource pool, e.g., Slot 3 in FIG. 31.

Figure 32:
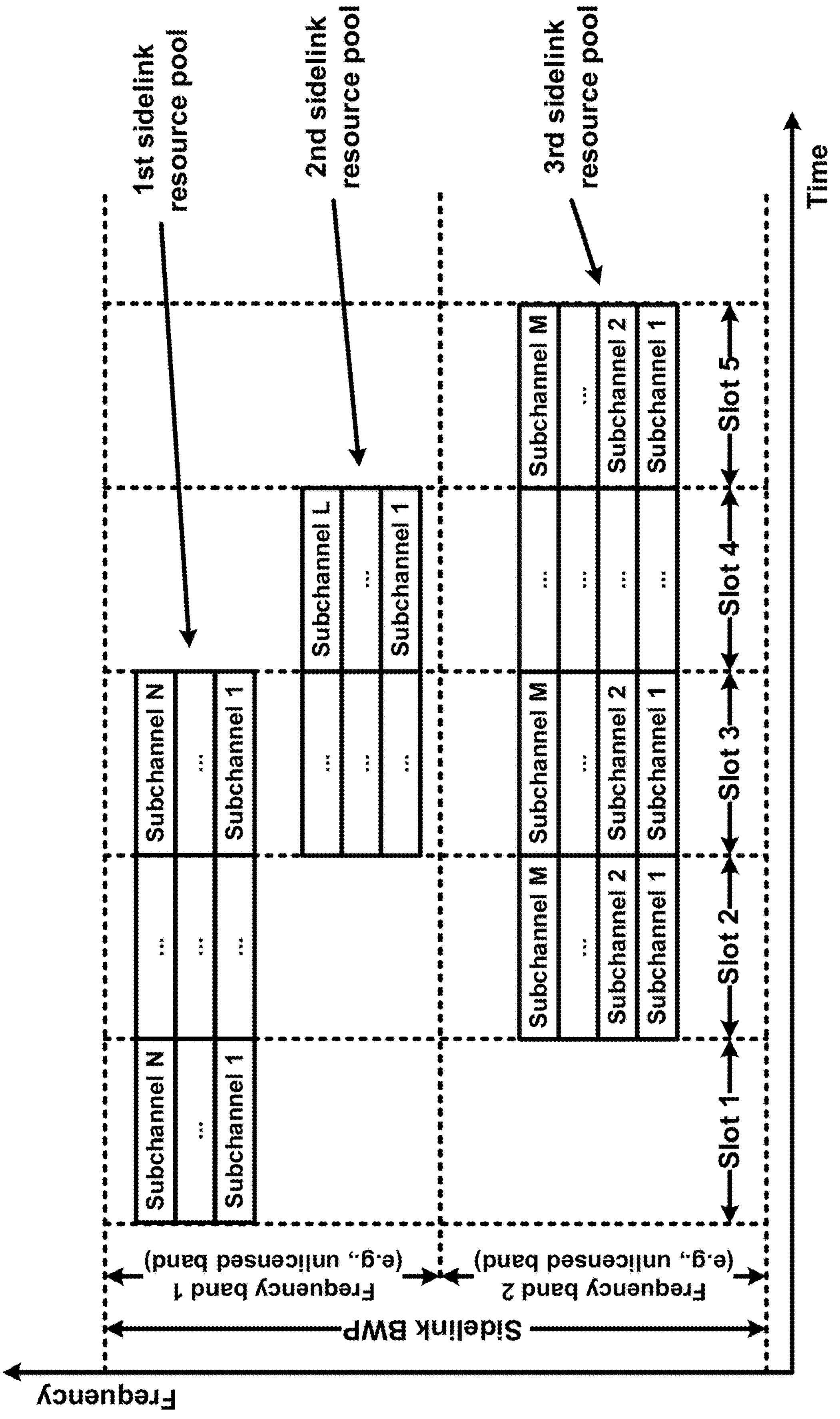
FIG. 32 shows an example configuration of a sidelink resource pool in a frequency band as per an aspect of an example embodiment of the present disclosure.

FIG. 32 shows an example configuration of a sidelink resource pool in a frequency band as per an aspect of an example embodiment of the present disclosure. In FIG. 32, a sidelink resource pool may refer to the one in FIG. 18. For example, a wireless device may receive a message (e.g., RRC message and/or a SIB) from a base station and/or another wireless device. The message may comprise configuration parameters of sidelink BWP. The configuration parameters may indicate a bandwidth (e.g., and/or frequency size) of the sidelink BWP. For example, the sidelink BWP may be a wideband sidelink BWP that has a bandwidth larger than a minimum regularized bandwidth for which the wireless device performs an LBT procedure to gain access on a channel. For example, the sidelink BWP may be larger than 20 MHz. The configuration parameters may indicate that one or more sidelink resource pools are configured in the sidelink BWP. The configuration parameters may indicate that each of the one or more sidelink resource pools is confined and/or configured in a respective frequency band (e.g., unlicensed band). In FIG. 32, three sidelink resource pools are in a sidelink BWP. The sidelink BWP may comprise a frequency band 1 (e.g., unlicensed band 1) and a frequency band 2 (e.g., unlicensed band 2). The first sidelink resource pool and the second sidelink resource pool may be confined in the frequency band 1. The third sidelink resource pool may be confined in the frequency band 2. The frequency band 1 (e.g., unlicensed band 1) and the frequency band 2 (e.g., unlicensed band 2) may require different and/or independent LBT procedures. For example, the wireless device may perform a first LBT procedure that may indicate a channel of frequency band 1 being idle in Slot 3. For example, the wireless device may send (e.g., transmit), based on (e.g., in response to) the channel of frequency band 1 being idle in Slot 3, a sidelink data via a sidelink resource selected from the first sidelink resource pool or the second sidelink resource pool that are configured in the frequency band 1. For example, the wireless device may not send (e.g., transmit), based on (e.g., in response to) the channel of frequency band 1 being idle in Slot 3, a sidelink data via a sidelink resource selected from the third sidelink resource pool that are configured in the frequency band 2. Sending (e.g., transmitting) a sidelink data via a sidelink resource selected from the third sidelink resource pool that are configured in the frequency band 2 may require a second LBT procedure.

For operation of sidelink in unlicensed spectrum (SL-U), multi-consecutive slots transmission (MCSt) and/or sidelink burst transmission may be supported. MCSt may be used to reduce the need and/or frequency of wireless device performing LBT to access the channel after it has acquired a COT, to retain the COT to send (e.g., transmit) the wireless device's data as much as possible, and/or to be able to send (e.g., transmit) the wireless device's data as soon as possible in the following slot.

Figure 33A:
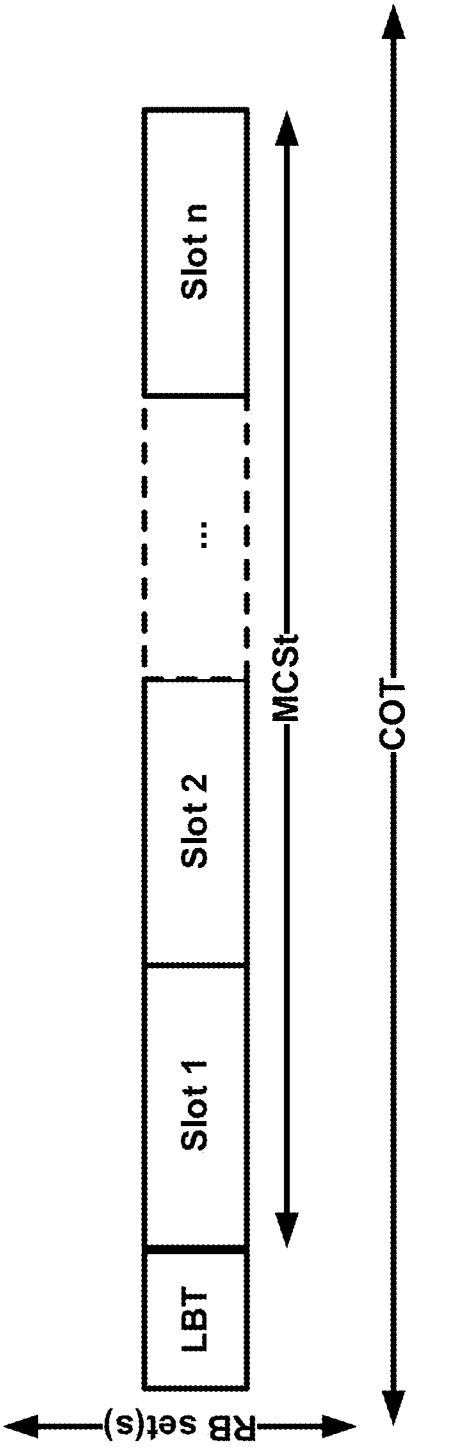
FIG. 33A and FIG. 33B shows examples of a multi-consecutive slot transmission (MCSt) on an unlicensed/shared spectrum/band/cell/carrier.
Figure 33B:
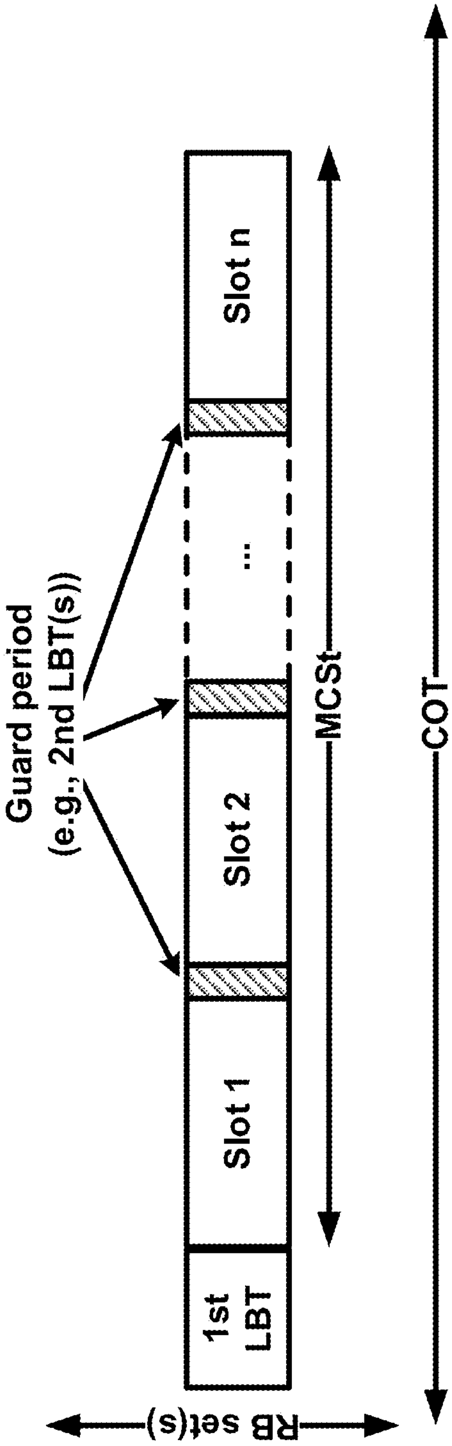

FIG. 33A and FIG. 33B show examples of a multi-consecutive (e.g., multiple consecutive) slots transmission (MCSt) on an unlicensed/shared spectrum/band/cell/carrier. In FIG. 33A, a MCSt may comprise n consecutive time slots in time domain. The n consecutive time slots may be physical consecutive time slots or logical consecutive time slots in a resource pool. The n consecutive time slots may be within one or more COT duration (e.g., within MCOT). The MCSt may comprise one or more RB sets (e.g., LBT subbands) in frequency domain. For example, a physical slot may be any slot comprising 14 OFDM symbols based on the given numerology (based on the SCS of the SL BWP). For example, a logical slot may be a physical slot that is configured for sidelink operation. For example, some physical slots may not be configured for SL operation and may not be logical slots.

Any two adjacent time slots of the n consecutive time slots for the MCSt may not have a time gap (e.g., guard period) in between. A time gap between any two adjacent time slots of the n consecutive time slots for the MCSt may not be larger than a threshold (e.g., 16 us or 25 us, etc.). Based on the regulations of unlicensed spectrum, the transmissions may be considered as two separate transmissions (e.g., not consecutive/contiguous transmissions and/or not a burst transmission), and the transmitter may perform separate LBT procedures (e.g., separate/independent Type 1 LBT procedures) for each of the transmissions, if the time gap between any two transmissions is longer than the threshold. For any two transmissions without a gap between them and/or with a gap shorter than the threshold between them, a single LBT procedure (e.g., Type 1 LBT procedure) may be performed at/for the earliest transmissions and the following consecutive transmissions in the burst may follow with no LBT procedure or short LBT procedure (e.g., Type 2A/2B/2C LBT procedure). Therefore, the transmitter wireless device may have a higher chance of successfully accessing the channel and sending (e.g., transmitting) multiple transmissions in a burst and contiguously using consecutive resources without gaps (or gaps shorter than the threshold). MCSt resources or MCSt occasion may be configured and/or used to facilitate such burst transmission using consecutive resources and based on a single LBT procedure (e.g., a single Type 1 LBT procedure, if any).

As shown in FIG. 33A, a transmitting wireless device of the MCSt may perform a LBT procedure (e.g., Type 1 LBT procedure) over the one or more RB sets of the MCSt, before performing the MCSt during the n consecutive time slots. The transmitting wireless device may send (e.g., transmit) one or more TBs via the MCSt resource using the n consecutive time slots based on a LBT success of the LBT procedure (e.g., idle channel) over the one or more RB sets of the MCSt. The transmitting wireless device may not send (e.g., transmit) one or more TBs via the MCSt using the n consecutive time slots based on a LBT failure of the LBT procedure (e.g., busy channel) over the one or more RB sets of the MCSt. The transmitting wireless device may send (e.g., transmit) one or more TBs via a remainder of the MCSt resources using the n-1 consecutive time slots (e.g., slot 2 to slot n) based on a LBT failure of the first LBT procedure over the one or more RB sets of the MCSt prior to slot 1, and based on a LBT success of a second LBT procedure over the one or more RB sets of the MCSt prior to slot 2. The wireless device may have up to n chances of LBT procedures for sending (e.g., transmitting) via at least one slot of the MCSt resource (e.g., for starting the burst transmission via MCSt). The LBT procedure may be a Type 1 (e.g., for COT initializing) or a Type 2 (e.g., for COT sharing) channel access procedure.

A sending (e.g. transmitting) wireless device may not perform a LBT procedure during the MCSt based on no/zero time gap (e.g., guard period) between any two adjacent time slots of the n consecutive time slots in the MCSt. The transmitting wireless device may perform a short LBT procedure (e.g., Type 2A/2B/2C LBT) during the MCSt based on no/zero/small (e.g., less than a threshold) time gap (e.g., guard period) between any two adjacent time slots of the n consecutive time slots in the MCSt. The MCSt may comprise a plurality of RB sets (e.g., LBT subbands) in frequency domain. The transmitting wireless device may perform a LBT procedure for each of the plurality of RB sets before sending (e.g., transmitting) the MCSt via the plurality of RB sets. The transmitting wireless device may determine a LBT success for the plurality of RB sets based on the LBT procedure for the each of the plurality of RB sets being succeed.

As shown in FIG. 33B, a MCSt may comprise n consecutive time slots in time domain. The n consecutive time slots may be physical consecutive time slots or logical consecutive time slots in a resource pool. The n consecutive time slots may be within a COT duration (e.g., within MCOT). The MCSt may comprise one or more RB sets (e.g., LBT subbands) in frequency domain. Two adjacent time slots of the n consecutive time slots for the MCSt may have a time gap (e.g., guard period/empty resource without transmission/reception) in between. An earlier time slot of the two adjacent time slots may comprise the one or more RB sets in frequency domain. A later time slot of the two adjacent time slots (e.g., after the earlier time slot of the two adjacent time slots) may comprise the one or more RB sets or a subset of the one or more RB sets in frequency domain. The later time slot of the two adjacent time slots (e.g., after the earlier time slot of the two adjacent time slots) may not have more RB set than the one or more RB sets of the earlier time slot of the two adjacent time slots.

A sending (e.g. transmitting) wireless device of the MCSt may perform a first LBT procedure over the one or more RB sets of the MCSt, before transmitting via the MCSt during the n consecutive time slots. The transmitting wireless device may send (e.g., transmit) via the MCSt using the n consecutive time slots based on the first LBT procedure being successful (e.g., indicating idle channel) over the one or more RB sets of the MCSt. The transmitting wireless device may not send (e.g., transmit) via the MCSt using the n consecutive time slots based on the first LBT procedure being failed (e.g., indicating busy/occupied channel) over the one or more RB sets of the MCSt. The first LBT procedure may be a Type 1 (e.g., for COT initializing) or a Type 2 (e.g., Type 2A/2B/2C for COT sharing) channel access procedure. The transmitting wireless device may perform a second LBT procedure during the MCSt based on the time gap (e.g., the guard period) between any two adjacent time slots of the n consecutive time slots in the MCSt. The second LBT procedure may be a Type 1 (e.g., for COT initializing) or a Type 2 (e.g., 2A/2B/2C for COT sharing) channel access procedure based on a length/duration of the time gap. The MCSt may comprise a plurality of RB sets (e.g., LBT subbands) in frequency domain. The transmitting wireless device may perform a LBT procedure for each of the plurality of RB sets before sending (e.g., transmitting) the MCSt via the plurality of RB sets. The transmitting wireless device may determine a LBT success for the plurality of RB sets based on the LBT procedure for the each of the plurality of RB sets being succeed.

A transmitting wireless device (e.g., Tx wireless device) may determine a MCSt resource comprising transmission resources/occasions in multiple (e.g., a plurality of) consecutive slots. Referring to FIG. 19, a transmission resource/occasion may be a time and frequency resource for transmission of a TB and/or one or more SCIs via PSSCH and/or PSCCH in a slot. For example, the MCSt resource may comprise multiple consecutive single-slot resources for transmission of/via PSSCH/PSCCH. A single-slot resource may be a time/frequency resource within a slot for transmission of a TB/SCI via PSSCH/PSCCH.

A wireless device may receive an RRC message comprising sidelink configuration parameters that indicate a SL resource pool. The SL configuration parameters may comprise configuration parameters of PSSCH and PSCCH in the resource pool, e.g., indicating time resources (e.g., quantity/number of symbols in a slot) and/or frequency resources (e.g., quantity/number of RBs and/or interlaces) for PSSCH/PSCCH transmission occasions. The SL configuration parameters may indicate configuration of MCSt. For example, the SL configuration parameters may comprise a parameter indicating that MCSt is enabled in the resource pool. For example, the SL configuration parameters may comprise a parameter indicating a number, M (e.g., maximum or minimum quantity/number), of slots and/or transmission resources/occasions in a MCSt. For example, the wireless device may determine that a MCSt comprises (up to) M slots or PSSCH/PSCCH transmission resources/occasions.

A wireless device may determine a MCSt resource. A MCSt resource may comprise (up to) M PSSCH/PSCCH transmission resources/occasions. A PSSCH/PSCCH transmission resource/occasion may be a single-slot transmission resource/occasion for transmission of a TB and/or SCI(s). The wireless device may receive DCI (e.g., DCI format 3_0) indicating the MCSt resource, e.g., when operating in mode 1. The wireless device may select the MCSt resource based on an MCSt resource selection procedure or based on M single-slot resource selection procedure, e.g., when operating in mode 2.

The MCSt resource may be for transmission (e.g., repetition or retransmission) of a single TB. For example, the DCI and/or higher layer (e.g., RRC parameters) may indicate that the MCSt resource is for a single TB transmission. The wireless device may determine a first TB (MAC PDU) and map the first TB to each of the M transmission occasions of the MCSt resource. For example, the wireless device may send (e.g., transmit) the first TB and M-1 repetitions of the first TB via the MCSt resource.

The MCSt resource may be for transmission of multiple TBs. For example, the DCI and/or higher layer (e.g., RRC parameters) may indicate that the MCSt resource is for multiple TB transmission. The wireless device may determine M TBs (MAC PDUs) and map each TB of the M TBs to one of the M transmission occasions of the MCSt resource. For example, the wireless device may send (e.g., transmit) M TBs via the MCSt resource. For example, the wireless device may send (e.g., transmit) a first TB via a first transmission occasion of the MCSt in a first slot, a second TB via a second transmission occasion of the MCSt in a second slot, and so on.

Figure 34:
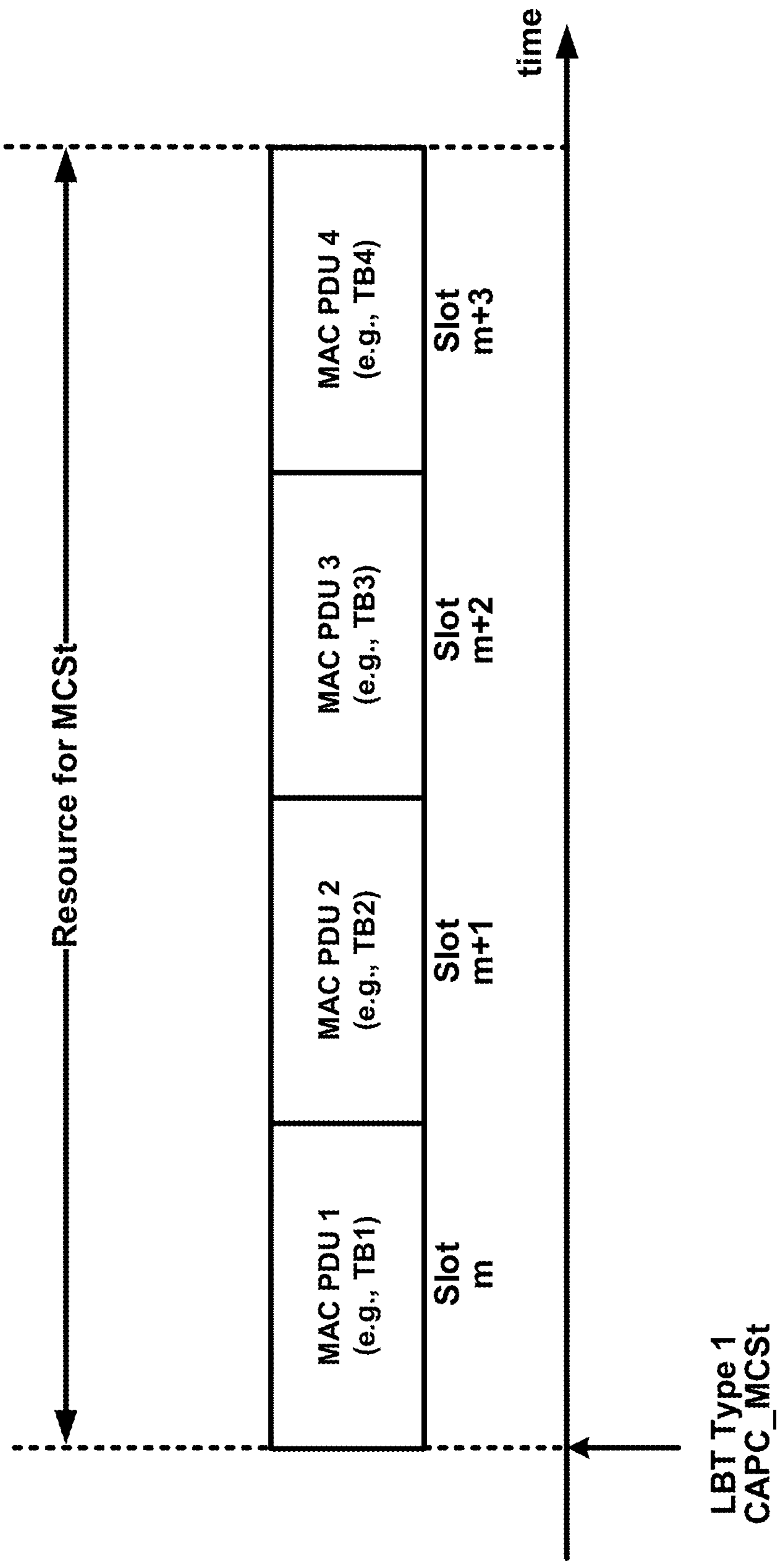
FIG. 34 shows an example of MCSt with multiple TBs.

FIG. 34 shows an example of MCSt with multiple TBs. The wireless device may determine a time/frequency resource for MCSt, e.g., a MCSt resource/occasion. For example, the wireless device may receive DCI comprising a sidelink grant. The sidelink grant may comprise a MCSt resource. For example, the wireless device may select a MCSt resource. For example, the wireless device may select multiple consecutive single-slot resources as the MCSt resource. In the example of FIG. 34, the MCSt resource comprises four single-slot PSSCH/PSCCH transmission resources in four consecutive slots: slot m to slot m+3. In this example, the wireless device generates a first MAC PDU (MAC PDU 1 or TB1) for/corresponding to the first single-slot PSSCH transmission occasion in slot m. The wireless device generates a second MAC PDU (MAC PDU 2 or TB2) for/corresponding to the second single-slot PSSCH transmission occasion in slot m+1. The wireless device generates a third MAC PDU (MAC PDU 3 or TB3) for/corresponding to the third single-slot PSSCH transmission occasion in slot m+2. The wireless device generates a fourth MAC PDU (MAC PDU 4 or TB4) for/corresponding to the fourth single-slot PSSCH transmission occasion in slot m+3.

Each of the multiple (M) TBs or MAC PDUs sent (e.g., transmitted) via the MCSt resource may comprise data (e.g., traffic data and/or control data) of/from different logical channels. For example, the wireless device may multiple data (e.g., MAC SDU(s)) from a first logical channel in a first TB of the MCSt. For example, the wireless device may multiple data (e.g., MAC SDU(s)) from a second logical channel and a third logical channel in a second TB of the MCSt. For example, the wireless device may multiple data (e.g., MAC SDU(s)) from a fourth logical channel and a MAC-CE in a third TB of the MCSt. For example, the wireless device may multiple only MAC-CEs in a fourth TB of the MCSt. The first logical channel may be a sidelink traffic channel (STCH) or a sidelink control channel (SCCH). The second logical channel may be a sidelink traffic channel (STCH) or a sidelink control channel (SCCH). The third logical channel may be a sidelink traffic channel (STCH) or a sidelink control channel (SCCH). Each MAC SDU that is multiplexed in any TB of the multiple TBs that will be sent (e.g., transmitted) by MCSt (MCSt resource) may comprise sidelink traffic data from at least one SL traffic channel (STCH) or may comprise sidelink control data/message from at least one SL control channel (SCCH). Each MAC SDU that is multiplexed in any TB of the multiple TBs that will be sent (e.g., transmitted) by MCSt (MCSt resource) may comprise sidelink traffic data from at least one SL data radio bearer (SL DRB) or may comprise sidelink control data/message from at least one SL signaling radio bearer (SL SRB). For example, one or more first MAC SDUs, of a plurality of MAC SDUs of the multiple TBs/MAC PDUs that will be sent (e.g., transmitted) by MCSt, may be SCCH SDUs, and/or one or more second MAC SDUs, of the plurality of MAC SDUs, may be STCH SDUs. For example, the multiple TBs/MAC PDUs of the MCSt may comprise zero or one or more MAC CEs.

A wireless device may perform a channel access procedure (a.k.a. LBT procedure) for operation with shared spectrum. The wireless device may determine a channel access priority class (CAPC) for a LBT procedure. For example, the parameters of the LBT procedure may be based on the corresponding CAPC. The wireless device may determine the parameters of the LBT procedure, e.g., contention window size ($CW_p$) and/or the defer duration (Td) based on the respective CAPC. The wireless device may determine a duration of a channel occupancy time (COT), initiated by the LBT procedure, based on the CAPC of the LBT procedure. The LBT procedure may be a Type 1 LBT procedure (e.g., Type 1 SL channel access procedure).

FIG. 35 shows a table of example parameters for sidelink channel access procedure. A wireless device may use the table in FIG. 35 for a Type 1 SL channel access procedure (LBT procedure). In unlicensed operation, each transmission may be associated with a respective channel access priority class (CAPC). For example, a wireless device may determine to send (e.g., transmit) a sidelink transmission (e.g., S-SSB, PSSCH, PSCCH, and/or PSFCH transmission) in a resource pool configured in an unlicensed spectrum. The Tx wireless device may determine to perform a LBT procedure (e.g., Type 1 LBT procedure) prior to the sidelink transmission. The wireless device may determine a value of the CAPC (e.g., CAPC value, or p as in FIG. 35) for the LBT procedure prior to the sidelink transmission, e.g., p=1 or p=2 or p=3 or p=4. A CAPC value (e.g., p) may indicate the CAPC associated with/of the sidelink transmission. For example, lower CAPC value may mean/indicate/correspond to higher priority of channel access for the sidelink transmission. For example, a lowest CAPC value (e.g., p=1) may indicate a highest channel access priority for a transmission. For example, a highest CAPC value (e.g., p=4) may indicate a lowest channel access priority for a transmission.

A wireless device may determine the CAPC of a sidelink transmission. For example, a plurality of CAPC values may be defined/provided/configured for sidelink transmissions. A first sidelink transmission may be associated with a first CAPC value. A second sidelink transmission may be associated with a second CAPC value, and so on. For example, CAPC value for one or more first sidelink transmission may be pre-defined (e.g., for S-SSB transmission and/or PSFCH transmission). For example, the wireless device may determine a lowest CAPC value (e.g., p=1) for S-SSB transmission. For example, a wireless device (e.g., Tx wireless device and/or Rx wireless device) may determine a CAPC value of one or more second sidelink transmissions (e.g., PSSCH and/or PSCCH and/or PSFCH transmissions) based on one or more rules and/or configuration parameters.

For example, a Tx wireless device may determine a CAPC value for a PSSCH/PSCCH transmission. The PSSCH/PSCCH transmission may comprise a SL TB and/or may be associated with a SL TB. For example, the Tx may determine to send (e.g., transmit) a first TB via a first PSSCH transmission occasion in a first slot. The first PSSCH transmission occasion may be associated with a first PSCCH transmission occasion. For example, a first SCI sent (e.g., transmitted) via the first PSCCH transmission occasion may indicate scheduling information of the first TB and/or the first PSSCH transmission occasion. The Tx wireless device may determine to perform a Type 1 LBT procedure prior to transmission of the first TB. The Tx wireless device may determine a first channel access priority class (e.g., CAPC value or p as in FIG. 35) for the first TB.

The CAPC value of a TB may be indicated by a first information field (e.g., ChannelAccess-CPext-CAPC) in DCI. For example, the wireless device may receive the DCI (e.g., DCI format 3_0 or format 3_1 or format 3_2) from a base station, wherein the DCI comprises scheduling information of the TB (e.g., for SL dynamic grant). The DCI may not comprise the first information field indicating the CAPC value of the TB (e.g., SL configured grant and/or SL selected grant). For example, in SL mode 2, the wireless device may select a grant (e.g., a first single-slot resource or PSSCH transmission occasion) for a TB transmission. The wireless device may determine a CAPC value associated with the TB (e.g., to use for LBT procedure prior to transmission of the TB via the grant) based on the content of the TB (e.g., the data multiplexed in the TB or the MAC PDU), e.g., if not indicated by DCI or SCI.

Throughout this disclosure: the term CAPC may refer to priority of channel access for a transmission, indicating how important it is to send (e.g., transmit) that transmission; and the term CAPC value may refer to a value of CAPC of a transmission, indicating a value/quantity that represents the respective CAPC. The relationship between a CAPC and its respective CAPC value may be reverse, e.g., as CAPC increases (more important/prioritized to access the channel) the CAPC value decreases (e.g., smaller/lower quantity/number is used to represent the CAPC).

A wireless device may determine a CAPC associated with a TB based on the content/data in the TB. Referring to FIG. 30A and FIG. 30B, a TB or MAC PDU may comprise one or more MAC SDUs and zero or one or more MAC-CEs. A MAC SDU may comprise data (e.g., data units or higher layer PDUs) of a SL logical channel. The wireless device may multiplex data (e.g., data units or MAC SDUs) of (e.g., data coming from a data buffer of) one or more SL logical channels in a MAC PDU. Referring to FIG. 29, the wireless device may multiplex data of a sidelink control channel (SCCH) or a sidelink traffic channel (STCH) in a MAC PDU (based on SL-SCH). The wireless device may further multiplex one or more SL MAC CEs (e.g., MAC control information of sidelink) in the MAC PDU.

A SL TB may comprise one or more MAC CEs. A SL TB may comprise data (e.g., one or more MAC SDUs) of a SCCH logical channel. The data/MAC SDU of a SCCH may comprise SL control data or one or more SL control messages. A SL TB may comprise data (e.g., one or more MAC SDUs) of a STCH logical channel. The data/MAC SDU of a STCH may comprise SL traffic data coming from one or more application services (e.g., from application layer). A MAC SDU may comprise data of a SL logical channel (e.g., SCCH or STCH). A MAC SDU may comprise data from (e.g., associated with) a SL radio bearer (e.g., SL SRB or SL DRB). A TB or MAC PDU may comprise data of a SL logical channel (e.g., SCCH or STCH). A TB or MAC PDU may comprise data from (e.g., associated with) a SL radio bearer (e.g., SL SRB or SL DRB).

For example, as shown in FIG. 28, SL data from higher layers (e.g., SL control messages and/or data from SL applications) may be buffered/stored in one or more SL radio bearer. For example, control data may be buffered in SL signaling radio bearer (SL SRB). For example, application/traffic data may be buffered in SL data radio bearer (SL DRB). For example, a SL radio bearer may be linked to or associated with a SL logical channel. Referring to FIG. 28, upper layers of the wireless device may map data from a SL radio bearer (e.g., SL SRB and/or SL DRB) to a SL logical channel (e.g., SBCH, SCCH, and/or STCH), and vice versa. The mapping between SL radio bearers and SL logical channels may be pre-defined and/or pre-configured by RRC configurations. For example, data from a SL SRB may be buffered/stored in a SCCH. For example, data from a SL DRB may be buffered/stored in a STCH. A SCCH logical channel may comprise data from at least one SL SRB. A STCH logical channel may comprise data from at least one SL DRB.

Sidelink radio bearers and/or sidelink logical channels may be associated with different CAPC values. For example, the CAPC (or CAPC value) of one or more first SL radio bearers or SL logical channels or SL MAC CEs may be predefined (e.g., fixed). For example, the CAPC (or CAPC value) of one or more second SL radio bearers or SL logical channels or SL MAC CEs may be configured by gNB (e.g., indicated via RRC configuration parameters).

The Channel Access Priority Classes (CAPC) of radio bearers and MAC CEs may be pre-defined (e.g., fixed) or configurable (e.g., via RRC configuration parameters). For example, the CAPC may be fixed to the lowest priority for the padding BSR and recommended bit rate MAC CEs. For example, the CAPC may be fixed to the highest priority for SL SRB0, SL SRB1, SL SRB3 and other MAC CEs. For example, the CAPC may be configured by the gNB for SL SRB2 and SL DRB(s). For example, when choosing the CAPC of a DRB, the base station may consider (e.g., take into account) the PQIs of one or more QoS flows multiplexed in that DRB, e.g., while considering fairness between different traffic types and transmissions. For example, a mapping may be defined/provided to show which CAPC value should be used for which standardized PQIs, e.g., which CAPC to use for a given QoS flow. For example, for one or more first PQIs (e.g., PQI=1, 3, 5, 65, 66, 67, 69, 70, 79, 80, 82, 83, 84, 85) a first CAPC value (e.g., p=1) may be used. For example, for one or more second PQIs (e.g., PQI=2, 7, 71) a second CAPC value (e.g., p=2) may be used. For example, for one or more third PQIs (e.g., PQI=4, 6, 8, 9, 72, 73, 74, 76) a third CAPC value (e.g., p=3) may be used. A QoS flow corresponding to a non-standardized PQI (e.g., operator specific PQI) may use the CAPC of the standardized PQI which best matches the QoS characteristics of the non-standardized PQI.

For example, PQI (PC5-5QI) may be used to determine the CAPC mapping in SL-U. For example, for SL-DRB the CAPC value may be (pre)configurable per-DRB. For example, for all SL-SRBs, CAPC value may be fixed to the highest priority (i.e., lowest CAPC value). For example, for all SL MAC CEs, CAPC value may be fixed to the highest priority (i.e., lowest CAPC value). For example, at least PDB may be used as the criterion to determine the CAPC mapping.

A wireless device may select/determine a CAPC/CAPC value for a transmission of a SL TB/MAC PDU, e.g., when performing Type 1 LBT for the transmission of the sidelink TB/MAC PDU. The wireless device may select/determine a CAPC for a transmission of a SL TB/MAC PDU, e.g., when the CAPC/CAPC value is not indicated in DCI or SCI. For example, the wireless device may select/determine a CAPC for a transmission of a SL TB/MAC PDU when the wireless device selects a resource for the transmission of the SL TB/MAC PDU (e.g., mode 2).

A wireless device may select/determine a CAPC/CAPC value for a transmission of a SL TB/MAC PDU based on one or more SL radio bearers or SL logical channels or SL MAC CEs multiplexed in the SL TB/MAC PDU. For example, if only MAC CE(s) are included/multiplexed in the TB, the wireless device selects/uses the highest priority CAPC (e.g., the lowest CAPC value) of those MAC CE(s). For example, if SCCH SDU(s) are included in the TB, the wireless device selects/uses the highest priority CAPC (e.g., lowest CAPC value). For example, if SCCH SDU(s) are included in the TB, the wireless device selects/uses the highest priority CAPC (e.g., lowest CAPC value) of the SCCH(s). Otherwise, the wireless device selects/uses the lowest priority CAPC (e.g., highest CAPC value) of the logical channel(s) with MAC SDU multiplexed in the TB. For example, if no SCCH SDU(s) are multiplexed/included in the TB, and/or if only MAC CE(s) are not included/multiplexed in the TB, the wireless device selects/uses the lowest priority CAPC (e.g., highest CAPC value) of the logical channel(s) with MAC SDU multiplexed in the TB.

For example, if the SL TB/MAC PDU comprises only MAC CE(s), the wireless device selects/uses the highest priority CAPC of those MAC CE(s). For example, if the SL TB/MAC PDU comprises SCCH SDU(s) (e.g., data of/from SCCH logical channel(s) or SL SRB(s)), the wireless device selects/uses the highest priority CAPC (e.g., the highest priority CAPC of the SCCH(s)). For example, if the SL TB/MAC PDU does not comprise SCCH SDU(s) (e.g., data of/from SCCH logical channel(s) or SL SRB(s)) and/or comprises STCH SDUs (e.g., data of/from STCH logical channel(s) or SL DRB(s)), the wireless device selects/uses the lowest priority CAPC of the logical channel(s) with MAC SDU multiplexed in the TB/MAC PDU.

For example, if only SL MAC CE(s) are included in the SL TB, the highest priority SL CAPC (e.g., lowest CAPC value) may be used. For example, if SL MAC CE(s) is multiplexed with STCH SDU(s), the highest priority SL CAPC (e.g., lowest CAPC value) may be used. For example, if SCCH SDU(s) are included in the SL TB, the highest priority SL CAPC (e.g., lowest CAPC value) may be used.

A wireless device may perform one or more LBT procedures based on the determined/selected CAPC value (p). For example, the wireless device may perform the one or more LBT procedures using the selected/determined CAPC/CAPC value. The LBT procedure may be a Type 1 LBT procedure (e.g., Type 1 SL channel access procedure). For example, the wireless device (e.g., Tx wireless device) may determine the parameters of the one or more LBT procedures based on the selected CAPC value, e.g., quantity of consecutive slots (m_p) that the wireless device senses the channel for the LBT procedure, contention window size ($CW_p$) and/or the defer duration ($T_d$) based on the selected CAPC/CAPC value. The wireless device may determine a duration of a channel occupancy time (COT), initiated by the LBT procedure, based on the CAPC of the LBT procedure. Referring to FIG. 35, the wireless device may determine a minimum contention window size associated with the selected CAPC ($CW_{min,p}$) and a maximum contention window size associated with the selected CAPC ($CW_{max,p}$) and a set of allowed contention window sized within the range indicated by the minimum contention window size and the maximum contention window size, associated with the selected CAPC (allowed $CW_p$ sizes) for the one or more LBT procedures. The wireless device may determine a defer duration ($T_d$) based on the parameter associated with the determined CAPC ($m_p$). The wireless device may send (e.g., transmit) the transmission using Type 1 channel access procedure after first sensing the channel to be idle during the slot durations of a defer duration $T_d$, and after a counter N is zero, wherein the counter N is initialized with a random quantity/number uniformly distributed between 0 and $CW_p$, and $CW_{min,p} \leq CW_p \leq CW_{max,p}$ is the contention window selected based on the table in FIG. 35 for the selected CAPC value (p).

A wireless device may initiate a COT based on a successful LBT procedure (e.g., Type 1 LBT procedure). As shown in FIG. 35, the wireless device may determine a duration (e.g., maximum duration) of the initiated COT ($T_{SL\ mcot,p}$) based on the CAPC value (p) used for the corresponding LBT procedure.

A wireless device may receive a COT sharing indication, e.g., from a second wireless device. For example, the second wireless device may initiate the COT (e.g., based on a first duration) and may share a remainder duration (from the first duration) of the COT with this wireless device. For example, the COT sharing indication may indicate the CAPC value associated with the COT (e.g., the CAPC value that the second UE used in the LBT procedure when initiating the COT). The wireless device may determine whether to share the COT or not based on the indicated CAPC value. For example, the wireless device may have a second SL transmission associated with a second CAPC value. The wireless device may determine whether to send (e.g., transmit) the second SL transmission within/based on the shared COT or not based on comparing the second CAPC value with the indicated CAPC value of the COT. For example, for fair channel access, the wireless device may share the COT in the second CAPC value is lower/smaller than or equal to the indicated CAPC value of the COT.

In at least some wireless communications, a wireless device may perform a channel access procedure (e.g., a Type 1 LBT procedure) for an MCSt transmission (e.g., for an entire MCSt transmission with shared spectrum operation). For example, as shown in FIG. 33A and FIG. 33B, the wireless device may perform a first LBT procedure (e.g., Type 1 LBT procedure) prior to the earliest slot/transmission of the MCSt (slot 1) and may or may not perform second LBT procedure(s) (e.g., Type 2/2A/3B/2C LBT procedure) prior to the later slots/transmissions of the MCSt following the earliest slot/transmission (slot 2, . . . , slot n). For example, the wireless device may perform a third LBT procedure (e.g., Type 1 LBT procedure) prior to next slot/transmission (slot 2), and so on, if the first LBT procedure prior to slot 1 fails (e.g., indicates a busy/occupied channel). For the first LBT procedure and the third LBT procedure, the wireless device need to select a CAPC value. For example, a first CAPC value for the first LBT procedure and a third CAPC value for the third LBT procedure. At least some wireless communications may fail to address the determination of the first CAPC value and/or the third CAPC value used for one or more LBT procedures for a MCSt in sidelink operations.

At least some wireless communications may lack a base station signaling (e.g., DCI) to indicate the CAPC for a MCSt grant (e.g., in SL-U mode 2) in a sidelink operation. DCI scheduling a MCSt (e.g., indicating a MCSt grant) may not comprise an information field indicating a CAPC value. Therefore, a wireless device (e.g., the Tx wireless device) may have to determine the CAPC(s) for the MCSt. A wireless device may determine the CAPC based on the content/data of a TB that is to be sent (e.g., transmitted) upon a successful LBT procedure (e.g., based on the 5QI of radio bearers and MAC-CEs and logical channels multiplexed in the TB), if no CAPC is indicated to the wireless device (e.g., if the DCI doesn't include the CAPC field (e.g., fallback DCI) or for configured grant). Only a single TB may be sent (e.g., transmitted) upon a successful LBT using the selected CAPC value.

Data from/of different SL radio bearers or SL logical channels may be multiplexed in the multiple TBs of the MCSt, for example, in a case of MCSt with different/multiple TBs. For example, the SL radio bearers or SL logical channels may be associated with different CAPCs/CAPC values. As described herein, improvements may be made to determine a CAPC associated with the MCSt. At least some wireless communications may fail to efficiently and fairly address the CAPC issue for MCSt with multiple TBs. For a MCSt with multiple TBs, one CAPC may be determined/used to access the channel and/or share a COT. For example, despite the multiple TBs comprising different types of data associated with different CAPC values, a single LBT (Type 1 LBT) procedure may be performed for the (entire or partial) MCSt, and thus, a single CAPC value may be used. It may be beneficial (e.g., potentially essential) for the CAPC value for a MCSt to be determined in a way that the channel access is fair to all users of a shared spectrum and/or at the same time, for example, so that a wireless device may access a channel to send (e.g., transmit) information (such as critical sidelink information) via MCSt.

An increased likelihood of LBT failure may be resulted (referring to FIG. 35, longer contention window sizes and/or defer durations) if a lowest CAPC (e.g., lowest priority, or highest CAPC value) of TBs in the MCSt is always used for fair channel access. For example, the chance of channel access and transmission of that critical information is reduced if critical information such as higher layer control data is included in any of the TBs of the MCSt. The frequent use of the lowest CAPC may result in an extremely unreliable communication system with dramatically increased delays.

An unfair channel access may be resulted (e.g., there is no critical information such as higher layer control data included in the MCSt) if a highest CAPC (e.g., highest priority, lowest CAPC value) of TBs in the MCSt is always used. Operation (e.g., based on one or more regulations of an unlicensed spectrum) may require fair channel access for devices (e.g., for all devices), which may not be violated even for the sake of MCSt burst transmissions.

For example, one or more TBs of the MCSt may comprise SL SRB data. Transmission of such control signaling may be very vital. In another example, all TBs of the MCSt may comprise only DRB data. At least some wireless communications may fail to capture a balanced channel access for MCSt. Examples described herein may provide a balanced channel access priority in case of MCSt transmission. Balanced channel access priority may be based on one or more variables such as the content/type of data sent (e.g., transmitted) via MCSt in determination of the CAPC used for the MCSt. For example, balanced channel access priority described herein may provide an appropriate CAPC determination/selection for MCSt based on the logical channels whose data (e.g., MAC SDUs and/or MAC CEs) is multiplexed in any TB/MAC PDU of the MCSt resource.

In at least some wireless communications, a SL physical layer priority (which is used for SL resource evaluation and/or preemption among only SL transmitters) may be used to determine the CAPC of a MCSt. For example, a TB with a lowest priority among the multiple TBs of MCSt may be the reference for CACP selection. For example, a CAPC value of a first TB among M TBs of the MCSt may be selected for the LBT procedure of the MCSt, wherein the first TB has the lowest priority of all M TBs. However, the SL physical layer priority of a first TB may not be an accurate representative/measure of the channel access priority class for of an MCSt comprising the first TB. For example, rules of SL PHY priority determination may be different from the CAPC determination, and if a TB has the lowest SL PHY priority it may not have the lowest CAPC, e.g., depending on the logical channels (e.g., MAC SDUs and/or MAC CEs) multiplexed in the TB.

As described herein, efficient and/or fair CAPC determination for MCSt may be provided based on one or more variables such as the content and/or type of data (e.g., control data (SL SRB) and/or traffic data (SL-DRB) and/or MAC CE) that is sent (e.g., transmitted) via MCSt. Examples described herein may provide advantages such as avoiding/reducing confusion and/or uncertainty of channel access priority class with the SL PHY priority which may have a different purpose and/or different characteristics.

A wireless device may determine a resource for MCSt (e.g., MCSt resource). For example, a transmitting wireless device (e.g., Tx wireless device) may determine a MCSt resource comprising transmission resources/occasions in multiple (e.g., a plurality of) consecutive slots. Referring to FIG. 19, a transmission resource/occasion may be a time and frequency resource for transmission of a TB and/or one or more SCIs via PSSCH and/or PSCCH in a slot. Referring to FIG. 33A and FIG. 33B and FIG. 34, the MCSt resource may comprise multiple consecutive single-slot resources for transmission of/via PSSCH/PSCCH. A single-slot resource may be a time/frequency resource within a slot for transmission of a TB/SCI via PSSCH/PSCCH. The wireless device may map a generated TB to resources (e.g., resource elements) of a single-slot resource. For example, as shown in FIG. 34, the wireless device may map a first TB (TB1 or MAC PDU 1) to the single-slot resource in slot m, a second TB (TB2 or MAC PDU 2) to the single-slot resource in slot m+1, a third TB (TB3 or MAC PDU 3) to the single-slot resource in slot m+2, and a fourth TB (TB4 or MAC PDU 4) to the single-slot resource in slot m+3.

A wireless device may receive DCI comprising a MCSt grant. For example, the DCI may schedule transmission of multiple TBs (e.g., TB1 to TB4 in FIG. 34) via the MCSt grant. For example, the MCSt grant may comprise M single-slot grants for transmission of M TBs, e.g., one single-slot grant per TB.

A wireless device may select the MCSt grant in a SL resource pool. For example, the wireless device may select a MCSt grant of size/length M, comprising M single-slot grants. For example, the wireless device may select M consecutive single-slot resources in the resource pool for transmission of M TBs (e.g., MCSt resource).

A wireless device may determine the MCSt resource for transmission of multiple TBs. For example, the wireless device may determine to send (e.g., transmit) multiple (e.g., M) TBs via a MCSt resource (e.g., in a MCSt). Each TB of the multiple (M) TBs or MAC PDUs sent (e.g., transmitted) via the MCSt resource may comprise data (e.g., traffic data and/or control data) of/from different SL logical channels (or SL radio bearers). For example, the wireless device may multiplex data (e.g., one or more MAC SDUs) from a first SL logical channel in a first TB of the MCSt. For example, the wireless device may multiplex data (e.g., one or more MAC SDUs) from a second SL logical channel and/or a third SL logical channel in a second TB of the MCSt. For example, the wireless device may multiplex data (e.g., one or more MAC SDUs) from a fourth SL logical channel and/or a MAC-CE in a third TB of the MCSt. For example, the wireless device may multiplex only SL MAC-CEs in a fourth TB of the MCSt. In an example, the first SL logical channel may be a sidelink traffic channel (STCH) or a sidelink control channel (SCCH). The second SL logical channel may be a sidelink traffic channel (STCH) or a sidelink control channel (SCCH). The third SL logical channel may be a sidelink traffic channel (STCH) or a sidelink control channel (SCCH). A MAC SDU that is multiplexed in a TB of the multiple TBs that will be sent (e.g., transmitted) via MCSt (MCSt resource) may comprise sidelink traffic data from at least one SL traffic channel (STCH) and/or may comprise sidelink control data/message from at least one SL control channel (SCCH). A MAC SDU that is multiplexed in a TB of the multiple TBs that will be sent (e.g., transmitted) by MCSt (MCSt resource) may comprise sidelink traffic data from at least one SL data radio bearer (SL DRB) or may comprise sidelink control data/message from at least one SL signaling radio bearer (SL SRB). For example, one or more first MAC SDUs, of a plurality of MAC SDUs included/multiplexed in the multiple TBs/MAC PDUs that will be sent (e.g., transmitted) by MCSt, may be SCCH SDUs. For example, one or more second MAC SDUs, of the plurality of MAC SDUs included/multiplexed in the multiple TBs/MAC PDUs that will be sent (e.g., transmitted) by MCSt, may be STCH SDUs. For example, the multiple TBs/MAC PDUs of the MCSt may comprise zero or one or more SL MAC CEs.

A wireless device may determine a CAPC value for transmission of the multiple TBs via the determined MCSt resource. The wireless device may determine a CAPC value associated with a MCSt. For example, the wireless device may perform one or more LBT procedures for the MCSt based on the CAPC value of the MCSt. For example, the wireless device may determine whether to share a COT (e.g., indicated by a COT sharing indication) for transmission of the MCSt based on the CAPC of the MCSt.

A wireless device may determine a CAPC value for or associated with the MCSt. For example, a plurality of CAPC values may be pre-defined (e.g., referring to FIG. 35, CAPC value p=1 or 2 or 3 or 4). The wireless device may select a CAPC value, from/among the plurality of CAPC value, for the MCSt. The wireless device may determine/select the CAPC value based on the content of the multiple TBs to be sent (e.g., transmitted) via the MCSt. For example, the wireless device may determine/select the CAPC based on the MAC SDUs and/or MAC CEs multiplexed in the multiple TBs of (mapped to) the MCSt resource. For example, the wireless device may determine/select the CAPC of MCSt, comprising multiple TBs, based on whether the multiple TBs comprise data of/from a sidelink control channel (SCCH).

An MCSt may comprise multiple TBs. For example, each TB of the multiple TBs may be mapped to resources (e.g., resource elements) of one of the single-slot resources of the MCSt resource. For example, the wireless device may send (e.g., transmit) each TB of the multiple TBs using one resources of the multiple (single-slot) resources of the MCSt resource.

A wireless device may select a first CAPC value for MCSt (e.g., for LBT procedure prior to transmission of multiple TBs via the MCSt resource), based on the multiple TBs comprising data (e.g., MAC SDU) of (e.g., coming from) at least one SCCH logical channel. The wireless device may select the first CAPC value based on at least one TB of the multiple TBs comprising at least one SCCH SDU. The first CAPC value may be a lowest CAPC value (e.g., p=1, indicating a highest channel access priority).

A wireless device may select a second CAPC value for MCSt (e.g., for LBT procedure prior to transmission of multiple TBs via the MCSt resource), based on the multiple TBs not comprising data (e.g., MAC SDU) of (e.g., coming from) a SCCH logical channel. The wireless device may select the second CAPC value based on all TBs of the multiple TBs not comprising any SCCH SDU. For example, the multiple TBs may comprise data (e.g., MAC SDUs) of (e.g., coming from) one or more STCH logical channels. The second CAPC value may be based on a highest CAPC value of the CAPC values associated with the one or more STCH logical channels.

Figure 36:
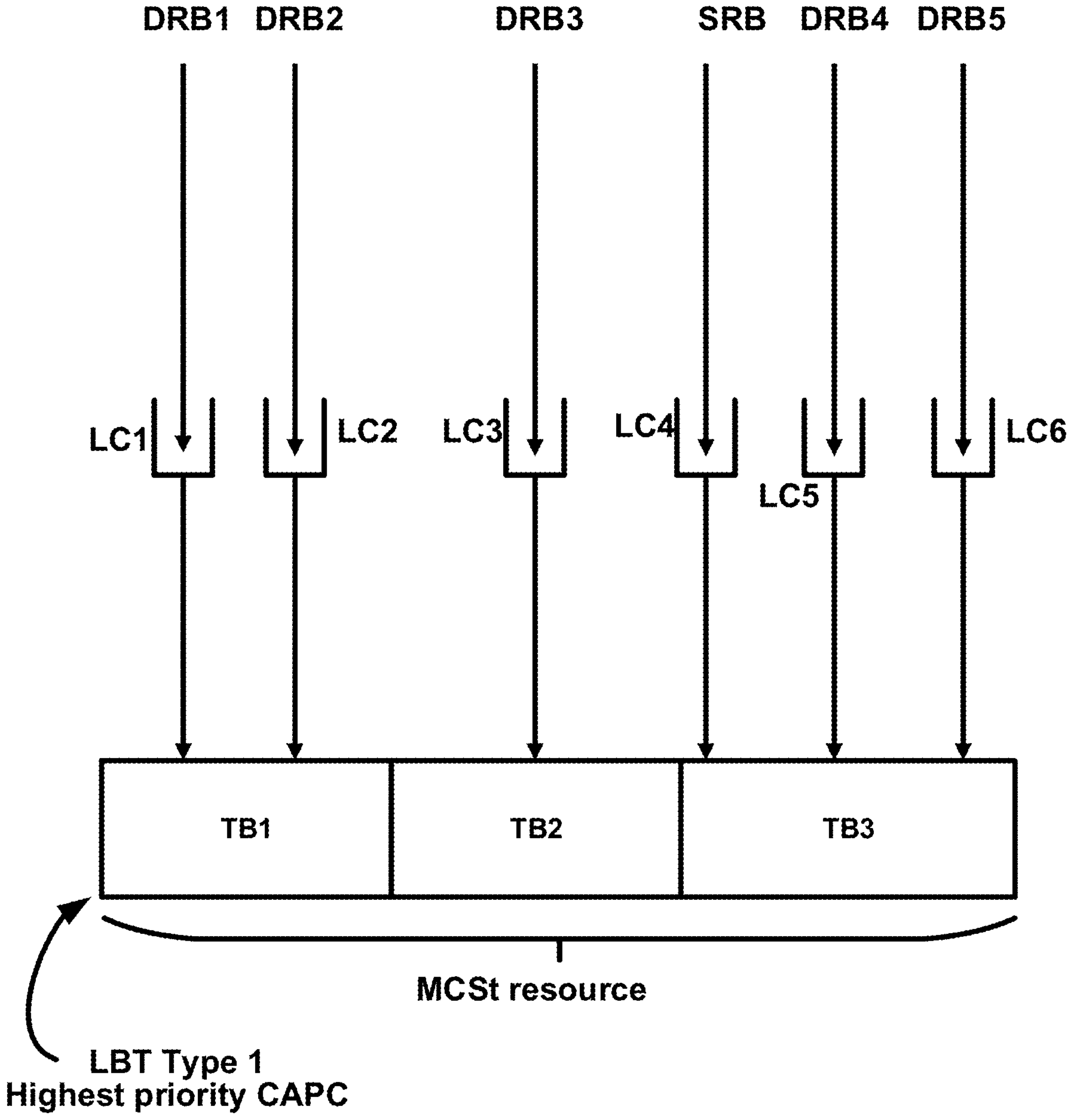
FIG. 36 shows an example channel access priority class (CAPC) determination for MCSt.

FIG. 36 shows an example CAPC determination for MCSt. The wireless device may determine a MCSt resource comprising three single-slot resources (PSSCH/PSCCH transmission occasions each within a slot). The wireless device may generate a first TB (e.g., TB1 or MAC PDU 1) and map it to the first resource of the MCSt (e.g., in the first/earliest slot). The wireless device may generate a second TB (e.g., TB2 or MAC PDU 2) and map it to the second resource of the MCSt (e.g., in the second slot). The wireless device may generate a third TB (e.g., TB3 or MAC PDU 3) and map it to the third resource of the MCSt (e.g., in the third slot).

As shown in FIG. 36, each TB of the three TBs mapped to resources of the MCSt resource may comprise data of one or more SL logical channels. For example, TB1 comprises data (e.g., MAC SDU) of/associated with a first SL logical channel (LC1) and a second SL logical channel (LC2). For example, TB2 comprises data (e.g., MAC SDU) of/associated with a third SL logical channel (LC3). For example, TB3 comprises data (e.g., MAC SDU) of/associated with a fourth SL logical channel (LC4) and a fifth SL logical channel (LC5) and a sixth SL logical channel (LC6). A SL logical channel may be SCCH or STCH.

As shown in FIG. 36, each SL logical channel may comprise data (e.g., control data or traffic data) of/from a sidelink radio bearer, e.g., a SL-SRB or a SL-DRB. For example, one or more QoS flows (e.g., application layer data) may be multiplexed in DRB1 (SL DRB1), and data from DRB1 may be buffered/multiplexed in LC1. For example, LC1 may be a STCH logical channel. For example, one or more QoS flows may be multiplexed in DRB2 (SL DRB2), and data from DRB2 may be buffered/multiplexed in LC2. For example, LC2 may be a STCH logical channel. The wireless device may multiplex/include data (e.g., MAC SDUs, or STCH SDUs) from LC1 and LC2 in the first TB (TB1 or MAC PDU 1), e.g., based on sidelink logical channel prioritization (LCP). For example, one or more QoS flows may be multiplexed in DRB3 (SL DRB3), and data from DRB3 may be buffered/multiplexed in LC3. For example, LC3 may be a STCH logical channel. The UE may multiplex/include data (e.g., MAC SDU(s) or STCH SDU(s)) from LC3 in the second TB (TB2 or MAC PDU 2), e.g., based on sidelink logical channel prioritization (LCP). For example, SL control messages/data may be multiplexed in an SRB (e.g., SL SRB), and data from the SRB may be buffered/multiplexed in LC4. For example, LC4 may be a SCCH logical channel. For example, one or more QoS flows may be multiplexed in DRB4 (SL DRB4), and data from DRB4 may be buffered/multiplexed in LC5. For example, one or more QoS flows may be multiplexed in DRB5 (SL DRB5), and data from DRB5 may be buffered/multiplexed in LC6.

For example, LC5 and LC6 may be a STCH logical channels. The wireless device may multiplex/include data (e.g., MAC SDUs comprising at least one SCCH SDU and one or more STCH SDUs) from LC4 and LC5 and LC6 in the third TB (TB3 or MAC PDU 3), e.g., based on sidelink logical channel prioritization (LCP).

A wireless device may determine to perform a LBT procedure (e.g., LBT Type 1 procedure) prior to transmission of TB1 and TB2 and TB3 via the MCSt resource. The wireless device may determine a CAPC for the LBT procedure associated with the MCSt. The wireless device may determine a CAPC value of/for the MCSt. The wireless device may determine that the MCSt (e.g., at least one TB in the MCSt) comprises a SCCH SDU (e.g., data from a SCCH logical channel or a SL SRB). The wireless device may determine a highest priority CAPC (indicated by a lowest CAPC value) for the MCSt based on (e.g., in response to) the MCSt comprising data (e.g., MAC SDU) of/from at least one SL SRB or SCCH. As shown in the example of FIG. 36, based on at least one TB (TB3), of multiple TBs mapped to (or sent/transmitted via) the MCSt resource, comprising data of a SL SRB (e.g., through LC4), the wireless device may select the highest priority CAPC (or the lowest CAPC value) for the LBT procedure prior to the MCSt.

Figure 37:
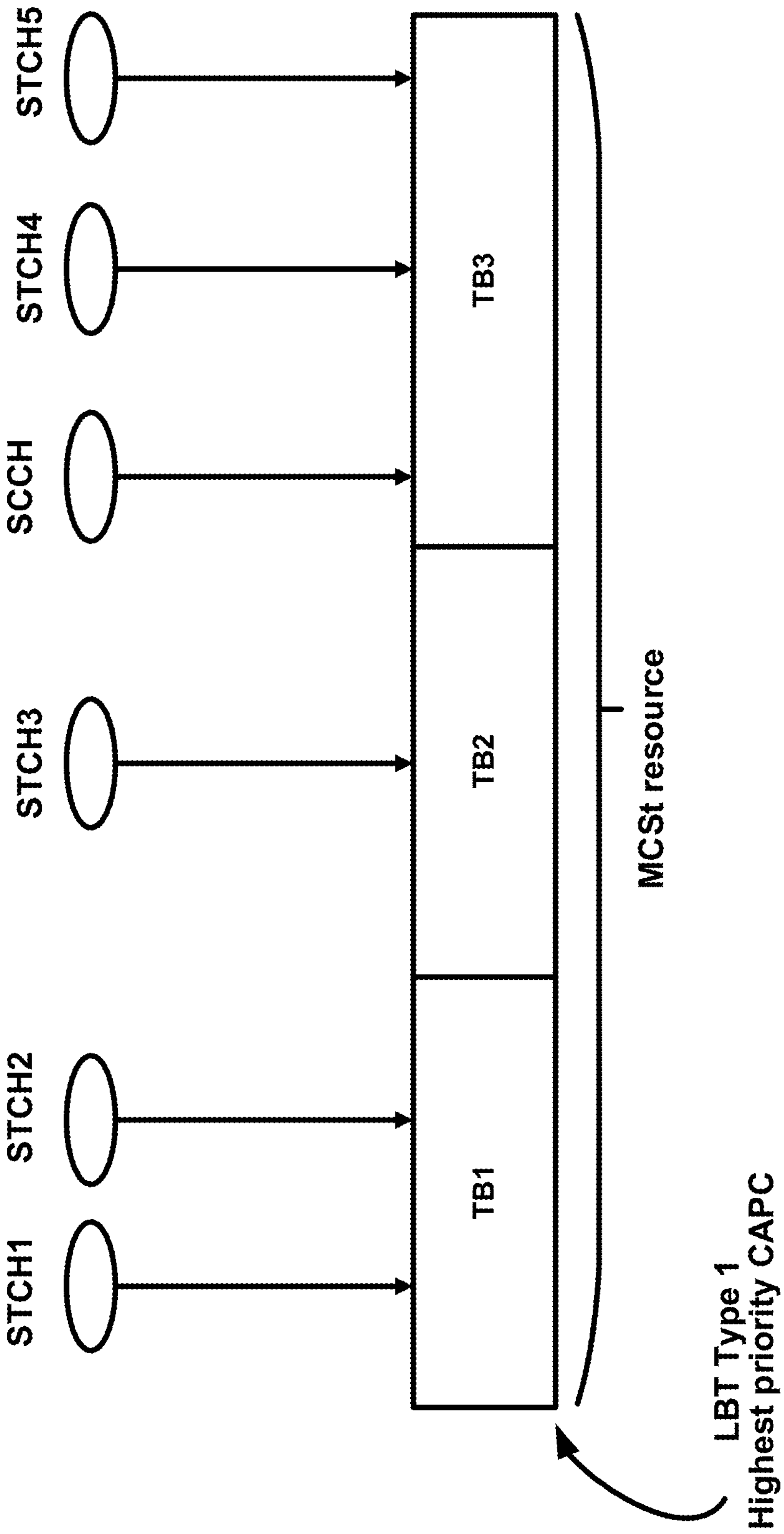
FIG. 37 shows an example CAPC determination for MCSt based on multiplexed logical channels.

FIG. 37 shows an example CAPC determination for MCSt based on multiplexed logical channels. This figure shows the logical channels of the example in FIG. 36. As shown in FIG. 37, data or MAC SDUs from a first SL traffic channel (STCH1) and a second SL traffic channel (STCH2), e.g., STCH SDUs, may be multiplexed in TB1. Data/MAC SDU(s) from (associated with/of) a third STCH logical channel (STCH3) may be multiplexed in TB2. Data/MAC SDU(s) from a SL control channel (SCCH), e.g., SCCH SDU(s), may be multiplexed in TB3. Additionally, data/MAC SDUs from STCH4 and STCH5, e.g., STCH SDUs, may be multiplexed in TB3. Therefore, the MCSt may comprise data (e.g., control data or control message or control information) from a SL control channel (e.g., SCCH logical channel). The MCST may further comprise data (e.g., traffic data or application data) from one or more SL traffic channels (e.g., STCH logical channels, STCH1 to STCH5). Based on the MCSt comprising at least one SCCH SDU (e.g., MAC SDU comprising data from a SCCH logical channel or SL-SRB), the wireless device may determine a highest priority CAPC for the MCSt. For example, the wireless device may perform a LBT procedure prior to the MCSt, wherein the LBT procedure is based on the highest priority CAPC (the lowest CAPC value).

A wireless device may send (e.g., transmit) the three TBs via/using the MCSt resource and based on the LBT procedure, e.g., in response to the LBT procedure indicating an idle channel. Due to using the highest priority CAPC (or equivalently, the lowest CAPC value) for the LBT procedure, the chance of LBT success may be increased, and the critical control data of SL SRB or the SCCH logical channel that is multiplexed in TB3 may have a higher chance of successfully being sent (e.g., transmitted) via the MCSt.

Figure 38A:
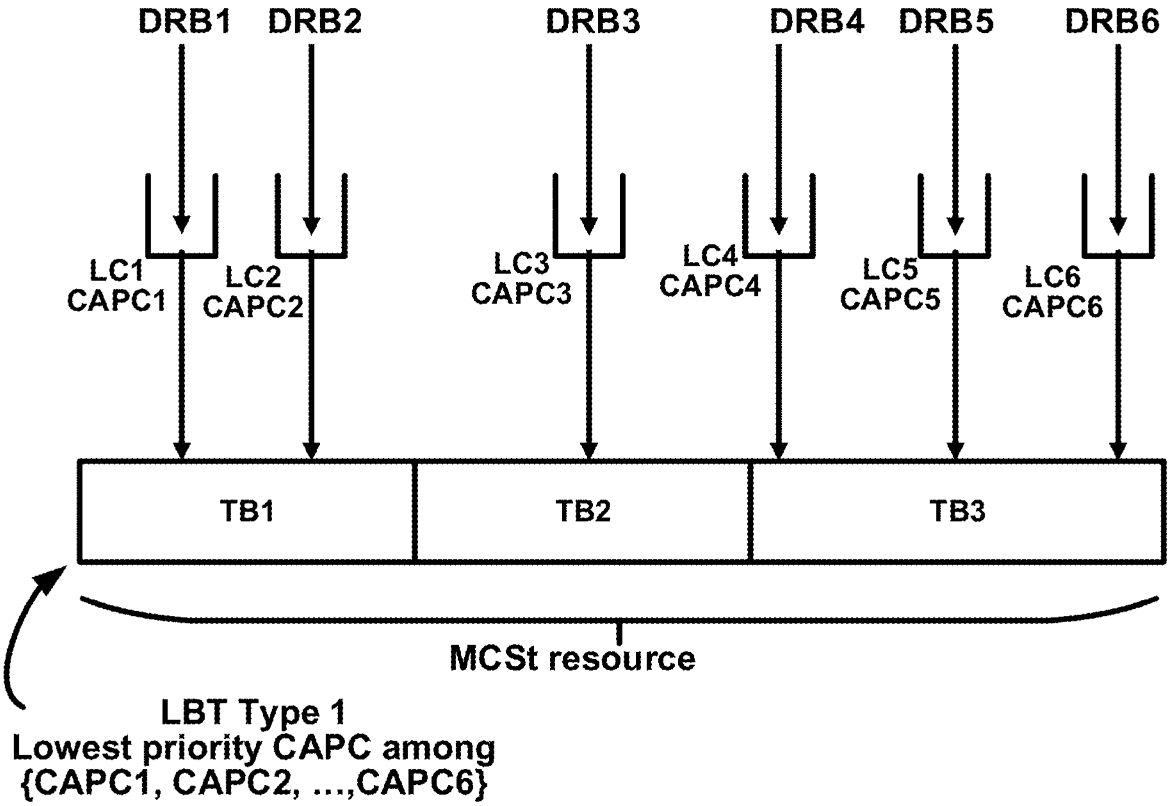
FIG. 38A and FIG. 38B show an example of CAPC determination for MCSt.
Figure 38B:
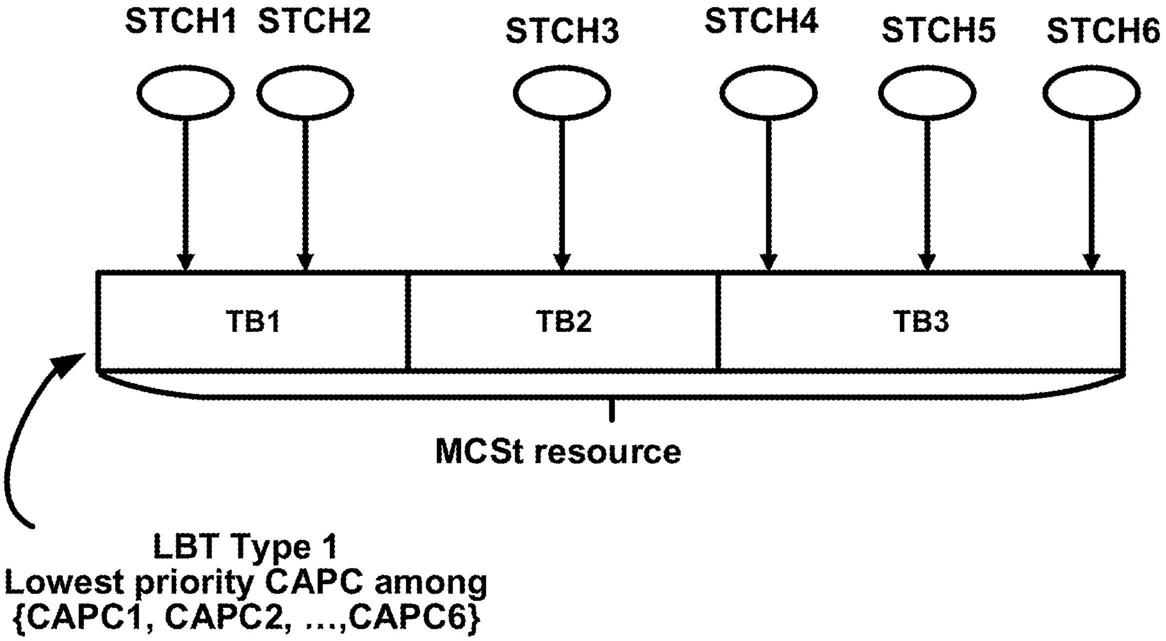

FIG. 38A and FIG. 38B show another example of CAPC determination for MCSt. In this example, the wireless device may determine a MCSt resource comprising three single-slot resources (PSSCH/PSCCH transmission occasions each within a slot). The wireless device may generate a first TB (e.g., TB1 or MAC PDU 1) and map it to the first resource of the MCSt (e.g., in the first/earliest slot). The wireless device may generate a second TB (e.g., TB2 or MAC PDU 2) and map it to the second resource of the MCSt (e.g., in the second slot). The wireless device may generate a third TB (e.g., TB3 or MAC PDU 3) and map it to the third resource of the MCSt (e.g., in the third slot).

One or more TB (e.g., each TB) of the three TBs mapped to resources of the MCSt resource may comprise data of one or more SL logical channels as shown in FIG. 38A. For example, TB1 may comprise data (e.g., MAC SDU) of/associated with a first SL logical channel (LC1) and a second SL logical channel (LC2). TB2 may comprise data (e.g., MAC SDU) of/associated with a third SL logical channel (LC3). TB3 may comprise data (e.g., MAC SDU) of/associated with a fourth SL logical channel (LC4) and a fifth SL logical channel (LC5) and a sixth SL logical channel (LC6). A SL logical channel may be SCCH or STCH.

The SL logical channel in FIG. 38A comprise data (traffic data) of/from a sidelink radio bearer, e.g., a SL-DRB. For example, one or more QoS flows (e.g., application layer data) may be multiplexed in DRB1 (SL DRB1), and data from DRB1 may be buffered/multiplexed in LC1. For example, LC1 may be a STCH logical channel associated with CAPC1. For example, the wireless device may receive an RRC message comprising SL configuration parameters that comprise a first parameter (e.g., channelAccessPriority) indicating that CAPC1 is configured for DRB1 and/or LC1. For example, one or more QoS flows may be multiplexed in DRB2 (SL DRB2), and data from DRB2 may be buffered/multiplexed in LC2. LC2 may be a STCH logical channel associated with CAPC2. The wireless device may receive an RRC message comprising SL configuration parameters that comprise a second parameter indicating that CAPC2 is configured for DRB2 and/or LC2. The wireless device may multiplex/include data (e.g., MAC SDUs, or STCH SDUs) from LC1 and LC2 in the first TB (TB1 or MAC PDU 1), e.g., based on sidelink logical channel prioritization (LCP). For example, one or more QoS flows may be multiplexed in DRB3 (SL DRB3), and data from DRB3 may be buffered/multiplexed in LC3. For example, LC3 may be a STCH logical channel associated with CAPC3. For example, the wireless device may receive an RRC message comprising SL configuration parameters that comprise a third parameter indicating that CAPC3 is configured for DRB3 and/or LC3. The wireless device may multiplex/include data (e.g., MAC SDU(s) or STCH SDU(s)) from LC3 in the second TB (TB2 or MAC PDU 2), e.g., based on sidelink logical channel prioritization (LCP). For example, one or more QoS flows may be multiplexed in DRB4 (SL DRB4), DRB5, and DRB6, and data from DRB4 and DRB5 and DRB6 may be buffered/multiplexed in LC4 and LC5 and LC6, respectively. For example, LC4 and LC5 and LC6 may be STCH logical channels, associated with CAPC4 and CAPC5 and CAPC6, respectively. For example, the wireless device may receive an RRC message comprising SL configuration parameters indicating that CAPC4 and CAPC5 and CAPC6 are configured for DRB4/LC4 and DRB5/LC5 and DRB6/LC6, respectively. The wireless device may multiplex/include data (e.g., MAC SDUs or STCH SDUs) from LC4 and LC5 and LC6 in the third TB (TB3 or MAC PDU 3), e.g., based on sidelink logical channel prioritization (LCP).

A wireless device may determine to perform a LBT procedure (e.g., LBT Type 1 procedure) prior to transmission of TB1 and TB2 and TB3 via the MCSt resource. The wireless device may determine a CAPC for the LBT procedure associated with the MCSt. The wireless device may determine a CAPC value of/for the MCSt. The wireless device may determine that the MCSt (e.g., the TBs in the MCSt) does not comprise any SCCH SDUs (e.g., no data from a SCCH logical channel or SL SRB is multiplexed in the TB of the MCSt). For example, the wireless device may determine that only STCH SDUs are multiplexed in the TB of the MCSt. For example, the MCSt resource may comprise one or more STCH SDUs and/or one or more MAC CEs. The wireless device may select the lowest priority CAPC of the logical channels with MAC SDUs multiplexed in the TBs of MCSt as the CAPC for transmission of the MCSt. For example, the wireless device may select, for the MCSt, a first CAPC associated with a first logical channel that has the lowest CAPC priority (indicated by a highest CAPC value) among the logical channels with MAC SDUs multiplexed in any of the TBs of/in the MCSt, e.g., based on (in response to) the MCSt not comprising any data (e.g., MAC SDU) of/from any SL SRB or SCCH. As shown in FIG. 38A, based on TBs, of multiple TBs mapped to (or sent/transmitted via) the MCSt resource, comprising no data of a SL SRB, the wireless device may select the lowest priority CAPC (or the highest CAPC value) among the CAPCs of the logical channels with data/MAC SDUs multiplexed in any TB of the MCSt, for the LBT procedure prior to the MCSt. In FIG. 38A, CAPC2 may be the lowest priority CAPC among the CAPCs associated with the logical channels with MAC SDUs multiplexed in TB1 or TB2 or TB3, e.g., CAPCs of LC1 to LC6. For example, CAPC2 may be the lowest priority CAPCs among the set {CAPC1, . . . , CAPC6}. For example, CAPC2 may have the highest CAPC value among the CAPC values of the set {CAPC1, . . . , CAPC6}.

FIG. 38B shows the CAPC determination for MCSt in FIG. 38A based on multiplexed logical channels. As shown in FIG. 38B, data or MAC SDUs from a first SL traffic channel (STCH1) and a second SL traffic channel (STCH2), e.g., STCH SDUs, may be multiplexed in TB1. Data/MAC SDU(s) from (associated with/of) a third STCH logical channel (STCH3) may be multiplexed in TB2. Data/MAC SDU(s) from STCH4 and STCH5 and STCH6, e.g., STCH SDUs, may be multiplexed in TB3. Therefore, the MAC PDUs (or TBs) in the MCSt may not comprise any data (e.g., control data or control message or control information) from a SL control channel (e.g., SCCH logical channel). The MCSt may comprise data (e.g., traffic data or application data) from SL traffic channels (e.g., STCH logical channels, STCH1 to STCH6). Based on the MCSt not comprising any SCCH SDU (e.g., MAC SDU comprising data from a SCCH logical channel or SL-SRB), the wireless device may determine a lowest priority CAPC among the CAPCs of logical channels with MAC SDUs multiplexed in at least one TBs/MAC PDU in the MCSt. For example, the wireless device may perform a LBT procedure prior to the MCSt, wherein the LBT procedure is based on the lowest priority CAPC (the highest CAPC value among values of CAPC1 to CAPC6). It is worth emphasizing that, as shown in FIG. 35, a lower CAPC value indicates a higher priority CAPC and vice versa.

A wireless device may transmit the three TBs (or any other quantity of TBs) via/using the MCSt resource and based on the LBT procedure (e.g., in response to the LBT procedure indicating an idle channel). Due to using the lowest priority CAPC (or equivalently, the highest CAPC value) for the LBT procedure, the fairness in channel access for traffic transmission may be increased, and devices may not violate the regulations by transmitting traffic with lower channel access priority using a LBT procedure with a higher channel access priority class.

Figure 39A:
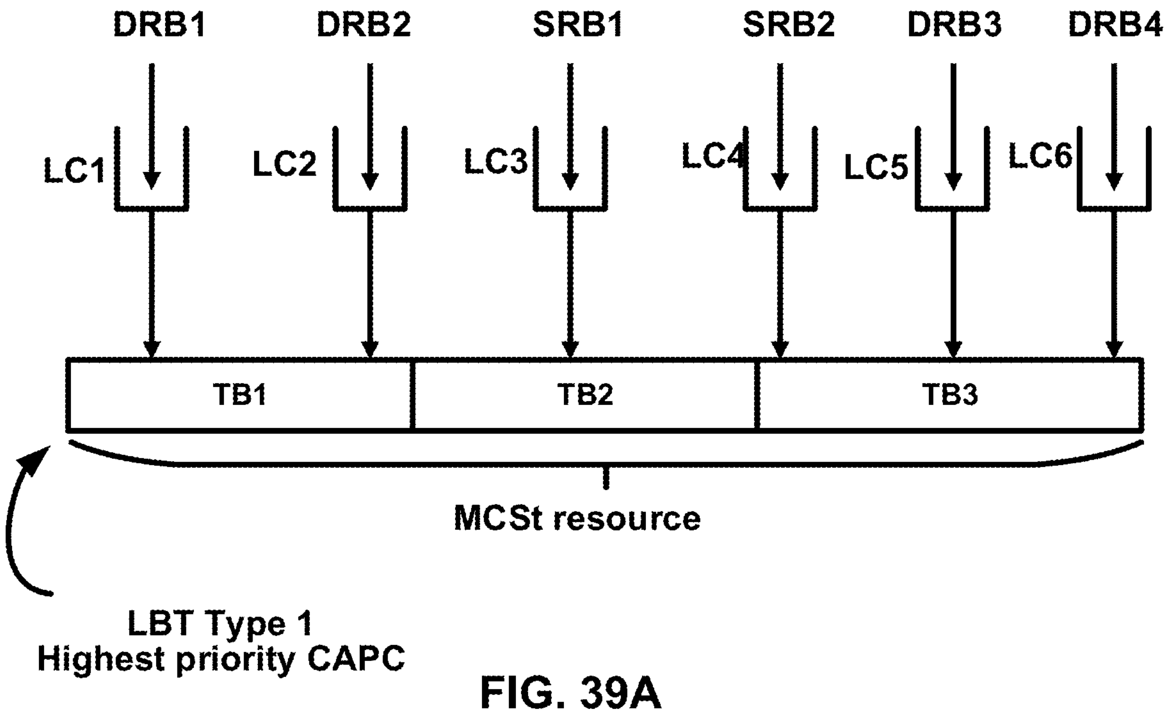
FIG. 39A and FIG. 39B show an example of CAPC determination for MCSt.
Figure 39B:
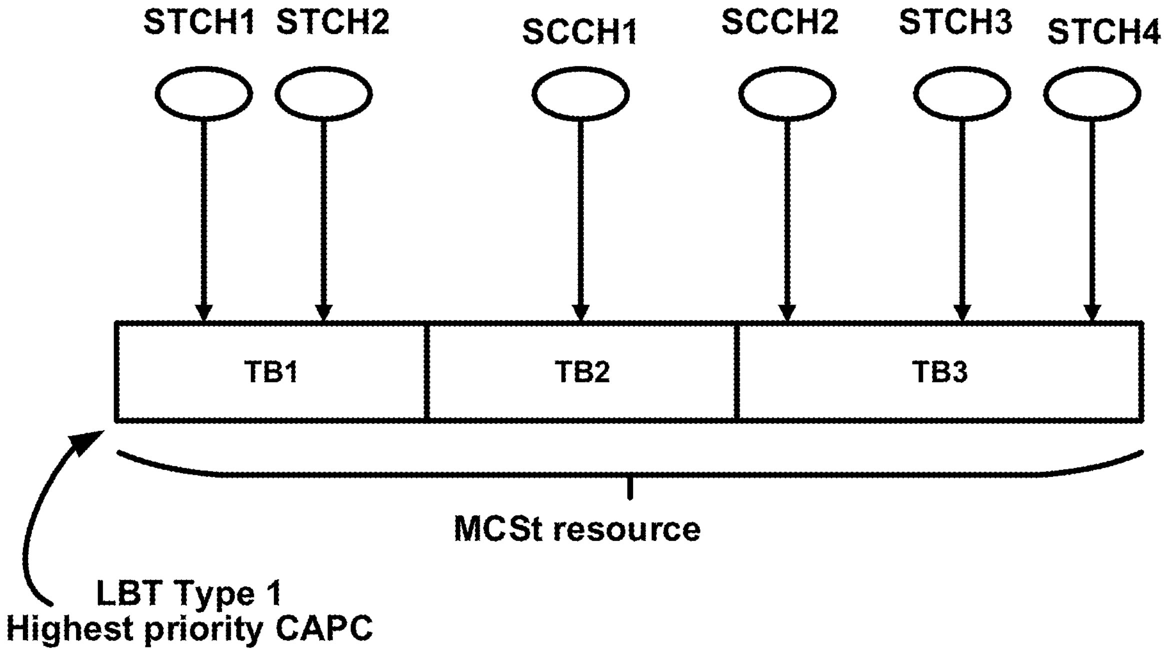

FIG. 39A and FIG. 39B show an example of CAPC determination for MCSt. A wireless device may determine a MCSt resource comprising three single-slot resources (PSSCH/PSCCH transmission occasions each within a slot). The wireless device may generate a first TB (e.g., TB1 or MAC PDU 1) and map it to the first resource of the MCSt (e.g., in the first/earliest slot). The wireless device may generate a second TB (e.g., TB2 or MAC PDU 2) and map it to the second resource of the MCSt (e.g., in the second slot). The wireless device may generate a third TB (e.g., TB3 or MAC PDU 3) and map it to the third resource of the MCSt (e.g., in the third slot).

Each TB of the three TBs mapped to resources of the MCSt resource, as shown in FIG. 39A, may comprise data of one or more SL logical channels. For example, TB1 comprises data (e.g., MAC SDU) of/associated with a first SL logical channel (LC1) and a second SL logical channel (LC2). TB2 may comprise data (e.g., MAC SDU) of/associated with a third SL logical channel (LC3). TB3 may comprise data (e.g., MAC SDU) of/associated with a fourth SL logical channel (LC4) and a fifth SL logical channel (LC5) and a sixth SL logical channel (LC6). A SL logical channel may be SCCH or STCH.

An SL logical channel (e.g., each SL logical channel), as shown in FIG. 39A, may comprise data (e.g., control data or traffic data) of/from a sidelink radio bearer, e.g., a SL-SRB or a SL-DRB. For example, one or more QoS flows (e.g., application layer data) may be multiplexed in DRB1 (SL DRB1), and data from DRB1 may be buffered/multiplexed in LC1. For example, LC1 may be a STCH logical channel. For example, one or more QoS flows may be multiplexed in DRB2 (SL DRB2), and data from DRB2 may be buffered/multiplexed in LC2. For example, LC2 may be a STCH logical channel. A wireless device may multiplex/include data (e.g., MAC SDUs, or STCH SDUs) from LC1 and LC2 in the first TB (TB1 or MAC PDU 1), e.g., based on sidelink logical channel prioritization (LCP). For example, SL control messages/data may be multiplexed in SRB2 (SL DRB1), and data from SRB1 may be buffered/multiplexed in LC3. For example, LC3 may be a SCCH logical channel. The wireless device may multiplex/include data (e.g., MAC SDU(s) or SCCH SDU(s)) from LC3 in the second TB (TB2 or MAC PDU 2), e.g., based on sidelink logical channel prioritization (LCP). For example, SL control messages/data may be multiplexed in an SRB2 (e.g., SL SRB2), and data from SRB2 may be buffered/multiplexed in LC4. For example, LC4 may be a SCCH logical channel. For example, one or more QoS flows may be multiplexed in DRB3 (SL DRB3), and data from DRB3 may be buffered/multiplexed in LC5. For example, one or more QoS flows may be multiplexed in DRB4 (SL DRB4), and data from DRB4 may be buffered/multiplexed in LC6.

LC5 and LC6 may be a STCH logical channels. A wireless device may multiplex/include data (e.g., MAC SDUs comprising at least one SCCH SDU and one or more STCH SDUs) from LC4 and LC5 and LC6 in the third TB (TB3 or MAC PDU 3), e.g., based on sidelink logical channel prioritization (LCP).

A wireless device may determine to perform a LBT procedure (e.g., LBT Type 1 procedure) prior to transmission of TB1 and TB2 and TB3 via the MCSt resource. The wireless device may determine a CAPC for the LBT procedure associated with the MCSt. The wireless device may determine a CAPC value of/for the MCSt. The wireless device may determine that the MCSt (e.g., at least one TB in the MCSt) comprises at least two SCCH SDUs (e.g., data from two SCCH logical channels or a SL SRBs, e.g., SRB1 and SRB2). The wireless device may determine a highest priority CAPC (indicated by a lowest CAPC value) for the MCSt in response to the MCSt comprising data (e.g., MAC SDUs) of/from at least one SL SRB or SCCH. As shown in the example of FIG. 39A, based on at least one TB (TB2 and TB3), of multiple TBs mapped to (or sent/transmitted via) the MCSt resource, comprising data of a SL SRB (e.g., through LC3 and LC4), the wireless device may select the highest priority CAPC (or the lowest CAPC value) for the LBT procedure prior to the MCSt.

FIG. 39B shows an example CAPC determination for MCSt based on multiplexed logical channels. FIG. 38B shows the logical channels of the example in FIG. 39A. As shown in FIG. 39B, data or MAC SDUs from a first SL traffic channel (STCH1) and a second SL traffic channel (STCH2), e.g., STCH SDUs, may be multiplexed in TB1. Data/MAC SDU(s) from (associated with/of) a first SCCH logical channel (SCCH1) may be multiplexed in TB2. Data/MAC SDU(s) from a second SL control channel (SCCH2), e.g., SCCH SDU(s), may be multiplexed in TB3. Additionally, data/MAC SDUs from STCH3 and STCH4, e.g., STCH SDUs, may be multiplexed in TB3. Therefore, the MCSt may comprise data (e.g., control data or control message or control information) from two SL control channels (e.g., SCCH logical channels, SCCH1 and SCCH2). The MCSt may further comprise data (e.g., traffic data or application data) from one or more SL traffic channels (e.g., STCH logical channels, STCH1 to STCH4). Based on the MCSt comprising at least one SCCH SDU (e.g., MAC SDU comprising data from a SCCH logical channel or SL-SRB), the wireless device may determine a highest priority CAPC for the MCSt. For example, the wireless device may perform a LBT procedure prior to the MCSt, wherein the LBT procedure is based on the highest priority CAPC (the lowest CAPC value).

A wireless device may send (e.g., transmit) the three TBs via/using the MCSt resource and based on the LBT procedure, e.g., in response to the LBT procedure indicating an idle channel. Due to using the highest priority CAPC (or equivalently, the lowest CAPC value) for the LBT procedure, the chance of LBT success may be increased, and the critical control data of SL SRB or the SCCH logical channel that is multiplexed in TB2 and TB3 may have a higher chance of successfully being sent (e.g., transmitted) via the MCSt.

Figure 40A:
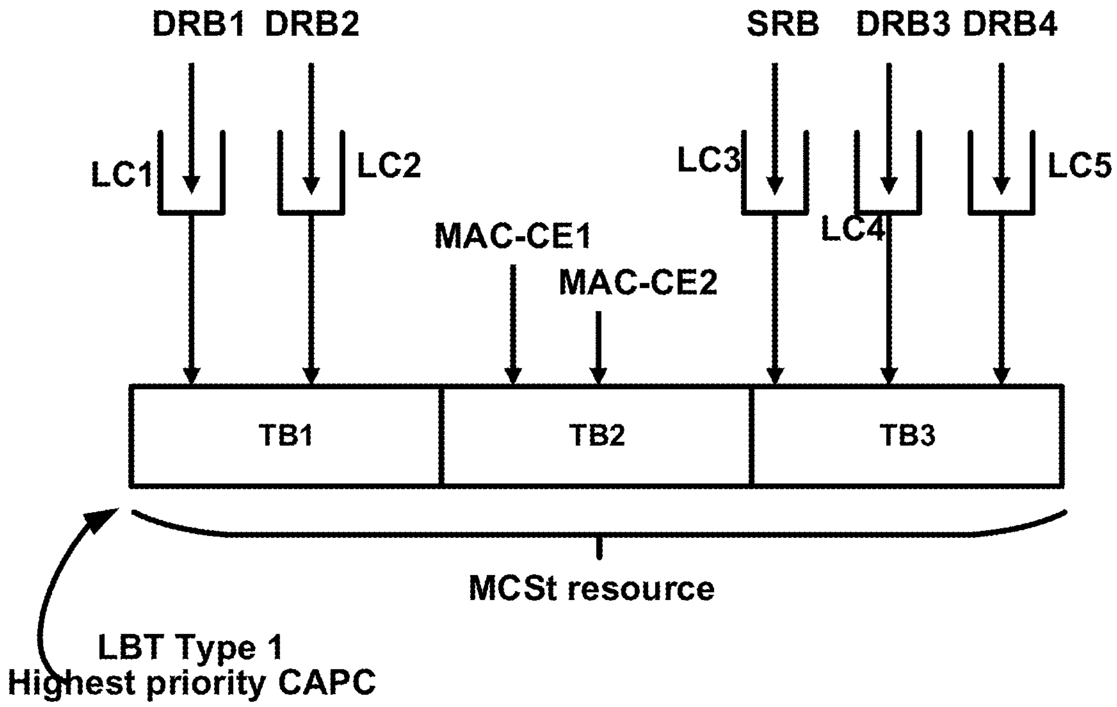
FIG. 40A and FIG. 40B show an example of CAPC determination for MCSt.
Figure 40B:
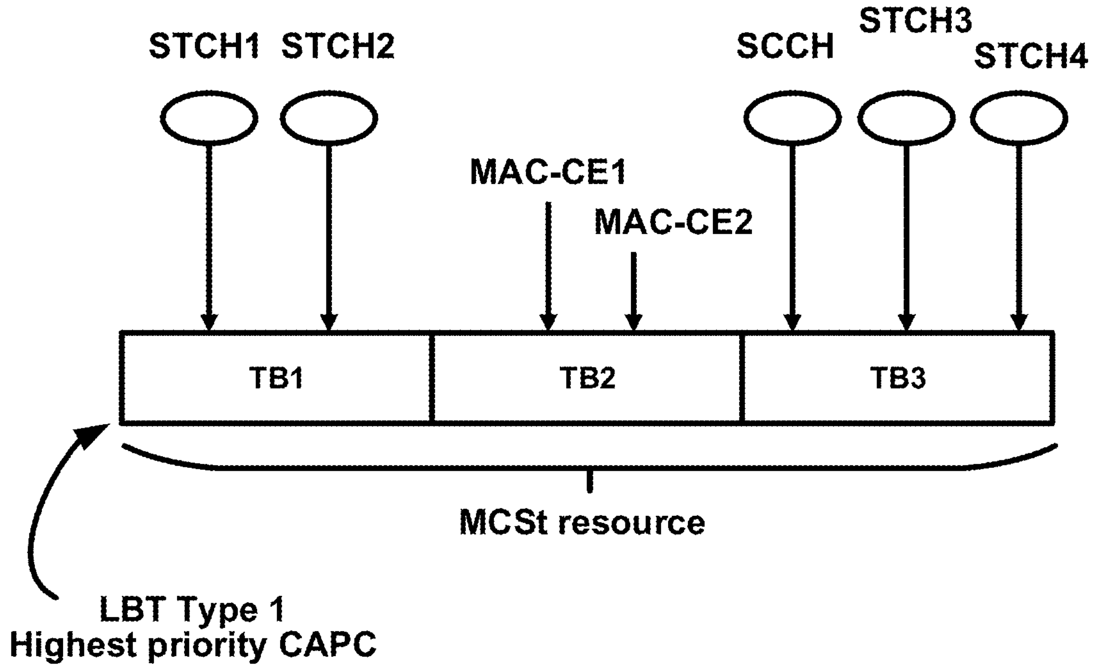

FIG. 40A and FIG. 40B show another example of CAPC determination for MCSt. In this example, one of the TBs in the MCSt (TB1) may comprise data (MAC SDUs) of/from two SL DRBs (DRB1 and DRB2 through LC1 and LC2) and/or two STCH logical channels (STCH1 and STCH2). A second TB of the MCSt (TB2) may comprise two MAC-CEs (MAC CE1 and MAC CE2). A third TB of the MCSt (TB3) may comprise data (at least one MAC SDU) of/from a SL SRB (through LC3) and/or SCCH, and data (MAC SDUs)

of/from two SL DRBs (DRB3 though LC4 and DRB4 through LC5) and/or two STCH logical channels (STCH3 and STCH4).

A wireless device may determine to perform a LBT procedure (e.g., LBT Type 1 procedure) prior to transmission of TB1 and TB2 and TB3 via the MCSt resource. The wireless device may determine a CAPC for the LBT procedure associated with the MCSt. The wireless device may determine a CAPC value of/for the MCSt. The wireless device may determine that the MCSt (e.g., at least one TB in the MCSt) comprises at least one SCCH SDUs (e.g., data from two SCCH logical channels or a SL SRBs, e.g., SRB1 and SRB2). The wireless device may determine a highest priority CAPC (indicated by a lowest CAPC value) for the MCSt in response to the MCSt comprising data (e.g., MAC SDUs) of/from at least one SL SRB or SCCH. As shown in the example of FIGS. 40A and 40B, based on at least one TB (TB3), of multiple TBs mapped to (or sent/transmitted via) the MCSt resource, comprising data of a SL SRB (e.g., through LC3), the wireless device may select the highest priority CAPC (or the lowest CAPC value) for the LBT procedure prior to the MCSt.

Figure 41A:
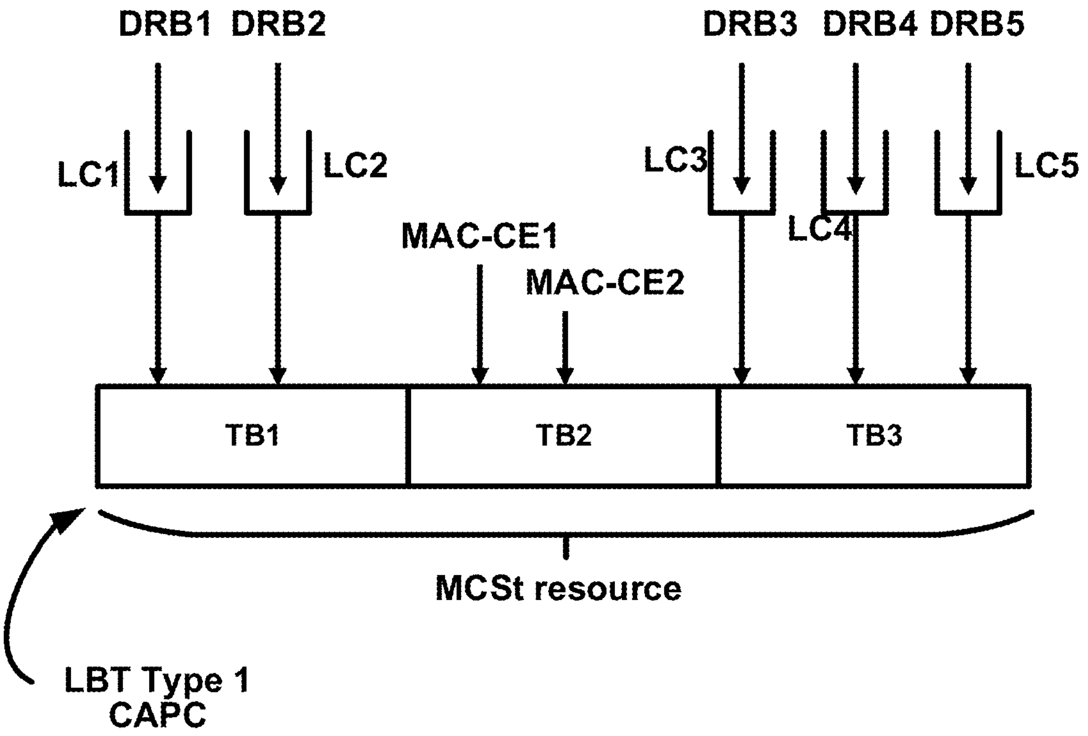
FIG. 41A and FIG. 41B show an example of CAPC determination for MCSt.
Figure 41B:
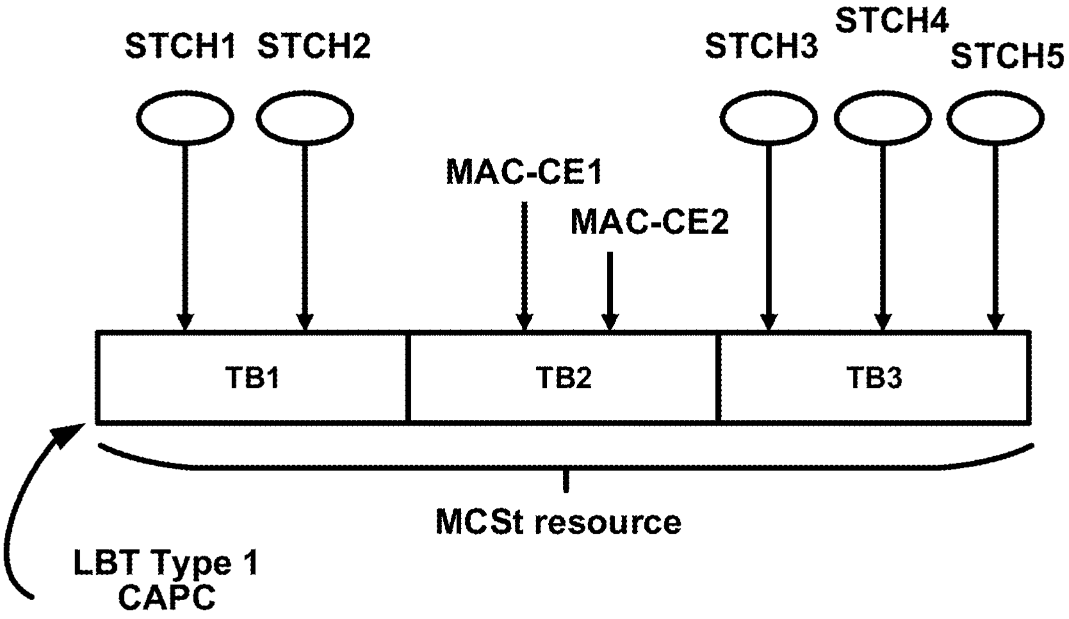

FIG. 41A and FIG. 41B show an example of CAPC determination for MCSt. In this example, one of the TBs in the MCSt (TB1) comprises data (MAC SDUs) of/from two SL DRBs (DRB1 and DRB2 through LC1 and LC2) and/or two STCH logical channels (STCH1 and STCH2). A second TB of the MCSt (TB2) comprises two MAC-CEs (MAC CE1 and MAC CE2). A third TB of the MCSt (TB3) comprises data (MAC SDUs) of/from three SL DRBs (DRB3 though LC3 and DRB4 through LC4 and DRB5 through LC5) and/or three STCH logical channels (STCH3 and STCH4 and STCH5).

A wireless device may determine to perform a LBT procedure (e.g., LBT Type 1 procedure) prior to transmission of TB1 and TB2 and TB3 via the MCSt resource. The wireless device may determine a CAPC for the LBT procedure associated with the MCSt. The wireless device may determine a CAPC value of/for the MCSt. The wireless device may determine that the MCSt (e.g., at least one TB in the MCSt) comprises at least one TB (e.g., TB2) with only MAC CEs. For example, only MAC CEs are included/multiplexed in TB2. For example, no MAC SDU (e.g., SCCH SDU or STCH SDU) is include/multiplexed in TB2. The wireless device may determine a highest priority CAPC (indicated by a lowest CAPC value) for the MCSt based on (e.g., in response to) the MCSt comprising at least one TB with only MAC CEs. As shown in the example of FIGS. 41A and 41B, based on at least one TB (TB2), of multiple TBs mapped to (or sent/transmitted via) the MCSt resource, comprising only MAC CEs, the wireless device may select the highest priority CAPC (or the lowest CAPC value) for the LBT procedure prior to the MCSt.

A wireless device may determine a CAPC value of/for the MCSt. The wireless device may determine that the MCSt (e.g., at least one TB in the MCSt) comprises at least one TB (e.g., TB1 or TB3) with at least one MAC SDU of a SL traffic channel (STCH) or a SL DRB (e.g., DRB1 to DRB5, or STCH1 to STCH5). For example, at least one STCH SDU is multiplexed in at least one TB of the MCSt. The wireless device may determine a lowest priority CAPC of the logical channels with MAC SDUs multiplexed in the TBs of MCSt as the CAPC for transmission of the MCSt. For example, the wireless device may select, for the MCSt, a first CAPC associated with a first logical channel that has the lowest CAPC priority (indicated by a highest CAPC value) among the logical channels with MAC SDUs multiplexed in any of the TBs of/in the MCSt, e.g., based on (in response to) the MCSt not comprising any data (e.g., MAC SDU) of/from any SL SRB or SCCH, and/or based on (e.g., in response to) the MCSt comprising data of/from at least one SL DRB or STCH. As shown in the example of FIG. 41A, based on TBs, of multiple TBs mapped to or sent (e.g., transmitted) via the MCSt resource, comprising no data of a SL SRB and/or comprising data of at least one SL DRB, the wireless device may select the lowest priority CAPC (or the highest CAPC value) among the CAPCs of the logical channels with data/MAC SDUs multiplexed in any TB of the MCSt, for the LBT procedure prior to the MCSt. In FIG. 41A, CAPC of LC2 may be the lowest priority CAPC among the CAPCs associated with the logical channels with MAC SDUs multiplexed in TB1 or TB2 or TB3, e.g., CAPCs of LC1 to LC6.

Figure 42:
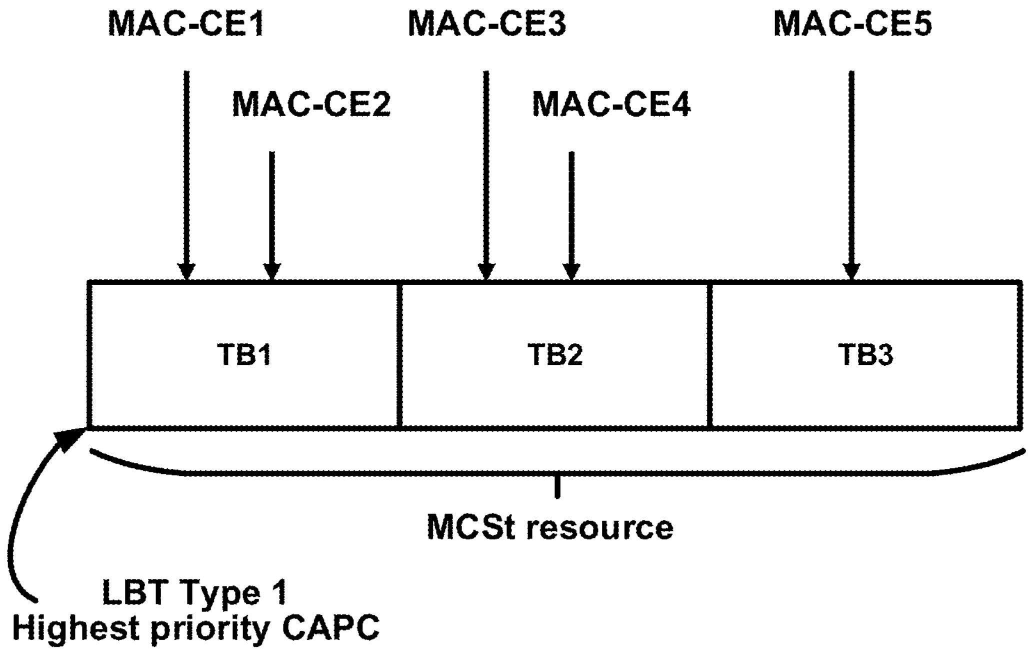
FIG. 42 show an example of CAPC determination for MCSt.

FIG. 42 show an example of CAPC determination for MCSt. In this example, all TBs in the MCSt (TB1 and TB2 and TB3) comprise MAC-CEs only (MAC CE1 to MAC CE5). For example, only MAC CEs may be multiplexed in all TBs of the MCSt. The wireless device may determine to perform a LBT procedure (e.g., LBT Type 1 procedure) prior to transmission of TB1 and TB2 and TB3 via the MCSt resource. The wireless device may determine a CAPC for the LBT procedure associated with the MCSt. The wireless device may determine a CAPC value of/for the MCSt. The wireless device may determine that the MCSt (e.g., at least one TB in the MCSt) comprises only MAC CEs. The wireless device may determine a highest priority CAPC (indicated by a lowest CAPC value) for the MCSt in response to the MCSt comprising only MAC CEs. As shown in the example of FIG. 42, based on all TBs, of multiple TBs mapped to (or sent/transmitted via) the MCSt resource, comprising only MAC CEs, the wireless device may select the highest priority CAPC (or the lowest CAPC value) for the LBT procedure prior to the MCSt.

A wireless device may determine two or more CAPC values for a MCSt, e.g., based on whether a first (or the following) LBT procedures are successful or fail. The wireless device may determine/select each of the two or more CAPC values based on the CAPCs associated with SL logical channels with MAC SDUs multiplexed in the TBs that will be sent/transmitted via a remainder of the MCSt and based on a LBT procedure using that respective CAPC.

The determined/selected CAPC value of the Type 1 LBT procedure may be different, depending on performing the Type 1 LBT procedure prior to which slot of the multiple slots of the MCSt resource (e.g., first or second or . . . ). For example, the wireless device may determine a CAPC for a respective LBT procedure performed for full or partial transmission of MCSt, based on the remaining TBs in the remainder of MCSt. Referring to FIG. 34, for performing a first LBT procedure prior to slot m, the wireless device may determine a first CAPC value based on the MAC SDUs (logical channels) and/or MAC CEs multiplexed in TB1 and TB2 and TB3 and TB4. The wireless device may perform a second LBT procedure prior to slot m+1 if the first LBT procedure prior to slot m fails. The wireless device may determine a second CAPC value for the second LBT procedure based on the MAC SDUs (logical channels) and/or MAC CEs multiplexed in TB2 and TB3 and TB4. The wireless device may perform a third LBT procedure prior to slot m+2 if the second LBT procedure prior to slot m+1 fails. The wireless device may determine a third CAPC value for the third LBT procedure based on the MAC SDUs (logical channels) and/or MAC CEs multiplexed in TB3 and TB4. The wireless device may perform a fourth LBT procedure prior to slot m+3 if the third LBT procedure prior to slot m+2 fails. The wireless data may determine a fourth CAPC value for the fourth LBT procedure based on the MAC SDUs (logical channels) and/or MAC CEs multiplexed in TB4.

A wireless data may determine the CAPC of the earliest TB as the CAPC for the MCSt. For example, the wireless data may determine CAPC values for the TBs of a MCSt, e.g., one CAPC per TB of the TBs. The wireless data may determine the CAPC of the LBT procedure for the MCSt based on the CAPC of the first/earliest TB in the MCSt.

A wireless data may map TBs to resources of the MCSt in an order of decreasing priority of CAPCs, or increasing CAPC values. For example, the wireless data may send (e.g., transmit) the TB with highest priority CAPC (lowest CAPC value) in the first/earliest resource/slot of the MCSt. For example, the wireless data may send (e.g., transmit) the TB with lowest priority CAPC (highest CAPC value) in the last resource/slot of the MCSt.

Figure 43:
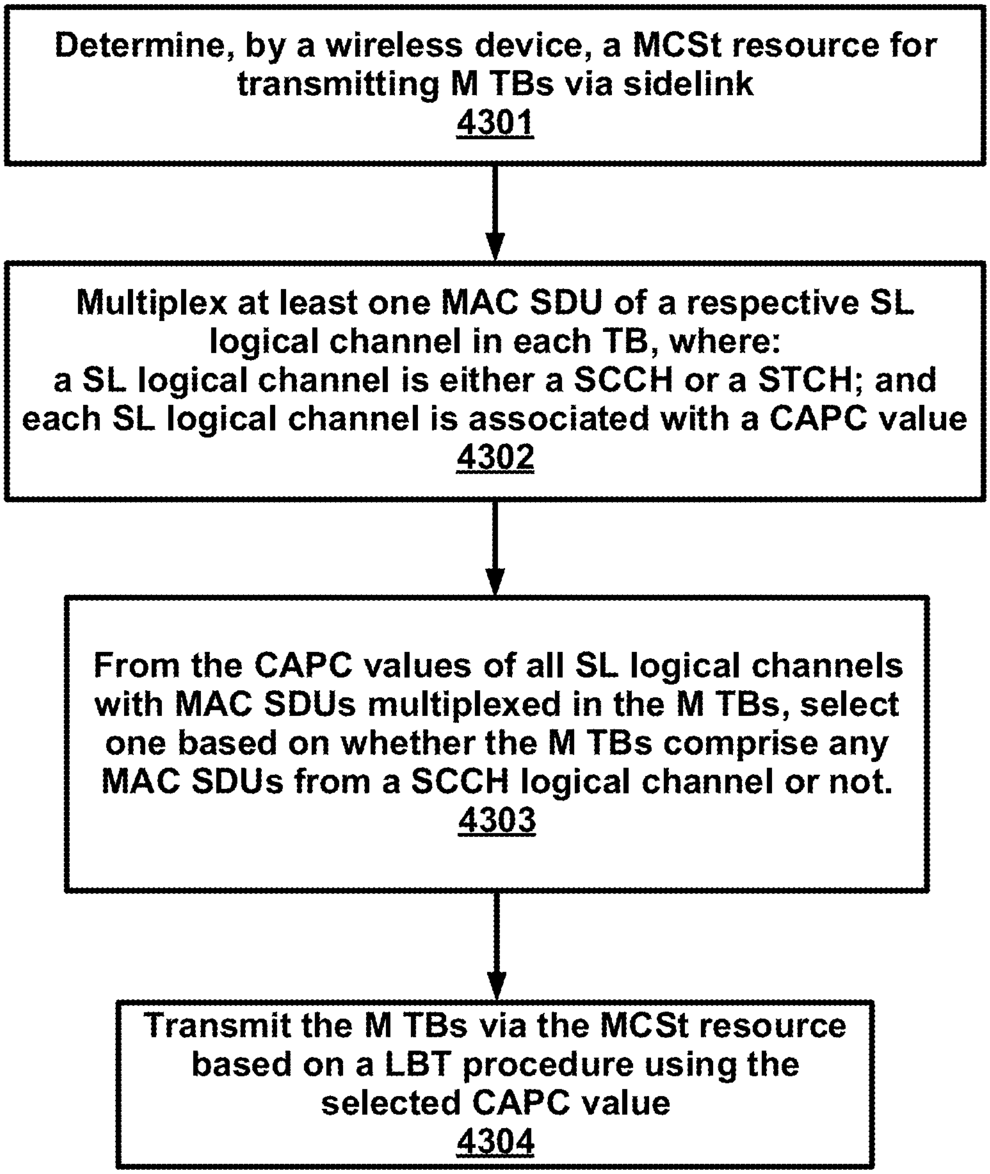
FIG. 43 shows an example method for CAPC determination associated with MCSt.

FIG. 43 shows an example method for CAPC determination associated with MCSt. A wireless device in step 4301 may determine a MCSt resource for sending (e.g., transmitting) M TBs via sidelink. The wireless device in step 4302 may multiplex at least one MAC SDU of a (respective) SL logical channel in each TB of the M TBs, where: a SL logical channel is either a SCCH or a STCH; and each SL logical channel is associated with a CAPC value. From the CAPC values of all SL logical channels with MAC SDUs multiplexed in the M TBs, the wireless device in step 4303 may select one CAPC value based on whether the M TBs comprise any MAC SDUs from a SCCH logical channel or not. The wireless device in 4304 may send (e.g., transmit) the M TBs via the MCSt resource based on a LBT procedure using the selected CAPC value.

Figure 44:
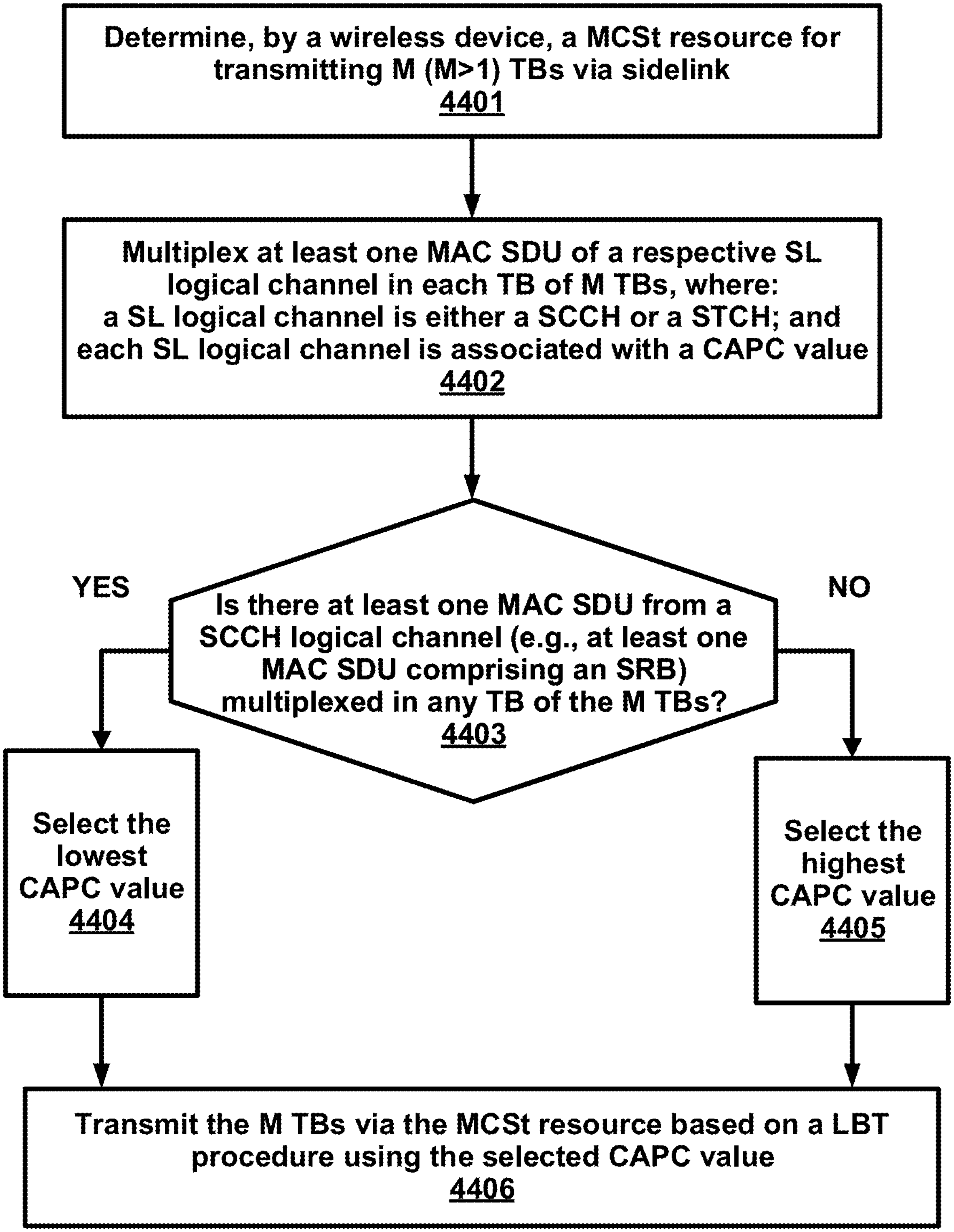
FIG. 44 shows an example method for CAPC determination for transmission of multiple TBs via MCSt.

FIG. 44 shows an example method for CAPC determination for transmission of multiple TBs via MCSt. As shown in FIG. 44, a wireless device in step 4401 may determine a MCSt resource for sending (e.g., transmitting) M (M>1) TBs via sidelink. The wireless device in step 4402 may multiplex at least one MAC SDU of a (respective) SL logical channel in each TB of M TBs, where: a SL logical channel is either a SCCH or a STCH; and each SL logical channel is associated with a CAPC value. The wireless device in step 4403 may determine whether there is at least one MAC SDU from a SCCH logical channel (e.g., at least one MAC SDU comprising an SRB) multiplexed in any TB of the M TBs. The wireless device in step 4404 may select the lowest CAPC value (e.g., highest priority CAPC) of all possible/predefined CAPC values if there is at least one MAC SDU from a SCCH logical channel (e.g., at least one MAC SDU comprising an SRB) multiplexed in a TB of the M TBs. The wireless device in step 4405 may select the highest CAPC value (e.g., lowest priority CAPC) among the CAPC values associated with SL logical channel with MAC SDUs multiplexed in the M TBs if there is not at least one MAC SDU from a SCCH logical channel (e.g., at least one MAC SDU comprising an SRB) multiplexed in any TB of the M TBs. The wireless device in step 4406 may send (e.g., transmit) the M TBs via the MCSt resource based on a LBT procedure using the selected CAPC value.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, 6G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, 6G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, 6G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

determining, by a wireless device, a multi-consecutive slot transmission (MCSt) resource associated with transmission of a plurality of sidelink transport blocks (TBs), wherein:

each of the plurality of sidelink TBs is associated with at least one of a plurality of sidelink logical channels; and each of the plurality of sidelink logical channels is associated with at least one channel access priority class (CAPC) value of a plurality of CAPC values; and sending the plurality of sidelink TBs via the MCSt resource and based on at least one listen before talk (LBT) procedure that uses a CAPC value, of the plurality of CAPC values, that is determined based on:

a lowest CAPC value, or a highest CAPC value, among the plurality of CAPC values; and whether the plurality of sidelink TBs comprises data from a sidelink control channel (SCCH).

2. The method of claim 1, wherein the plurality of sidelink TBs comprises data of the SCCH; and wherein the used CAPC value is determined based on:

selecting, based on the plurality of sidelink TBs, a first CAPC value among the plurality of CAPC values, wherein the first CAPC value indicates at least one of:

the lowest value among the plurality of CAPC values; or a highest priority of channel access priority class to a shared spectrum.

3. The method of claim 1, wherein the plurality of sidelink TBs does not comprise data of the SCCH; and the used CAPC value is determined based on:

selecting, based on the plurality of sidelink TBs, a second CAPC value among the plurality of CAPC values, wherein the second CAPC value indicates at least one of:

the highest CAPC value among the plurality of CAPC values; or a lowest priority of channel access priority class to a shared spectrum.

4. The method of claim 1, further comprising:

receiving at least one radio resource control (RRC) message comprising a plurality of sidelink configuration parameters, wherein each sidelink parameter of the plurality of sidelink configuration parameters indicates a sidelink logical channel, of the at least one of the plurality of sidelink logical channels, associated with the used CAPC value.

5. The method of claim 1, further comprising:

receiving at least one radio resource control (RRC) message comprising a plurality of sidelink configuration parameters indicating a sidelink resource pool, wherein the plurality of sidelink configuration parameters indicates at least one of:

time resources associated with the MCSt; or frequency resources associated with the MCSt.

6. The method of claim 5, wherein:

the time resources indicate a quantity of symbols in a slot; and the frequency resources indicate a quantity of resource block or interlaces.

7. The method of claim 1, wherein determining the MCSt resource comprises:

receiving downlink control information (DCI) indicating the MCSt resource.

8. The method of claim 1, wherein determining the MCSt resource comprises:

selecting the MCSt resource based on:

a MCSt resource selection procedure; or a M single-slot resource selection procedure, wherein M indicates a quantity of transmission slots.

9. The method of claim 1, wherein data of the sidelink logical channel comprises at least one of a sidelink control message or sidelink traffic data; and wherein the method further comprises:

mapping the sidelink control message to a sidelink signaling radio bearer (SRB); and mapping the sidelink traffic data to a sidelink data radio bearer (DRB).

10. The method of claim 9, wherein:

the sidelink SRB is linked to a sidelink control channel (SCCH); and the sidelink DRB is linked to a sidelink traffic channel (STCH).

11. A method comprising:

multiplexing, by a wireless device, at least one medium access control (MAC) service data unit (SDU) of a sidelink logical channel in each sidelink transport block (TB) of a plurality of sidelink TBs;

based on the plurality of sidelink TBs comprising data from a sidelink control channel (SCCH), determining at least one channel access priority class (CAPC) value among a plurality of CAPC values; and sending the plurality of sidelink TBs via a multi-consecutive slot transmission (MCSt) resource and based on at least one listen before talk (LBT) procedure that uses the at least one determined CAPC value.

12. The method of claim 11, further comprising:

determining the MCSt resource associated with transmission of a plurality of sidelink TBs comprising data from a plurality of sidelink logical channels, wherein:

each of the plurality of sidelink TBs is associated with at least one of the plurality of sidelink logical channels; and each of the plurality of sidelink logical channels is associated with the at least-one CAPC value.

13. The method of claim 12, wherein each of the plurality of sidelink TBs comprises data associated with at least one sidelink radio bearer; and the data associated with at least one sidelink radio bearer comprises at least one of:

control data; or a control message.

14. The method of claim 11, wherein the MCSt resource comprises a plurality of consecutive single-slot resources.

15. A method comprising:

determining whether a plurality of sidelink transport blocks (TBs) of a multi-consecutive slot transmission (MCSt) comprises a sidelink signaling radio bearer (SRB), wherein:

the sidelink SRB is linked to a sidelink control channel (SCCH);

selecting, based on the determining and for the MCSt, at least one channel access priority class (CAPC) value among a plurality of CAPC values; and sending, via the MCSt and based on at least one listen before talk (LBT) procedure that uses the at least one selected CAPC value, the plurality of sidelink TBs.

16. The method of claim 15, wherein each of the plurality of sidelink TBs comprises one or more medium access control-control elements (MAC-CEs).

17. The method of claim 15, wherein at least one of the plurality of sidelink TBs comprises one or more medium access control-control elements (MAC-CEs).

18. The method of claim 15, wherein selecting the at least one CAPC value comprises:

selecting, based on the plurality of sidelink TBs comprising one or more medium access control-control elements (MAC-CEs), a lowest CAPC value among the plurality of CAPC values.

19. The method of claim 15, further comprising:

determining, based on the selected at least one CAPC value, parameters of one or more LBT procedures, wherein the parameters of one or more LBT procedures comprises at least one of:

minimum contention window size;

maximum contention window size;

maximum duration of channel occupancy time (COT); or a set of allowed contention window.

20. The method of claim 15, wherein sending the plurality of sidelink TBs comprises:

mapping a first sidelink TB of the plurality of sidelink TBs to a first slot of a MCSt resource;

mapping a second sidelink TB of the plurality of sidelink TBs to a second slot of the MCSt resource, wherein:

a CAPC value associated with the first sidelink TB is lower than the CAPE a CAPC value associated with the second sidelink TB; and the first slot of the MCSt resource indicates a higher communication priority than the second slot of the MCSt resource.

* * * * *